US011586754B2

(12) United States Patent
Naqvi et al.

(10) Patent No.: US 11,586,754 B2
(45) Date of Patent: Feb. 21, 2023

(54) DATABASE SYSTEM FOR PROTECTING AND SECURING STORED DATA USING A PRIVACY SWITCH

(71) Applicant: Safelishare, Inc., Morristown, NJ (US)

(72) Inventors: Shamim A. Naqvi, Morristown, NJ (US); Robert F. Raucci, New York, NY (US); John Henry Friedman, New York, NY (US)

(73) Assignee: Safelishare, Inc., Morristown, NJ (US)

( * ) Notice: Subject to any disclaimer, the term of this patent is extended or adjusted under 35 U.S.C. 154(b) by 106 days.

(21) Appl. No.: 17/114,693

(22) Filed: Dec. 8, 2020

(65) Prior Publication Data

US 2021/0192066 A1 Jun. 24, 2021

Related U.S. Application Data

(60) Division of application No. 15/877,527, filed on Jan. 23, 2018, now Pat. No. 10,860,735, which is a continuation-in-part of application No. 15/671,021, filed on Aug. 7, 2017, now Pat. No. 10,607,019.

(60) Provisional application No. 62/371,403, filed on Aug. 5, 2016.

(51) Int. Cl.
G06F 21/62 (2013.01)
G06F 21/60 (2013.01)
G06F 21/64 (2013.01)
H04L 9/32 (2006.01)
H04L 9/00 (2022.01)

(52) U.S. Cl.
CPC ........ *G06F 21/6218* (2013.01); *G06F 21/602* (2013.01); *G06F 21/645* (2013.01); *H04L 9/321* (2013.01); *H04L 9/3218* (2013.01); *H04L 9/3231* (2013.01); *H04L 9/50* (2022.05)

(58) Field of Classification Search
CPC .. G06F 21/6218; G06F 21/645; G06F 21/602; H04L 9/3218; H04L 9/3231; H04L 9/321; H04L 9/50
See application file for complete search history.

(56) References Cited

U.S. PATENT DOCUMENTS

| | | | | |
|---|---|---|---|---|
| 7,433,832 B1* | 10/2008 | Bezos | ..................... | G06Q 10/10 705/26.8 |
| 9,378,380 B1* | 6/2016 | Reid | ..................... | G06F 21/602 |
| 2003/0055723 A1* | 3/2003 | English | .............. | G06Q 30/0263 705/26.1 |
| 2003/0200202 A1* | 10/2003 | Hsiao | .................. | G06F 21/6218 |
| 2005/0049969 A1* | 3/2005 | Kane | ..................... | G06Q 20/04 705/45 |
| 2016/0105290 A1* | 4/2016 | Khalil | ................. | H04L 63/0815 713/168 |

* cited by examiner

*Primary Examiner* — Meng Li
(74) *Attorney, Agent, or Firm* — Mayer & Williams PC; Stuart H. Mayer

(57) ABSTRACT

Applications of the privacy switch technology are shown for handling data breaches in database systems, thereby providing fundamental improvements to the security and utility of database technology.

10 Claims, 67 Drawing Sheets

| Step | Action Taking Entity | Business Entity Visited | Input | Output |
|---|---|---|---|---|
| 1 | Consumer | Payment Processor | Financial Information | Account# |
| 2 | Consumer | LCA | Location | Token-1 |
| 3 | Consumer | Seller | Title, Token-1 | Token-2 |
| 4 | Consumer | Payment Processor | Account#, Token-2 | Token-3 |
| 5 | Consumer | Seller | Token-3 | Token-4 |
| 6 | Consumer | Shipper | Address, Token-4 | Receipt |
| 7 | Shipper | Seller | Token-4 | Delivery |

FIG. 1

| Step | Action Taking Entity | Business Entity Visited | Input | Output |
|---|---|---|---|---|
| 1. (Initial Phase only) | Consumer | Payment Processor | Financial Information | Account# |
| 2 | Consumer | LSA | Location | Token-1 |
| 3 | Consumer | Seller | Title, Token-1 | Token-2 |
| 4 | | Payment Processor | Token-2 | Token-3 |
| 5 | | Seller | Token-3 | Token-4 |
| 6 | | Shipper | Address, Token-4 | Receipt |
| 7 | Shipper | Seller | | Delivery |

FIG. 2

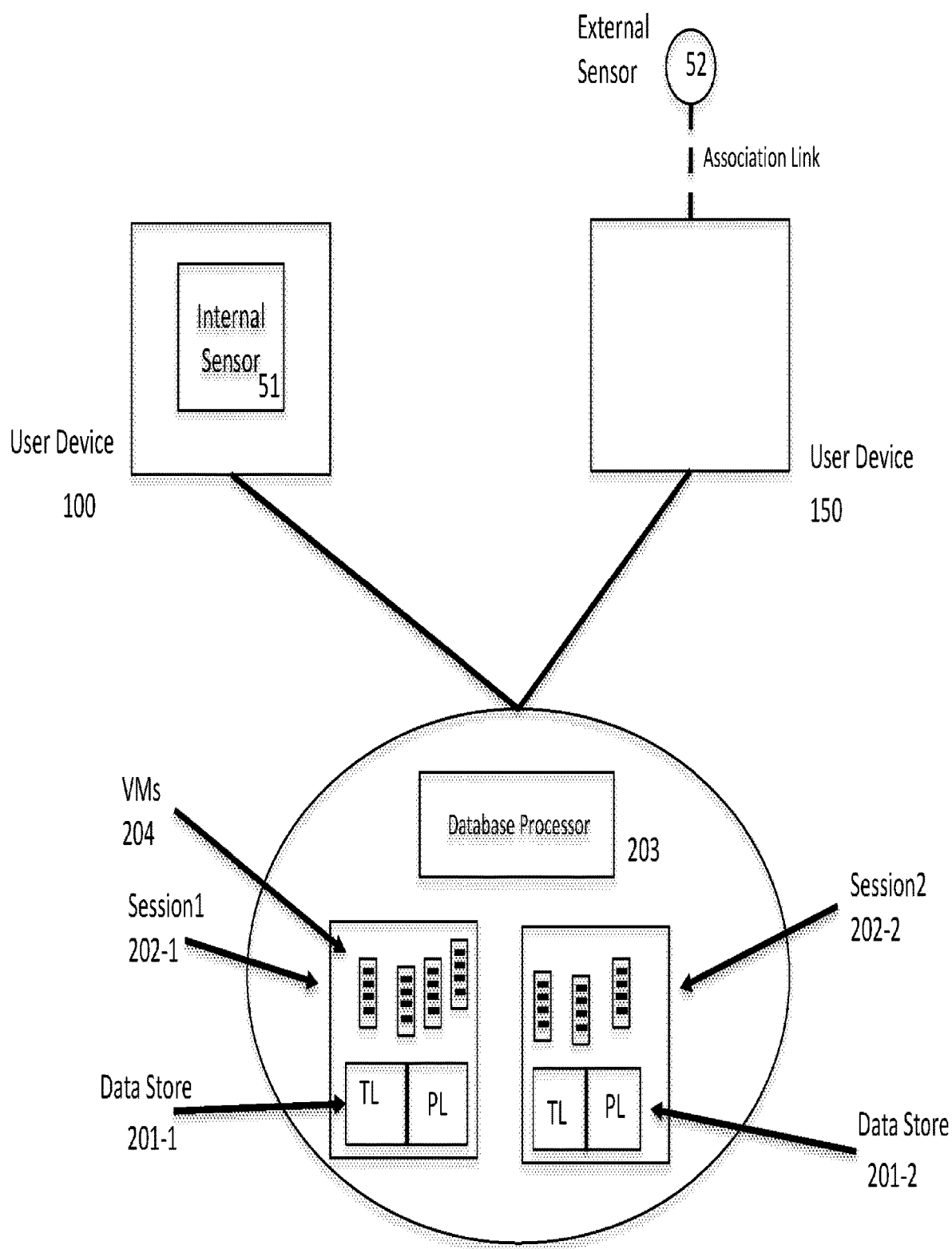

| Overall Service Name | Overall Service Description | User Info List | Descriptive Keywords | Address & Name of supplier | Program Name Matching | Search Attributes |
|---|---|---|---|---|---|---|
| Book Seller | Buy Books Online | <User Name, Credit card, Amount, Location, Shipping-address> | <Book Seller, Fiction Leather Bound Books, Best Prices, Privacy of Information> | Supplier-1, Address 1 | Name=Book | <Cheap Books, Best rated books, Bargain Books> |
| Payment-Service | Pay for services | <amount, Account#, Name> | <Pay for purchased items> | Supplier-5 | Name=Payment | <Payment, Private, Payment> |
| Shipment-Service | Items delivery service | <shipping address> | <Bought items delivered to your address> | Supplier-4 | Name=Shipment | <shipment, private shipment> |
| Smart Car Garage | Smart Car Services | <User name, Car license plate, ...> | <Smart Car Services, Oil Change, Best Prices, Porsche Specialist> | Supplier-2, Address 2 | Name=Porsche | <Best deals> |
| Online Lab | Medical Services | <user name, social security number, ...> | <Medical Services, Lab Facilities, X-Ray Facilities, Insurance, Payment> | Supplier-3, Address 3 | Name=Cardiologist | <Privacy Preserving, Medical Treatments> |

FIG. 6

Book:
 Display Book List to user
 Ask user for Title of book
 Get user device location
 <Token: location>
 <Token: title of book>
 Output: Payment Payment:
 Input: title, location
 Ask user for account#
 Ask user name
 Ask user to verify amount
 Execute payment transaction
 <Token | Amount, pay>
 Output: Shipment Shipment:
 Input: pay, amount
 Ask shipping address
 Execute shipping of goods
         to shipping-address

FIG. 8A

| Instruction | Meaning |
|---|---|
| Get | Execute procedure to get information from a sensor device associated with a user device; Execute procedure to get encryption/decryption keys from user device. |
| Ask | Request information from user computing device |
| Input | Read encrypted information from list TL |
| Output | Write name of computer program (identifier) to list PL |
| Token | Write encrypted information to list TL |
| Display | Display service related data on user device |

FIG. 8B

1a. User request
1b. Establish session.
1c. Inject name of program "Book" in PL
1d. Fetch program "Book" from directory
2. Create VM100
3. Execute service logic of "Book"
4a. Display Seller List
4b. Ask title
5. Get device location
6a. Get encryption key
6b. Create tokens (title, location) and store them in TL.
6c. Output "Payment" to PL
7. Terminate VM100

Legend
401, 402 and 403 are components of service 400 of FIG. 13A
200 is user device from FIG. 13A

| 37 | 42 | 64 |
|---|---|---|
| i | ii | iii |
| 31 | 48 | 34 |
| iv | v | vi |
| 36 | 47 | 33 |
| vii | viii | ix |

FIG. 19A

| | | |
|---|---|---|
| i,37 | --> | 1 |
| ii,42 | --> | 2 |
| iii,64 | --> | 3 |
| iv,31 | --> | 1 |
| v,48 | --> | 2 |
| vi,34 | --> | 3 |
| vii,36 | --> | 1 |
| viii,47 | --> | 2 |
| ix,33 | --> | 3 |

FIG. 19B

| 1 | 2 | 3 |
|---|---|---|
| 3 | 1 | 2 |
| 2 | 3 | 1 |

FIG. 19C

|   |   |   |
|---|---|---|
| 1 | – | – |
| – | – | 2 |
| 2 | 3 | – |

Constraint = sum of each row and column is equal.

FIG. 20A

|   |   |   |
|---|---|---|
| – | 2 | 3 |
| 3 | 1 | – |
| – | – | 1 |

FIG. 20B

Legend:
"_" missing cell value

1. Decrypt "proof object" to get one component of Puzzle.

Combine output dataset with above decrypted component to get completed object (Sudoku).

Verify constraints are satisfied.

If yes, return "true"; else return "false".

FIG. 21

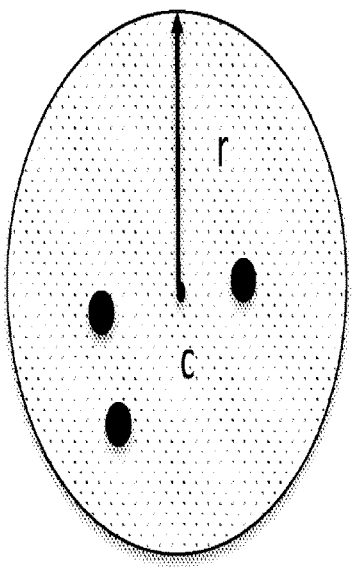
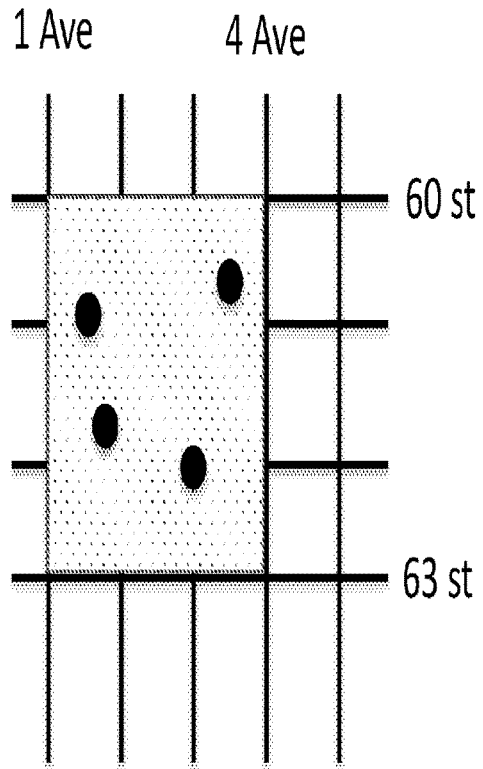

Legend:
User device is located within region bounded by a circle with center "c" and radius "r".
User device selects the dots.
The dots represent the locations represented by the approximate object.
The user device is at one of the dotted locations.

Legend:
User device is located in region bounded by 60 & 63 streets and 1 & 4 Ave.
User device selects the dots.
The dots represent the locations represented in the approximate object. The user device is at one of the dotted locations.

FIG. 23

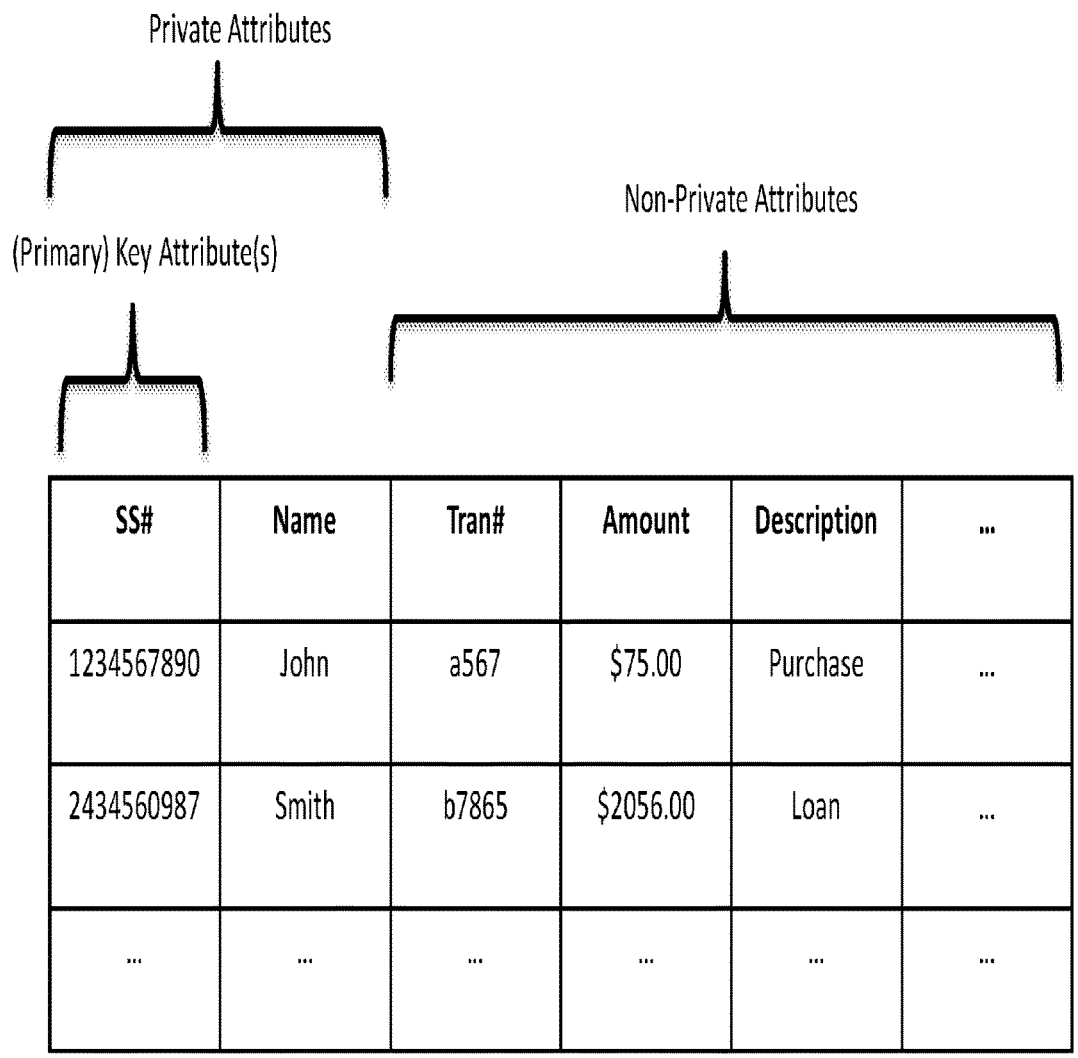
FIG. 25: Exemplary Database Table for a Credit Reporting Enterprise

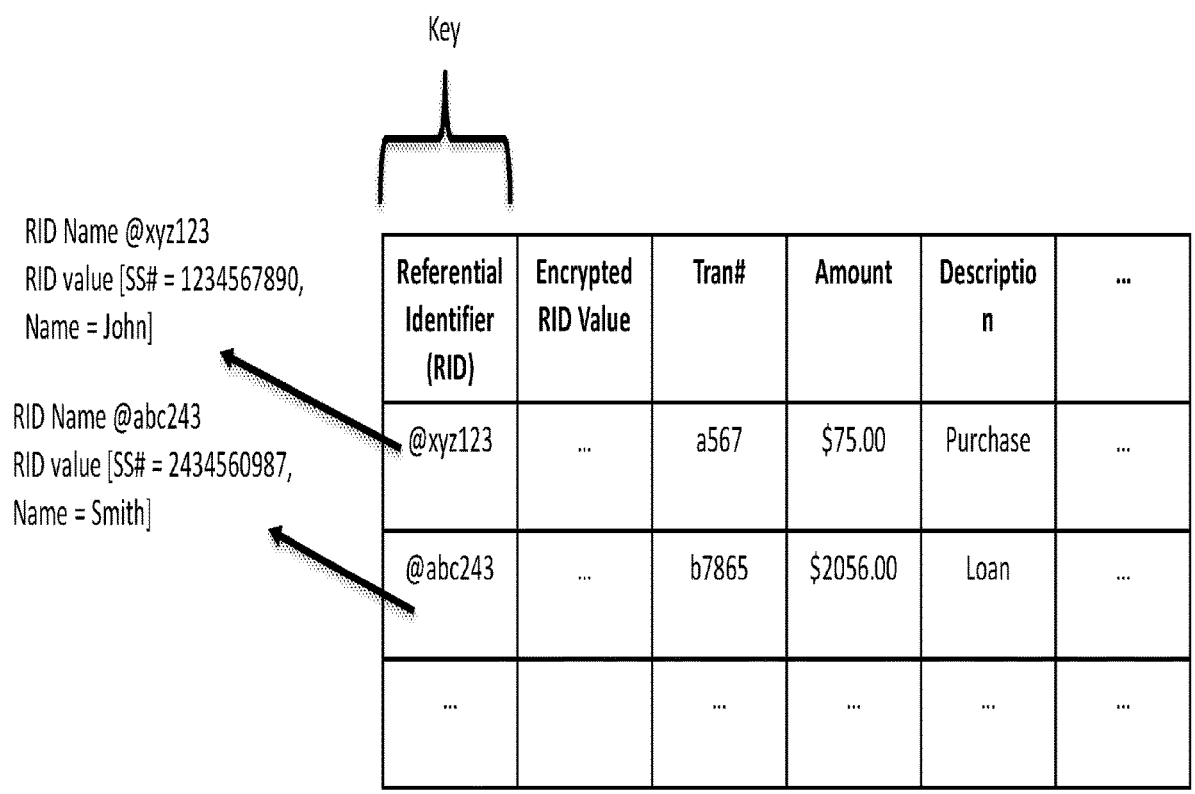
FIG. 26A: Re-Formatted Database Table

| Device ID | RID Name | Verifying Key (VK2) |
|-----------|----------|---------------------|
| 145620    | @xyz123  | VK2-1               |
| 985768    | @abc243  | VK2-2               |
| ...       | ...      | ...                 |

652

FIG. 26C: SPS Table

| Owner Name | Serial# | Date of Manufacture | Price | ... |
|---|---|---|---|---|
| OWNER-1 | 12345 | 12.12.2017 | $35000.00 | ... |
| OWNER-2 | 34567 | 10.12.2016 | $27000.00 | ... |

Legend:
The symbol ≡ represents "equivalence".

100

| Owner-RID Name | Owner-1 Encrypted-RID Value | Serial# | Date of Manufacture | Price | ... |
|---|---|---|---|---|---|
| @rolex1 | [Hex:01100A 001....] | 12345 | 12.12.2017 | $35000.00 | ... |
| @rolex2 | [Hex:0A11B0 0...] | 34567 | 10.12.2016 | $27000.00 | ... |

200

User computing device with Stored RID values (Owner-1 & Owner-2), respectively

FIG. 28A

| Owner-2-RID Name | Owner-2 Encrypted RID -Value | Owner-1 RID Name 1 | Owner-1 Encrypted RID Value | Serial# | Date of Manufacture | Price | ... |
|---|---|---|---|---|---|---|---|
| @john123 | Hex:[00A00011B...] | @rolex1 | [Hex:01100A001....] | 12345 | 12.12.2017 | $35000.00 | ... |
| | | @rolex2 | [Hex:0A11B00...] | 34567 | 10.12.2016 | $27000.00 | ... |

| Customer-ID | List of Friends | Content |
|---|---|---|
| John-at-xyz-dot-com | (F-11, F-12, etc.) | C11 |
| Smith-at-abc-dot-com | (F-21, F-22, etc.) | C12 |
| ... | ... | ... |

Service provider database 1

200

| Customer-ID | Follows | Content |
|---|---|---|
| John-at-xyz-dot-com | (FO-11, FO-12, etc) | C21 |
| Smith-at-abc-dot-com | (FO-21, FO-22, etc) | C22 |
| ... | ... | ... |

Service provider database 2

| RID Name | Encrypted-RID Value | Content |
|---|---|---|
| @john123 | ... | C11 |
| @smith345 | ... | C12 |
| ... | ... | ... |

Re-formatted database for Service provider 1

301

| RID Name | Verifying Key (VK2) SP1 | Verifying Key (VK2) SP2 |
|---|---|---|
| @john123 | VK2-11 | VK2-21 |
| @smith345 | VK2-12 | VK2-22 |
| ... | ... | ... |

SPS Record database for Service providers 1 & 2

201

| RID Name | Encrypted RID Value | Content |
|---|---|---|
| @john123 | ... | C21 |
| @smith345 | ... | C22 |
| ... | ... | ... |

Re-formatted database for Service provider 2

FIG. 30

| Contacts Lists (@john123) | Service provider | Credential/Card |
|---|---|---|
| [F-11, F-12, etc.] | SP1 | CC-11 |
| [FO-11, FO-22, etc.] | SP2 | CC-21 |

User device-1 (RID Name is @john123).

| Contacts Lists (@smith345) | Service provider | Credential/Card |
|---|---|---|
| [F-21, F22, etc.] | SP1 | CC-12 |
| [F−21, FO-22, etc.] | SP2 | CC-22 |

User device-2 (RID Name is @smith345).

FIG. 31

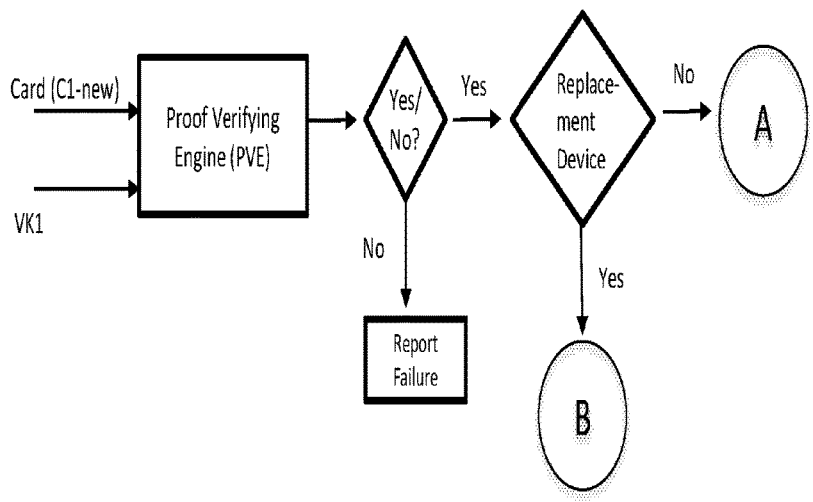
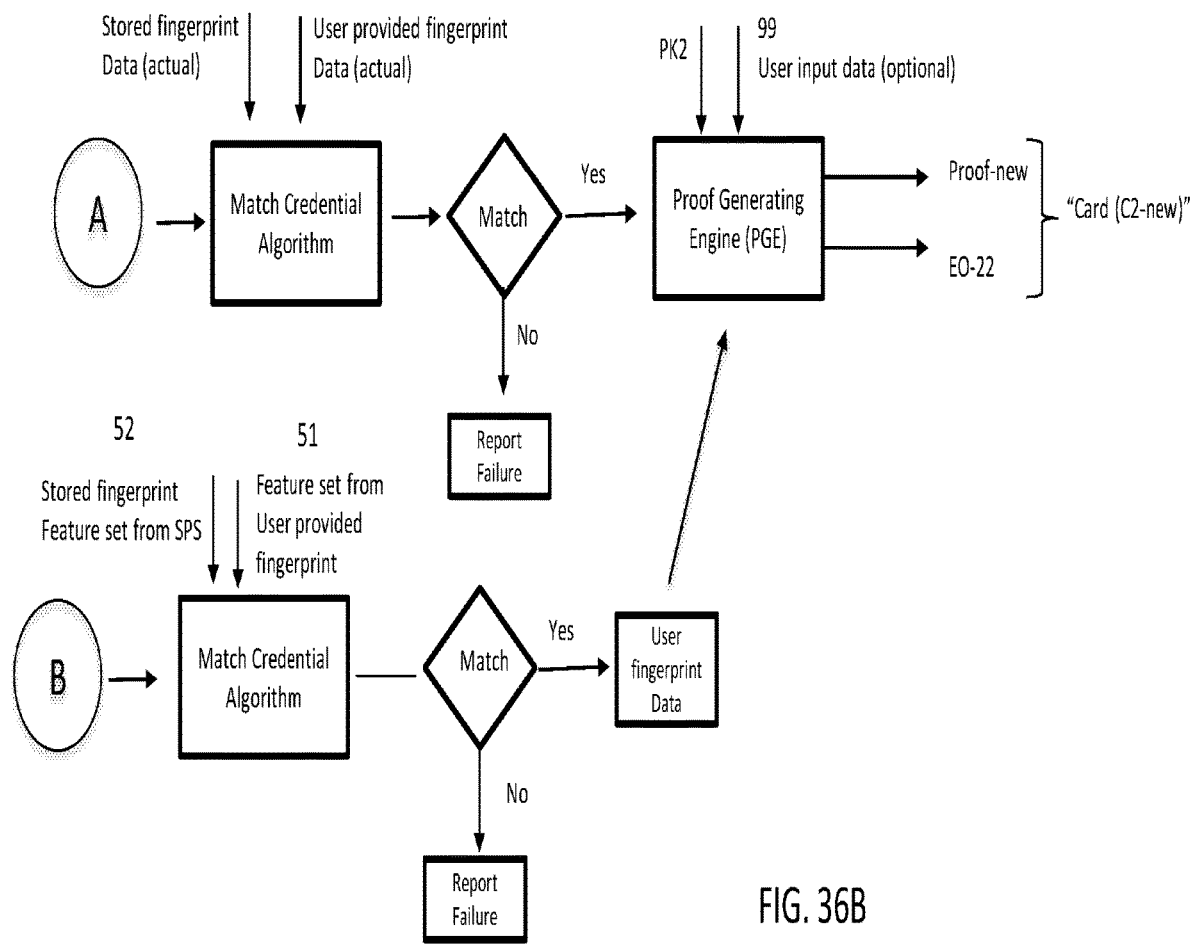
FIG. 36B

DATABASE SYSTEM FOR PROTECTING AND SECURING STORED DATA USING A PRIVACY SWITCH

CROSS-REFERENCE

This application is a divisional of U.S. application Ser. No. 15/877,527, filed Jan. 23, 20218, which is a continuation-in-part of U.S. patent application Ser. No. 15/671,021, filed Aug. 7, 2017 and claims the benefit of Provisional Application Ser. No. 62/385,515, filed Sep. 9, 2016, the contents of both applications being incorporated herein by reference.

BACKGROUND

Service experiences abound on the Internet and the Web. New inventions such as block-chain based systems envision computer programs called smart contracts to provide services to smart devices such as autonomous cars. It is further envisioned that an overall service experience may be disaggregated into multiple components wherein more than one service provider may provide the individual components. Many smart devices, smart computer programs and service experiences also utilize data obtained from sensor devices located in user computing devices or physical environments wherein user devices are proximately located. Thus, service experiences entailing the use of autonomous cars may collect increasing amounts of user data. Most service experiences are also based on user provided information. Consumers have increasingly shown signs of being concerned with preserving user data privacy. A service provisioning system that preserves user data privacy in online networks with sensor devices collecting increasingly larger amounts of user data will thus be of great social value and commercial benefit.

SUMMARY

In accordance with one aspect of the subject matter described herein, a system and method is provided for storing user data records in a database to protect stored data from data breaches, where each of the user data records including a plurality of user attributes. In accordance with the method, at least one of the plurality of user attributes in each of the user data records is designated as a private attribute. The private attribute in each of the user data records in the database is replaced with a designated identifier that uniquely identifies the private attribute while obfuscating the private attribute. The private attributes are sent over a communication network to user communication devices respectively associated with each of the user data records that include the private attributes such that the user communication devices are caused to store the private attributes they respectively receive and generate credentials representing the private attributes that are authenticated upon being verified by a verifying entity without disclosing the private attributes.

In accordance with another aspect of the subject matter described herein, a method and apparatus are provided for maintaining user privacy when storing a user data record associated with a user in a database. In accordance with the method, a user communication device associated with the user receives over a communications network at least one of a plurality of user attributes in the user data record that is designated as a private attribute. The private attribute is replaced in the user data record by a designated identifier that uniquely identifies the private attribute while obfuscating the private attribute. The private attribute is stored in a memory associated with the user communication device. A credential is generated by the user communication device. The credential represents the private attribute that is authenticated upon being verified by a verifying entity without disclosing the private attribute. The verifying entity is configured to receive and respond to a request for verification of the designated identifier from a second entity having authorized access to the database. The verifying entity is further configured to send the private attribute to the second entity only if the credential is verified. The credential and the designated identifier are sent to the verifying entity in response to a request from the verifying entity.

In accordance with yet another aspect of the subject matter described herein, a system and method are provided for providing user data to a third party while maintaining user privacy. In accordance with the method, a session is established in a computing environment to execute a first executable computer code in a virtual machine. The first executable computer code is associated with a database provider. A second executable computer code is caused to be inserted into the session. The second executable computer code is associated with a verifying entity. A request is received from a third party from outside of the session to obtain user data for a user having a user data record maintained by the database provider. The request identifies the user by a designated identifier stored in the user data record. The designated identifier replaces at least one private attribute of the user data record. The at least one private attribute includes one or more key attributes of the user data record. The user data record includes an encrypted data object in which the at least one private attribute is encrypted. Responsive to the request, a third executable code is caused to be inserted into the session. The third executable code is associated with a user communication device associated with the user. Further responsive to the request, the third executable code is caused to send a credential to the second executable code within the session. The credential is associated with the at least one private attribute of the user data record. Upon verification of the credential by the second executable code, the at least one private attribute and the designated identifier are received in the session from the third executable code. In response to receipt in the session of the at least one private attribute and the designated identifier, the user data record stored in the database is accessed. The at least one private attribute is verified using the encrypted data object and, if verified, the user data record is sent to the third party outside of the session without including the at least one private attribute.

BRIEF DESCRIPTION OF THE DRAWINGS

FIG. 1 shows elements of a decentralized transaction in an online purchase of a book.

FIG. 2 shows exemplary linking information implicit in a decentralized transaction.

FIG. 3 shows one example of the overall operating environment of the present invention.

FIG. 6 shows an example of the contents that may be included in the directory.

FIG. 8A shows exemplary computer programs.

FIG. 8B shows examples of computer program instructions and their semantics.

FIGS. 19A, 19B and 19C show illustrative components that are inputted to and outputted by KGE.

FIGS. 20A and 20B show illustrative components that are inputted to and outputted by PGE.

FIG. 21 shows an illustrative working of the PVE.

FIG. 23 shows exemplary approximate objects.

FIG. 25 shows an exemplary database for a credit reporting agency.

FIG. 26A shows the database table of FIG. 25 after modification.

FIG. 26C shows the SPS table associated with the modified database of FIG. 26B.

FIG. 28A & FIG. 28B show the watch maker's database after modifying and the associated user communication device(s).

FIGS. 29, 30 and 31 show exemplary databases for social networking sites, the modifying of their databases and the associated SPS tables and user communication devices.

FIG. 36B shows modifications to the Proof Verifying Engine for handling lost user communication devices.

Figure 4A:
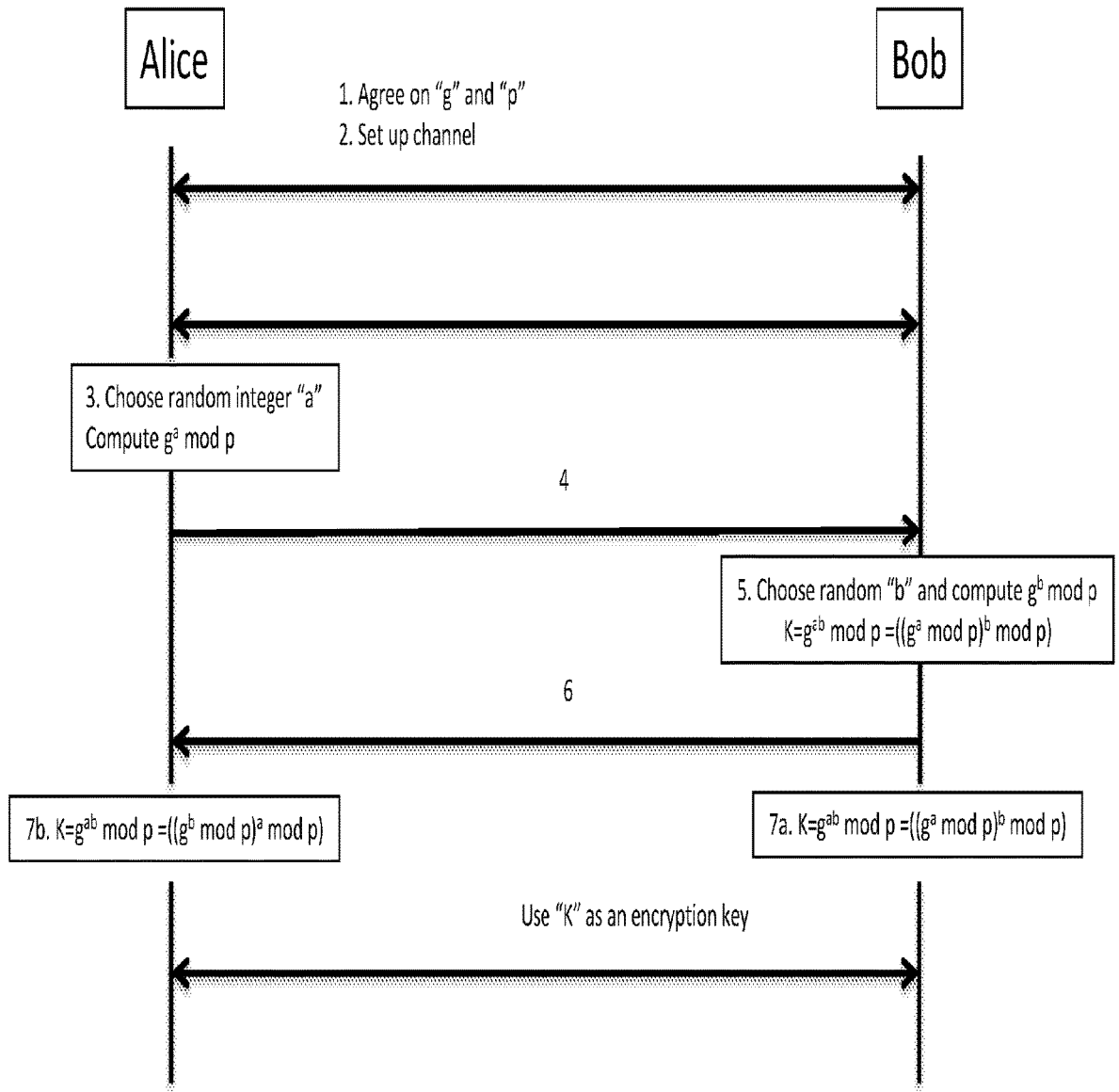
FIG. 4A shows a conventional DH algorithm.

Some drawings show message sequence diagrams depicting exemplary interactions between computer programs. Such drawings do not, in general, depict the physical computers on which these programs, i.e., computational entities, may run.

DETAILED DESCRIPTION

Motivation

Web services and the business model of the web are critically dependent on data gathered from and about consumers. Customized, personalized services and user experiences are crafted using data gathered from consumers and, in some cases, acquired from third party providers. Advertisements, marketing of content and services, recommendations, etc., are all based in part on user data and the results of its analysis. As the web evolves to support sensors and sensor-based devices such as smart cars, smart household appliances, etc., the gathering of user data is expected to increase.

Concomitantly, the user community is becoming aware of the fact that web enterprises store large amounts of their personal data and this awareness is leading many users to question the storing and use of user data. Concerns regarding privacy of data are on the rise. Outages and breaches of data at enterprises and hacking of enterprise software systems exacerbate such concerns.

In some embodiments, the present invention describes system and methods by which an open decentralized marketplace may be constructed that offers several features that address these concerns. The term "open" refers to the possibility of having multiple service providers interacting without proprietary interfaces. The term "decentralized" refers to the notion that no single entity is in control and that various entities may combine to offer an overall service.

The invention described herein allows users to reveal selected elements of personal data to one or more service providers and obtain services. However, such provisioning of user data is controlled by the user who reveals his data to a computational entity that, by design, cannot retain the provisioned data or its memory. That is, the computational construct receives the user data, executes itself in an environment that is "sterile" in a sense described later, and then terminates itself.

The one or more service providers may be organized as individual entities performing distinct functions that taken together constitute the product and/or service provided to the user. As an example of such an arrangement, consider an online book seller, payment processor and shipper that enter into a business arrangement by which a user may purchase a book from the seller, pay for it using a payment processor and receive it in a shipment managed by the shipper.

In the present invention, the book seller, payment processor and shipper are represented by executable computer code such as computer programs or apps that are specially configured (described in more detail later) and which are received, e.g., downloaded, by user devices. The user devices then inject the programs into a (distributed) computing environment containing a database processor. For purposes of illustration the individual executable computer codes will be referred to as computer programs, but more generally any suitable type of computer code may be employed that is configured in the manner described herein.

Before proceeding further, it will be helpful to define a number of terms that will be used throughout the description.

As used herein, the term "virtual machine" is to be given its conventional meaning as used by those of ordinary skill in the art. Generally, a virtual machine is an emulation of a physical computer system using hardware, firmware, software or a combination thereof. For instance, "operating system level virtualization" is one known technique for implementing virtual machines. In this technique, a physical computer is virtualized at the operating system level, enabling multiple "isolated" and "secure" "guest" (software) machines, i.e., virtual machines, to run on a single physical computer. The term "secure" implies that only pre-determined operations can be executed in the guest machine. The term "isolated" means that the operations may not access resources in other guest machines. All guest machines share the same kernel but may have individual user spaces. Thus, computer/application programs running in a guest/virtual machine view it as a standalone computer system. Examples of software systems using operating system level virtualization techniques include Solaris Containers, iCore Virtual Accounts, Linux-VServer, etc.

We note that another known technique for supporting virtual machines uses a hypervisor or virtual machine monitor that allows guest machines to run their own kernels. For example, hypervisor may support three guest/virtual machines running macOS, Windows, Linux, respectively, on a single physical computer. Major Unix vendors sell virtualized hardware, e.g., Sun Microsystems, HP, etc.

In the descriptions that follow, a computing environment (or simply, environment) is a programmable arrangement of hardware, software and/or firmware. The term "distributed computing environment" refers to an inter-connected programmable arrangement of hardware, firmware and software. The term "database processor" may denote, in one embodiment, an operating system (OS) of a (distributed) computing environment, the OS being suitably configured to support features such as virtual machines, session management, etc., as described herein.

The term "session" as used herein refers to a process of information exchange between two or more communicating devices or computer programs in which information used in the exchange may be stored in a specific memory or set of registers that are then cleared ("torn down" or "terminated") later. Devices and/or computer programs may also be invited and removed from a session or may initiate or terminate one or more dialogs during a session where a dialog is a sequence of data items exchanged between devices and/or computer programs.

Certain operations in common use such as login, logout, registration, de-registration, etc., may incorporate or entail one or more aspects of our notion of a session. Thus, a client device logging in to a server may incorporate establishing a session between the client and server. A computer program may register itself with a server providing instant messaging services; such an action may also entail establishing a session.

We will also have occasion to use the term "ephemeral". The term denotes a data item that comes into existence in a session created by a computer program and is cleared before the session is terminated or as a part of the termination process of the session. For example, a computer program operating in a session may receive and store an input data item from a user, or it may read a data item from a memory unit. The computer program may then finish execution and the session may be terminated, cleared or torn down. As a part of the session termination process, the memory unit and any internal registers of the computer system are also cleared. In this way, the data items are deemed to be ephemeral.

It should be noted that the data processor performs various actions that are not performed by conventional database processors. In particular, the database processor is configured to carry out three actions.

First, when connected to a user computing device that is seeking service, the database processor creates a session between the user computing device and itself. In some embodiments, the communication channel used to exchange data between the user device and the database processor is preferably secured. One example of such a secure protocol that may be employed is discussed below.

Second, the database processor produces one or more virtual machines (VMs) that are provisioned with one of the aforementioned computer programs. The VMs may be produced sequentially or in parallel. Each VM executes one of the provisioned computer programs, each of which may produce output that is restricted as explained later. The VMs are configured to terminate themselves at the conclusion of the execution of the provisioned computer program.

Finally, the database processor terminates the session established between the user device and the database processor. This action may occur if, e.g., the database processor determines that the service request from the user device has been satisfied, or if the database processor receives a special command from the user device. The database processor clears any data outputted by the various VMs during the session. We may say that the session has been "cleared" or that we "tear-down" the session to stand for the operation of clearing the outputted data.

Thus, while the term "database processor" is known in prior art, it will be seen that its use in the present invention requires several new innovations and features, e.g., the creation and management of virtual machines, etc.

Illustrative Example (Purchasing Books Online)

We begin by considering an illustrative example of a web service provider such as an online bookstore. Currently several such establishments exist, and they typically allow consumers to browse and select books and purchase titles through an in-house payment system. Purchased books may then be delivered by another in-house shipping operation. The online bookstore, thus, provides a "single stop" service.

The information that consumers are required to provide to such service providers may comprise user name, billing address, shipping address, telephone number, credit card information, email address, and user ID/password. (The service provider may also acquire additional information about consumers and their actions from third-party providers who gather information about users from cookies and other mechanisms.)

A consumer may be entitled to ask if all such information needs to be provided. If we assume the enterprise to be decentralized into separate entities such as Seller, Payment and Shipper entities then a consumer may be able to provide only proper subsets of information to the individual entities. For example, only his shipping address may be provided to the Shipper who has no need for any other information. Similarly, the Seller needs only the title being purchased if the payment for the title can be authenticated. The Payment processor needs only to authenticate the consumer and the funds.

Thus, by decentralizing the online service provider into separate entities, a consumer may be able to provide subsets of his information, as needed, to the various entities.

However, the consumer is now burdened with performing actions to manage "linking information" that binds the individual actions (or sub-transactions) into a single transaction. In other words, the individual sub-transactions may comprise selecting a book, making a payment and arranging a shipment. The linking information tells the Payment processor which Seller and title is being bought. Another piece of linking information tells the Shipper what title and where to pick up the shipment. The Seller needs to be told by the Payment processor which title is being paid for and on behalf of whom. Etc.

Since consumers do not want to be burdened by such actions, online systems allow state information to be passed between entities, e.g., Seller, Payment and Shipper. The state information contains contextual information that allows individual sub-transactions to be linked together into a single transaction. In prior art, terms such as tags or tokens have been used to describe computational constructs that contain shared state information.

Automated sharing of tokens and tags between business entities allows consumers to be freed from managing the "linking information" associated with the individual sub-transactions. However, on the downside, it is possible for a third-party to use the shared token/tags to re-construct the entire transaction, resulting in the gathering of user information into a user profile. For example, user information contained in browser "cookies" is routinely used to construct integrated profiles of users.

A related problem is that entities receiving and using shared tokens/tags must trust these instruments. Malicious users may insert spurious or malicious information into a token or a tag, e.g., re-direct funds or shipments to a malicious address.

It would, therefore, appear that decentralizing a service provider into separate entities still allows third-party enterprises to aggregate user information. It also introduces additional security and trust concerns regarding shared information.

Thus, it would be desirable to have an invention that provides a system and methods providing the following features.

Online services are provided by a group of computer programs organized as an open decentralized marketplace, i.e., a distributed computing environment or network of computer programs. That is, business entities are represented by computer programs that are inter-connected by an open networking environment.

User information is partitioned into two classes (i) explicit information, and (ii) latent information. Explicit information is provided to a computer program by the consumer so that it may perform its functions, e.g., shipping address provided by a consumer as it is needed by a program so that the consumer may receive goods at the indicated address. Latent information, e.g., location information, is provided by sensor devices associated with a user device.

It is not possible to link information outputted by the computer programs to obtain an integrated user profile.

The user may experience an integrated experience despite the above requirements.

An exemplary online transaction by which a consumer purchases a book and has it delivered to his address comprises the following. (Names beginning with a capital letter in the descriptions below denote computer programs.)

The Seller requires that the customer must be located within a pre-determined geographical area at the time of ordering, e.g., state of New York. (One reason for such a restriction may be local tax laws.)

The customer must arrange payment from the online Payment Processor. Seller needs proof of payment, i.e., payment amount and title.

Payment Processor needs to authenticate the user.

Purchased titles will be made available by Seller to be picked up by the Shipper. Shipper needs a token (provided by the consumer in one embodiment) information to pick up shipment and the delivery address. Shipper needs verification that Seller has authorized the title to be picked up.

We assume consumers interact with the computer programs in the computing environment using devices, e.g., smart phones, hereinafter referred to as user computing devices. Thus, a consumer may also be thought of as being represented by a computer program running on his computing device. A consumer, John, wishing to purchase a title from Seller, utilizing prior art, may undertake the following sequence of steps (cf. FIG. 1).

In step 1, John visits Payment Processor and establishes an account by providing information, as needed, to the Payment Processor. (Note: This action may be considered as being a part of an initial setup phase.) John is issued an account number for future use.

In step 2, John visits a Location Certifying Authority (LCA) and provides data from his GPS-enabled mobile device. LCA issues a token (Token-1) to John indicative of his location.

In step 3, John visits Seller and provides Token-1 to the Seller who verifies that the token is valid and that John's location satisfies Seller's constraint. John selects a title to be purchased. Seller issues him a token (Token-2).

In step 4, John provides Token-2 to the Payment Processor who verifies that the token is valid, authenticates John, and provides a token (Token-3) to John indicating that he has processed a payment as per information contained in Token-2.

In step 5, John re-visits the Seller and presents Token-3. Seller verifies that Token-3 is valid and that he has received the payment for the selected title. As a by-product of the verification, Seller receives information about the title being purchased, payment amount and some information about the purchaser, e.g., John's name or customer number. Seller issues a new token to John (Token-4).

In step 6, John visits Shipper and presents Token-4. Shipper verifies that the token is valid and that the shipment is ready and obtains a delivery address as a by-product of the verification process (as explained later).

In step 7, using Token-4, Shipper picks up the shipment from Seller and delivers it to the delivery address provided in step 6.

(We have assumed a certain distributed arrangement of service providing entities above for illustrative purposes; in practice, one or more of the service providing entities may be combined or further partitioned without limiting the present invention.)

The following observations are noteworthy about the above process.

The user must perform six of the seven steps (including the initial setup step).

The total amount of information the user provides is the same whether the consumer is provided service by a single provider or a collection of providers.

It should also be observed that the computer programs may verify information by using the various tokens. First, the Seller can verify that the purchaser satisfies the location constraint using token-1. Next, the Seller can verify that a purchaser has paid for a purchase (using token-3) and that the purchaser satisfies the location constraint (token-1). As a further example of the linking phenomenon, note that the Shipper can verify that a shipment is ready, that the shipment has been paid for, and that the purchaser satisfies the location constraint. The arrows marked A, B, C and D in FIG. 2 depict the linking phenomenon.

In other words, an entity that has access to all the tokens may effectively re-construct the entire transaction and, thus, derive an integrated user profile.

It is worthwhile here to note that advanced decentralized and open systems and environments such as Bitcoin and ledger-based block-chain systems have reported that certain entities have been able to link information from computer programs, e.g., smart contracts or transactions, and create composite user profiles.

Thus, to protect the user's private data, it would be desirable to have a solution that prevents a third-party to construct such integrated/composite user profiles using customer data, e.g., by putting together the linking information A, B, C and D in FIG. 2. This is the goal of the present invention.

In the following descriptions, we note two cases.
1. User data may be obtained by computer programs from sensors located within a user device, e.g., GPS location data from a smartphone, or from sensor devices external to the user device, e.g., a fitness bracelet associated with a user's smartphone.
2. A consumer may provide information by user input to a service provider, e.g., by entering a shipping address, or the user's device may provide user data via one or more applications running on the user device.

Some embodiments of the subject matter described herein address both the above cases.

General System and Methods of Invention

FIG. 3 depicts a high-level schematic diagram of one example of an operating environment in which the subject matter described herein may be implemented. Illustrative user computing devices 100 and 150 may be associated with internal sensors, e.g., sensor 51, or external sensors, e.g., sensor 52. The external sensors may communicate with its respective user device over a communication link such as Bluetooth, Wi-Fi, etc. Examples of user computing devices include, without limitation, mobile communication devices (e.g., cellular phones, smart phones), personal computers, laptops, tablet computers, smart watches, wearable computers (e.g., fitness bands), personal digital assistants (PDAs), wearable medical devices such as smart bandages and the like.

User computing devices may be connected, using wireless and/or wired networking links, to a distributed computing environment 200 that contains a database processor 203, i.e., a hardware processor that runs a computer program that executes computer programs supplied to it, akin to a compiler that executes computer programs. To carry the analogy forward, a compiler executes programs written using computer programming or specification languages such as FORTRAN. The database processor executes computer programs using a specification language described below.

The database processor 203 when requested to execute a suitably specified computer program produces a computational object called a session, such as sessions 202-1 and 202-2 shown in FIG. 3. The database processor 203 may have any number of sessions operating at any given time within the distributed computing environment 200. A session may contain one or more virtual machines VMs. In the example of FIG. 3 the two sessions 202-1 and 202-2 contain several VMs 204.

A session also contains a data store in which the data is categorized into two lists, called TL (Token List) and PL (Program List). For instance, session 202-1 includes data store 201-1 and session 202-2 includes data store 201-2. Typically, only one data store per session is created. Details of the operations performed by the database processor on data in the TL and PL lists are provided later.

In practice, in some embodiments the database processor may be implemented as a computer virtualization program in which the kernel of an operating system allows the creation and termination of one or more user spaces wherein one or more session objects may be created. The database processor creates one or more VMs in a session object that operate on the TL and PL lists in the data store in the session. Computer software virtualization is well-known in prior art.

Data from Sensor Devices

A user computing device is a device containing one or more processors with one or more network connections (fixed and/or wireless) and possibly one or more sensors that detect the state of the device or its environment. As previously mentioned, examples of user computing devices include smart phones, tablet computers, laptop/desktop computers, smart cars, smart household appliances, wearable computers, etc.

Referring to the illustrative example in FIG. 3, we note that the sensor 51 may produce data such as e.g., geographic location data, ambient temperature, user motion data, etc., that is received by the distributed computing environment 200 from the user device 100 and stored in data store 201.

A computer program operating on such sensor data may need to ensure that the data is being produced by a trusted sensor. To achieve a trust model, one implementation proceeds as follows.

We require that a sensor (internal or external) associated with a user computing device that is to provide data to a computer program must first be registered with the computer program.

Establishing a secure connection between two entities is well-known in prior art. For example, we may use the Diffie-Hellman (DH) method. The DH algorithm operates by constructing a secret that is shared by the two communicating parties. It works as follows.

Let the two parties be named as A and B. (We may assume the A and B to be computer programs.) A and B agree on two prime numbers, "g" and "p". Next, A generates a secret number, say "a", and B generates a secret number "b". "A" computes:

$$g^a (\bmod\ p) = x$$

and B computes:

$$g^b (\bmod\ p) = y$$

A and B exchange the computed numbers "x" and "y". "A" discovers that the number, "y", he receives from "B" is equal to the number he had generated, viz., "x". Similarly, B discovers that the number he receives, "x", from A is equal to the number, "y", he had generated. The mutually agreeing discovery is based on the mathematical property of exponentiation and commutativity of integer multiplication:

$$(g^a \bmod p)^b (\bmod p) = g^{ab} (\bmod p)$$

$$(g^b \bmod p)^a (\bmod p) = g^{ba} (\bmod p)$$

FIG. 4A shows two computer programs named Alice and Bob using the conventional DH protocol/method to secure an open channel. We briefly describe the DH protocol to familiarize the reader with the notion of protocols.

In step 1, both Alice and Bob agree on the integers "g" and "p" and in step 2, a secure channel is set up between them using the standard DH algorithm. In step 3, Alice chooses a random integer "a", computes ($g^a$ mod p) and sends the result to Bob in step 4. Bob chooses a random integer "b" in step 5, computes ($g^b$ mod p) and sends the result to Alice in step 6. In steps 7a and 7b, both Alice and Bob compute K=(gab mod p) as indicated. In step 8 both agree to use the computed "K" as an encryption key for future messages exchanged between them.

Use of the DH protocol assures programs Alice and Bob that they may securely exchange messages between themselves over an open public channel if they use the computed key "K". That is, Alice wishing to send a message "m1" to Bob, encrypts it using a function encrypt(m1, K)=m2. Bob, upon receiving "m2", may decrypt it using a function decrypt(m2, K)=m1.

Whereas the DH algorithm for secure communications between two parties is well-known, it may also be extended for three or more parties. However, such extensions may involve extra exponentiation/encryption steps to be carried out by the participating parties. In some cases, we may also need multiple messages to be broadcast between all the communicating entities. Since, exponentiation is an expensive process, and we may have many sensor devices associated with a user device, such extensions to DH may become prohibitively expensive. Also, hardware capable of doing exponentiation operations (or do them quickly) may not be available in sensor devices. Thus, when considering the use of DH in channels with multiple sensor devices, we may wish to use less computationally expensive methods.

It is known that the DH algorithm has vulnerabilities in certain situations. (Techniques are also known that may be used to mitigate these vulnerabilities.) However, our method of associating sensor devices with a first party that has established a secure channel with a second party does not depend on using the DH algorithm to set up the secure channel; any algorithm that establishes a secure channel between two parties may be used.

Thus, our description of the DH algorithm above is purely pedagogical and serves as an enabling example. Any method that establishes a secure channel between two parties may be used in conjunction with our method.

We now present our method and note that it is light weight and allows associating multiple sensor devices with a user computing device. That is, we consider channels in which sensor devices (s1, s2, s3, etc.) may be associated with a user computing device "ud" that, in turn, has a secure connection to a computer program "A" operating on data stored in database "db". We may depict this situation as follows.

[s1, s2, s3, . . . ] ud db---A

Figure 4B:
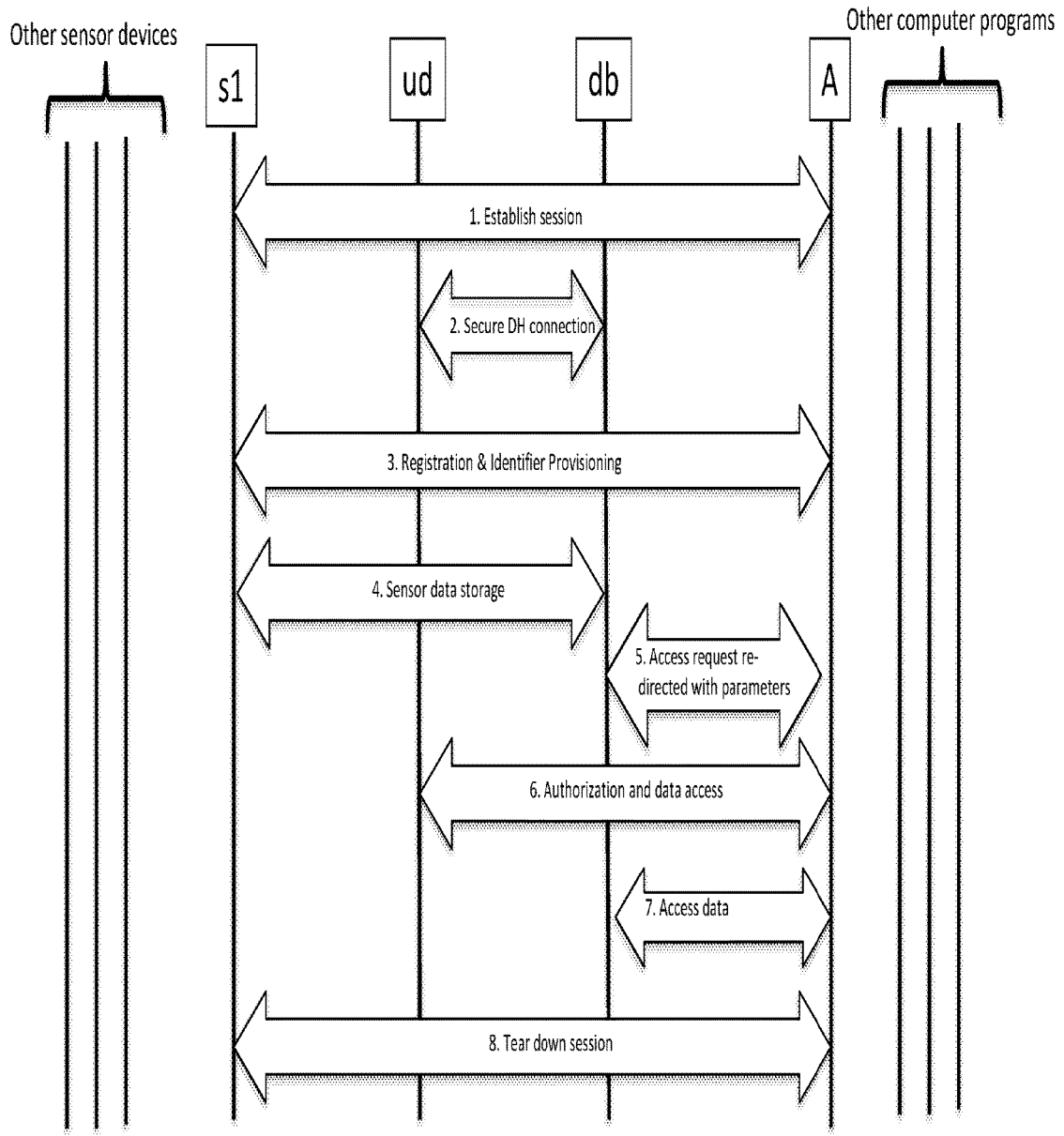
FIG. 4B shows an illustrative extension of DH algorithm.

Our approach may be generally described as the following sequence of steps (FIG. 4B). The illustration shows a single sensor device registered with a computer program. In practice, several sensor devices may be registered with a single computer program. A sensor device may also be registered with more than one computer program.

1. Establish a session between the "ud", the "db" and the computer program "A".
2. Establish a secure connection between "ud" and "db" using a suitable algorithm. In one embodiment, we use the DH algorithm to establish the secure connection, thus the "ud" and "db" agree on an encryption function, say K (based on the shared secret), the prime base "g" and modulus "p".
3. The program "A" requests the sensor device to register itself and issues a registration identifier to the sensor device. The latter provides a hashed version of the identifier to the user device. Note that the function used herein is different than the agreed upon hash function in step 2 above.
4. The sensor device sends sensor data to "db" that causes it to be stored.
5. "A" requests sensor data from "db" and is re-directed to "ud" along with certain parameters.
6. "A" requests and receives authorization from "ud" based on the parameters from step 5 and its previously issued identifier (that is only known to "A" and sensor device, "s1").
7. Upon being authorized, "A" accesses data from "db".
8. The session established in step 1 above is cleared.

Figure 5A:
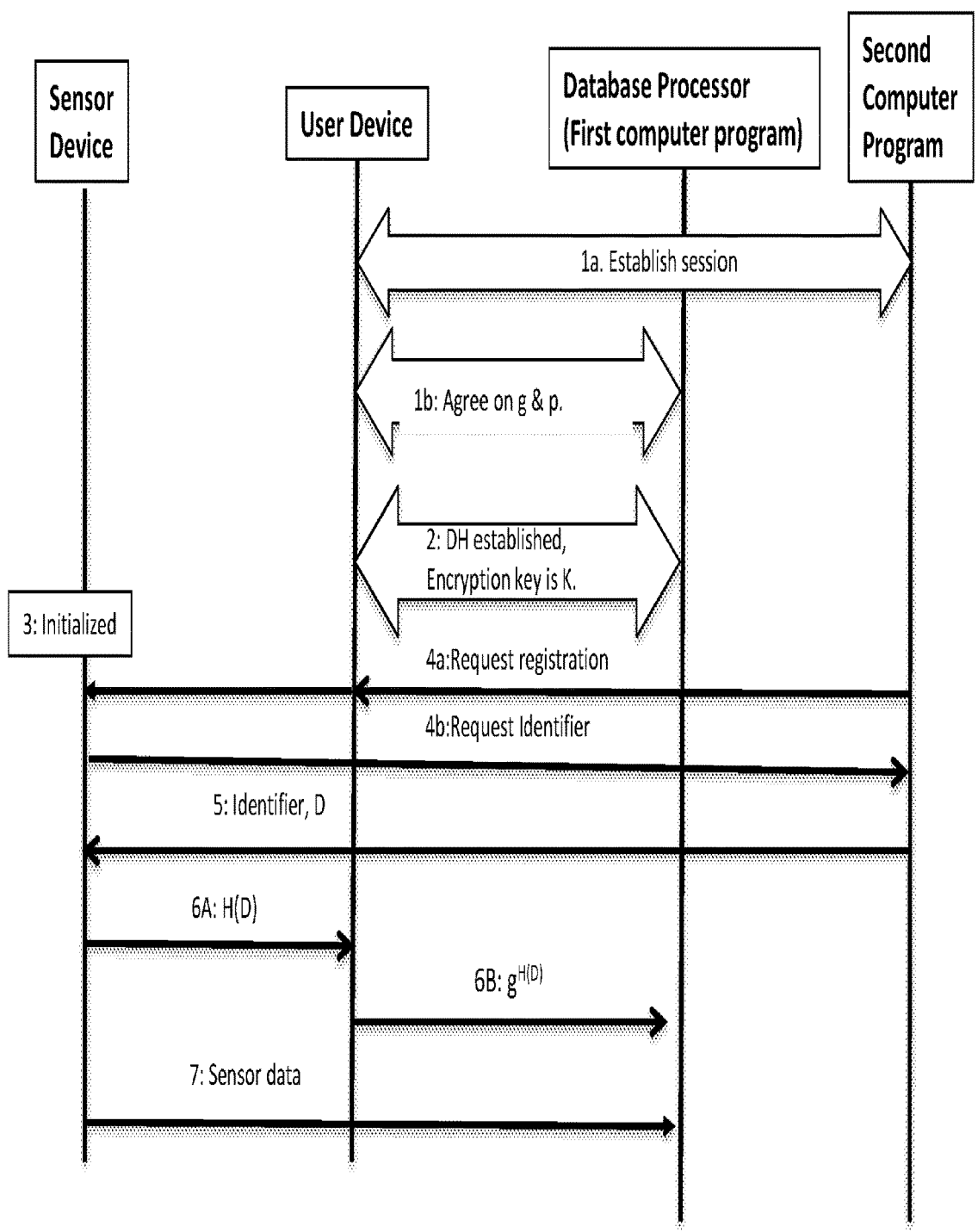
FIGS. 5A, 5B and 5C illustrate the operation of the extension to the DH algorithm.

We now provide a fuller description of the above process with reference to FIG. 5A.

In steps 1a, we establish a session between the user device, a first computer program (which in some embodiments may be the database processor referred to herein), and a second computer program. In step 1b, the user device and the first computer program agree on "g" (prime base) and "p" (prime modulus).

In step 2, we establish a secure channel between the user device and the first computer program. Either DH or some suitable algorithm may be used. We assume the use of DH for illustrative purposes.

In step 3, the sensor device is initialized, i.e., its software logic is triggered or launched, and in step 4a, the second program issues a registration request to the sensor device. We may assume that the second computer program needs the sensor data. The request is sent to the user device since the second computer program may not know the address of the sensor device. The user device forwards the request to the sensor device, along with the address of the second computer program.

In step 4b, the sensor device requests the second computer program for an identifier and it is provided the identifier denoted "D" in step 5. It is also provided with the name of an encryption function, say H, (or the executable code of the encryption function). (For example, the sensor device may have been pre-provisioned with one or more encryption functions by its manufacturer). In step 6a, the sensor device hashes "D" using function "H" and sends the result to the user device. Note that the user device is unaware of "D", it only receives H(D). It is required that the encryption function "H" be different from the encryption function "K" from step 2.

In step 6b, the user device computes g^H(D) ("^" denotes the exponentiation operation) and sends the result to the database processor. In step 7, the sensor device starts to generate sensor data and sends it to the database processor who causes it to be stored for later retrieval by other computer programs.

Figure 5B:
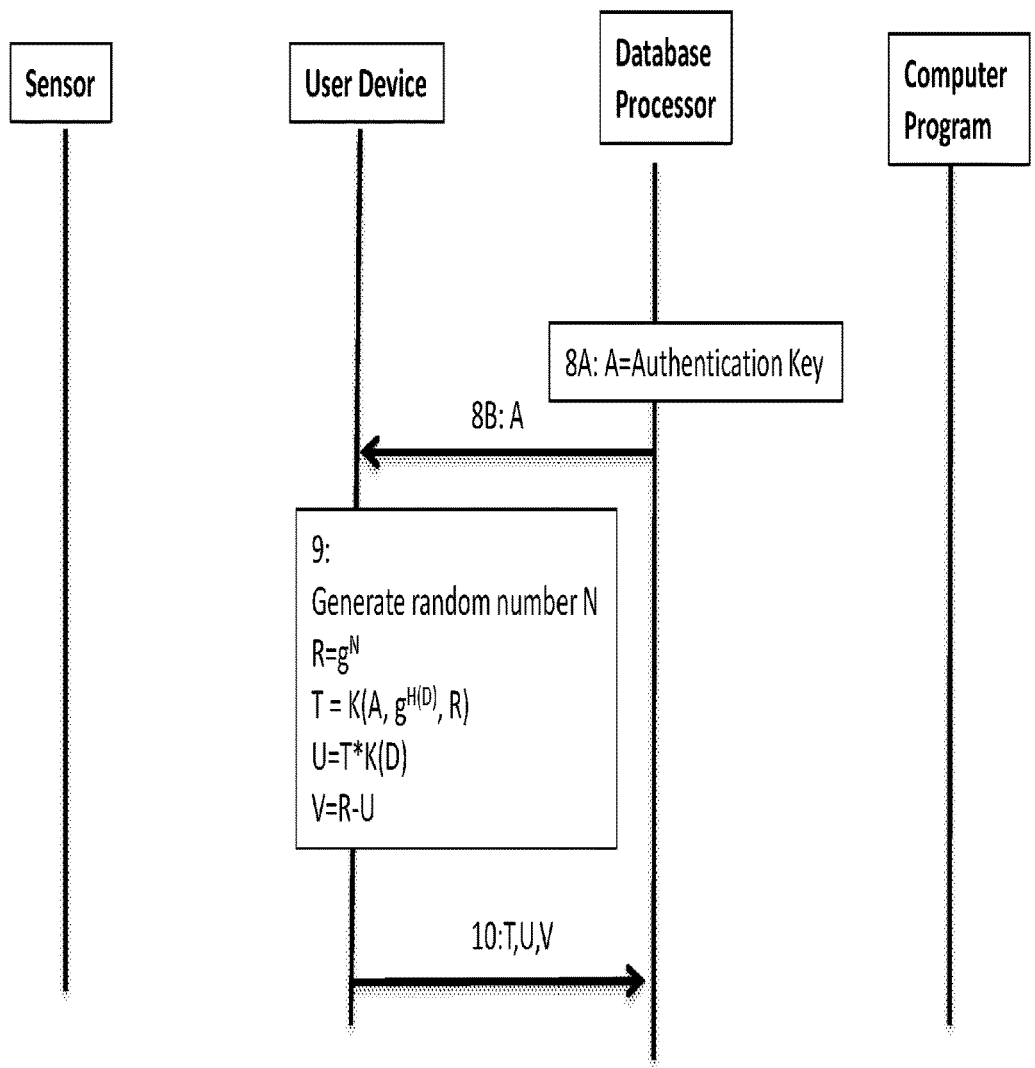

Anticipating that one or more computer programs may request access to the sensor data and that it will use the user device to authorize the requests of such computer programs, the database processor generates an authentication identifier, A, and sends it to the user device (steps 8A and 8B, cf. FIG. 5B).

The user device now performs the series of computations shown in step 9 (FIG. 5B). The goal of these steps is twofold. First, we wish to incorporate the sensor device identifier and the authentication identifier into a secret. This will allow the user device to verify the sensor device when requested by the database processor.

Second, incorporating the authentication identifier into a secret will allow the user device to verify the sensor device to a second computer program (different than the database processor) when requested (as shown below).

The computation shown in step 9 (cf. FIG. 5B) results in the derivation of 3 parameters T, U and V that are associated with the authentication identifier produced by the database processor and the identifier "D" assigned to the sensor device. (Note, that all identifiers are required to be integers so that we may perform the stated computations.)

In step 10, the user device sends the parameters T, U and V to the database processor for storage. It is to be noted that the database processor and the user device have previously agreed upon the prime base "g" when setting up the DH secure channel, and that it is computationally hard for an entity, e.g., the computer program shown in FIG. 5B, that does not know "g" to derive the parameters T, U and V. Note also that the authentication identifier "A" provided by the database processor to the user device is needed for computing the parameters.

Figure 5C:
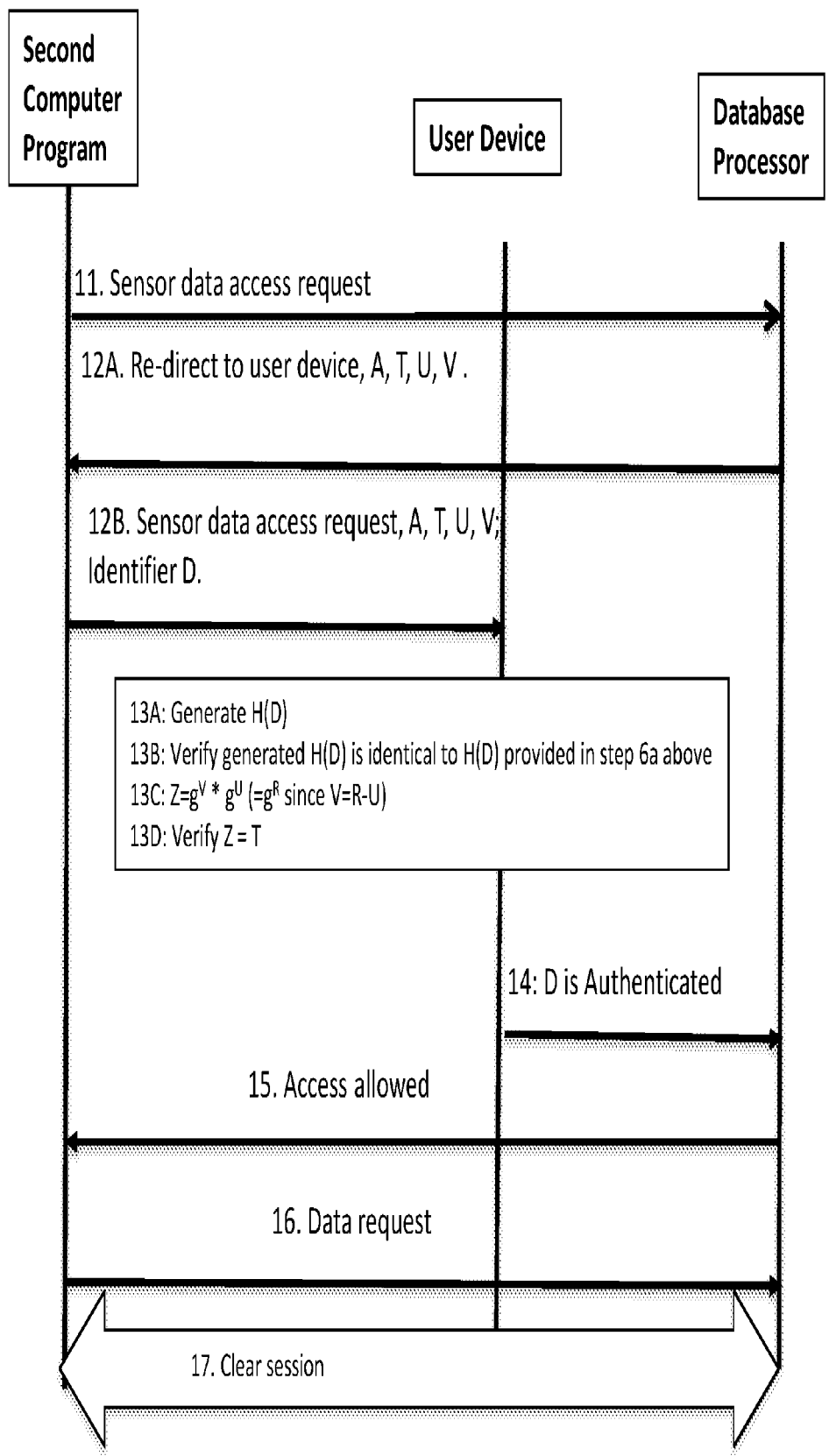

Having set up the channel and stored the various derived parameters, we now consider the case wherein a second computer program requests access to the sensor data (step 11, FIG. 5C). The database processor, by one of the tenets of the present invention, needs permission from the user device. Contemporaneously, the second computer program wishes to be ensured that the sensor device is authorized to provide the requested information.

To achieve these two goals, the computer program is re-directed (step 12A) to seek permission from the user device. The re-direction instruction is overloaded by providing it the parameters A, T, U and V previously associated with the sensor device and stored in the database by the user device, as shown in FIG. 5B.

In step 12B, the second computer program sends the identifier "D" (only known to the second computer program and the sensor device) and the parameters A, T, U and V to the user device. The latter (steps 13C and 13D) uses U and V and the prime base (known only to it and the database processor) to derive Z (as shown) and compares it to the value of T (received from the second computer program). (Note that Z depends on knowledge of U and V that in turn depend on knowing U, V, A, etc.) A successful match assures the user device that the A, T, U and V parameters were provided to the second computer program by the database processor. (Recall that it is computationally hard for a computer program to generate T, U and V without knowing "g" and the encryption key K.)

Furthermore, the user device computes H(D) in step 13A and in step 13B compares it to the hashed value of "D" it received from the sensor device in step 6a. A successful match indicates that the second computer program provided the identifier to the sensor device.

In step 14, the user device marks the identifier "D" as having been authenticated and sends it to the database processor who may in step 15 allow access to the second computer program. The second computer program may now, in step 16, use the authorization provided by the database processor to issue a data access request to the database processor.

Once data access is complete, the session established in step 1a may be cleared (step 17).

Illustrative Embodiment Involving Sensor Devices

As a practical example of the use of the above method, consider a person who owns a smart car (e.g., a self-driving vehicle) that comes equipped with a key fob that allow the person to control various functions of the car, e.g., unlock the car, summon the car to a location where the owner is waiting, etc.

We assume the following correspondences using some of the terms from the descriptions provided above.

1. The key fob of a car corresponds to the sensor device.
2. The owner's smart phone corresponds to the user computing device.
3. A computer program running in a computer environment is to be referred to as a "first computer program".
4. An application program running on one or more processors inside the smart car is to be referred to as the second program.

As another example of a sensor device (different from a key fob), a smart car may have an installed device to manage payment to toll booths, i.e., the toll paying device is triggered by equipment in a toll lane and the device interacts with the equipment to make a payment based on a pre-provisioned bank/credit card account. That is, in this case we may have two sensor devices (i) the toll paying device installed in the car, and (ii) the key fob which is carried by the owner/driver. As explained above, the two sensor devices may establish independent registrations with the second computer program, i.e., the program running in the car's processor(s).

Current toll paying devices, e.g., EZ-Pass in New York, are permanently linked to a user's bank account irrespective of who may be driving or controlling the car at any given moment. Using the inventions described herein, a suitably configured toll paying device may be preferentially installed in the car and tied to a user device carried by the driver. The user device then authorizes the toll paying device to use the bank account designated by the user/owner of the user device. Thus, if user John is driving the car and has his smart phone with him, the toll paying device charges John's account. If the same car were being driven by a different user, say Mary, who is carrying her smart phone then Mary's bank account would be charged for tolls. Thus, e.g., car manufacturers may provide cars with pre-installed toll paying devices. Furthermore, car rental companies may utilize such cars since, in current practice, the rental companies are liable for toll payments since they "own" the toll paying devices, i.e., a toll paying device in the rental car is associated with the rental company's bank account or credit card.

The protocol described above associates the sensor device, e.g., the key fob or the toll paying device, with the user computing device. The user computing device, the first and second computer programs establish a session with a secure channel between the user device and the first computer program. The first computer program may be executed by, e.g., a car manufacturer's cloud computing environment, and the second computer program, e.g., may run on processors provided in the smart car. (In certain embodiments, the cloud computing environment may periodically provide— e.g., using a download operation—executable codes to one or more processors in the car so that no connection is needed to the cloud computing environment.) The second program needs data from the sensor device to provide services to the driver/owner. In some cases, the second program may need to ascertain that the key fob is within a certain distance of the car. In other cases, the second program may need to ensure that the key fob is authorized, e.g., is the key fob authorized by the user device to make a toll payment?

The key fob may be used to launch various services by the owner/driver without being present in the car. For example, a command issued from the key fob may cause the car to be driven to a designated location, or to heat the car's interior to a certain temperature, etc.

It is important to note that the owner/driver's information is not stored in the second program that runs in the car's processor(s). The second program may read the data stored by the first program and use the data. (This aspect is explained further in later descriptions.) At the end of the execution of the second program, the memory of the processor executing the latter program is cleared. At the end of the owner/driver session, session data is also cleared as will be explained below.

Thus, the car's equipment only has access to the user's data whilst its processors are executing services for the user and these processors do not retain the user's data after their execution.

A note on Encryption Keys

In addition to the encryption key agreed upon by the database processor and the user computing device as per the description above, we assume that the user device is provisioned with one or more additional encryption/decryption keys. In examples provided later, we will have occasion to discuss the need to encrypt or decrypt data. To that purpose, such programs are required to seek the relevant keys from the user device that, in turn, may provide the keys using an internal policy, e.g., choose to provide a key at random from the list of provisioned keys, or choose to provide a key that has not been used for some pre-determined amount of time, etc.

Database Processor and Virtual Machines

Having handled sensor data, we now turn to describe the handling of user provided information. For instance, in the example in which the online service provider is an online bookstore, the user provided information will include a shipping address, payment account number, etc. To this purpose, we need to describe further the details of the database processor, i.e., the sessions, VMs and the executable computer codes (e.g., computer programs) that it creates and manages.

One or more service providers create computer programs or apps using a specification language described later which are stored in a directory. In one embodiment, the directory is an internal component of the distributed computing environment 200, FIG. 3. In other embodiments, the directory may be implemented as a standalone system. In one embodiment, the directory contains addresses of online locations (servers, websites, etc.) from which the computer programs may be accessed. Thus, the directory may contain a searchable list of computer programs.

Exemplary computer programs may perform actions of a "Book Seller" or "Payment Processor", "Shipper", etc. Other exemplary service providers may provide programs that enable "smart car services" or "medical services", etc. FIG. 6 shows a few exemplary entries in the proposed directory of programs.

The column titled "Program Name Matching" represents the name of a computer program. The column title "Overall Service Description" represents a general phrase describing the service provided by the named program. The "User Info List" column provides a list of all the user data attributes that will be required from the user for the provisioning of the service if it is requested. It should be noted that proper subsets of these user data attributes are to be provided to the different computer programs that are required to deliver the service to the user. That is, none of the individual programs, including the program provided by the online service provider from whom the user initially requests the service (e.g., the bookseller), is to receive all of the user data attributes included in the "user info list" of FIG. 6. The latter is further discussed below.

It is envisioned that the directory is organized as to enable online searching by the database processor. For example, the column "Program Name Matching" may be organized as a searchable data structure, enabling the database processor to efficiently search and verify the existence of an entry, i.e., a computer program, in the directory. The column labeled "Name & Address of Supplier" is meant to describe the name of the supplier and its online locations, e.g., IP addresses, website addresses, etc., from whom the named computer programs may be obtained. It is envisioned that users may search the directory to find computer programs, e.g., by names of suppliers.

Searching and discovering programs in the directory further implies that a user may state searchable attributes, e.g., find a program enabling buying books. For example, assume a program named "Book" in the directory. It may have associated search attributes such as "buying a book", "cheap books", etc. The column "Search Attributes" in the table of FIG. 6 is intended to convey this notion.

We will also have occasion for computer programs to find "matching" names or other identifiers of computer programs in the directory, e.g., given a name of a program, N, find a computer program in the directory whose name matches the name "N". Thus, we assume that the directory contains entries that contain names or other identifiers of computer programs. The column "Program Name Matching" in FIG. 6 is intended to convey this notion.

In practice, all the various kinds of search mechanisms described above may be combined using Boolean connectives such as AND, OR and NOT. Thus, e.g., find a program with name N, supplied by supplier-3, with attributes "buying books", etc.

A user may search the directory, find a program and may download the program to his user computing device. When seeking service from a service provider, a user may ask the database processor to initiate a session and inject the discovered program into the PL list of the data store of the session (FIG. 3). Alternatively, the user may take actions or issue commands when searching the directory that cause the database processor to create a session and inject the discovered computer program into the PL list of that session. We use the phrase "user device causes the injection of a computer program" to denote either of these embodiments.

To obtain a service or product or otherwise perform any online transaction, a user device issues a request to the database processor. The request causes the database processor to initiate a session, create one or more virtual machines, say VM1, VM2, etc., and initialize the TL and PL lists in the data store in the session (FIG. 3). Note that initially the TL and PL lists are empty. The user device causes a name of a discovered program to be injected into the list PL.

The database processor is further configured to begin monitoring the list PL for names of programs as described later. If a name is found in the list PL, the database attempts to find one or more computer programs in the directory whose names match the name inserted into the PL list.

Since the database processor is monitoring the PL list, it may find one or more computer programs in the directory whose names match the name that was caused to be injected by the user device.

The database processor fetches the one or more matching programs in the directory and inserts each such program into one virtual machine in the session and requests each virtual machine to execute the injected program. As the injected programs begin execution in VM1, VM2, they may produce output. As will be shown later, the output of such programs is generally constrained to be of two forms: tokens that contain encrypted data and the names or other identifiers of computer programs. The names or other identifiers are in the clear.

The database processor is configured to store the (encrypted) tokens that may be outputted by a program executing in a VM into the TL list of that session. Any names of programs outputted by an executing program in a VM are stored in the PL list of that session.

We may thus state a monitoring condition that specifies operation of the database processor:

[Monitoring Condition, MC]. The database processor searches the PL list in each session for the names of computer programs and finds computer programs in the directory whose names match the name(s) in the PL list.

For example, consider a computer program in the directory whose name is "P", i.e., Program: Name="P". Now suppose PL contains the name "P". The matching condition in this case would be satisfied.

When a program executing in a VM terminates its execution, the program and the VM in which it executes are both cleared. When all VMs in a session have been cleared, the session is terminated.

The above process of monitoring the program list, creating sessions and VMs in which programs run and produce outputs that populate PL and TL, etc., continues until no new matches can be found using the MC condition. We may encapsulate the above described process by the following method denoted Method RM:

1. Receive a user request. Create a session and its data store containing the lists PL and TL.
2. User causes the name of a program to be injected in PL.
3. The database processor runs the monitoring process using the condition MC.
4. If successful matches are found, the matched computer programs are fetched from the directory, each program is inserted into a VM that is created for this purpose and the VM is configured to execute the inserted program. The programs may operate on the data in the TL list. Their outputs may comprise names of programs that are inserted into the PL list, or tokens that are inserted into the TL list.
5. A name in the PL list that has been matched against the contents of the directory is removed from the PL list so that duplicate matches do not occur.
6. If a program executing in a VM finished execution, the VM is cleared.
7. Repeat steps 4, 5 and 6 until the PL list becomes empty. Clear the session.

Figure 7:
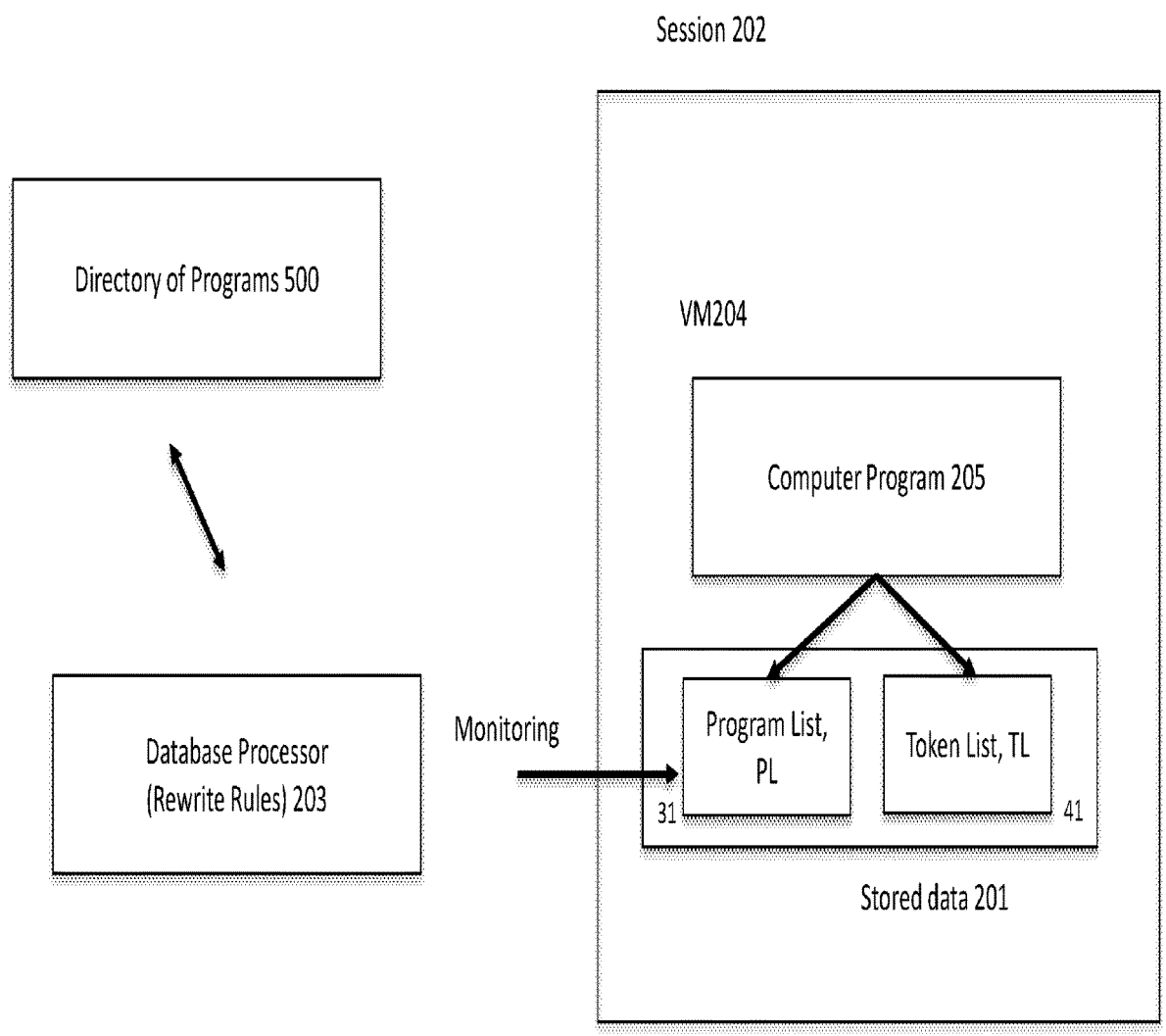
FIG. 7 shows the working of the database processor with respect to a single session containing a single VM.

Thus, the above operations of the database processor for a single session may be depicted as shown in FIG. 7. The session object 202 contains a VM 204 executing a program 205 operating on and storing tokens in TL 41, and outputting program names to PL 31. The database processor 203 has access to a directory server 500. Note that the directory server 500 may also be accessed by user computing devices desirous of searching or discovering computer programs as described above. The database processor 203 is configured to operate according to method RM as described above.

It remains to describe the computer programs executed in VMs created by the database processor. We first describe an exemplary case.

Consider the three computer programs named Book, Payment and Shipment of FIG. 8A.

The program "Book" comprises instructions that are mostly self-explanatory. Thus, "Display Book List to user" is interpreted to mean that when the computer program executes the indicated instruction, a list of books is displayed on the user device. Note that the data in the list is assumed to be provided, a priori, to the computer program, e.g., the program may be initially provisioned with such a list. (The specification of the user device will be "bound" at run-time—the binding of variables in computer instructions to specific entities is well-known in prior art.) As another example, the instruction "Ask user for title of book" seeks input from user device. Such information is provided by the user at run-time.

The instruction "Get user device location" is an instruction to execute a procedure akin to the one described earlier by means of which sensor data from a user device is accessed.

The instruction "Token: location" bears further description. The instruction is meant to indicate the encapsulation of the data "location" into an encrypted form that is outputted to TL 41 (FIG. 7). Generally, token instructions contain a list of data elements that are to be encrypted and then outputted to the list 41. The encryption key is to be obtained from the user device that initiates the session in which the program is executing, e.g., by using the instruction "get" as a subroutine.

The instruction "Output: Payment" is similar to the token instruction above, except that the name "Payment" is not encrypted.

The program labeled "Payment" in FIG. 8A contains the instruction "Input: title, location" that conveys the instruction to read tokens "title" and "location" from the token list 41 (FIG. 7) and, since the indicated elements are encrypted as per above, to decrypt the indicated elements using a key obtained from the user device again, e.g., using the "get" instruction as a subroutine). Note that program "Payment" creates tokens for "amount" and "pay" that are stored in encrypted form in list 41 (FIG. 7). Furthermore, whereas the program acquires the data "user name" from the user device, it does not create a token for it. This is a design feature of the program specification language described herein, i.e., data acquired or computed by a program may not be, optionally, outputted.

The instructions of program "Shipment" may be similarly described. It is to be noted that "Shipment" does not create any tokens and does not have any "Output" instructions.

FIG. 8B summarizes the new kinds of instructions shown in the exemplary program of FIG. 8A along with their semantics.

Given the exemplary descriptions above of the computer programs, a specification language for computer programs suitable for the purposes of this invention may be taught. The language in question consists of programming instructions similar to most conventional programming languages with the exception of the new instructions "token", "display", "get", "ask", "output" and "input" whose general operations have been described above and which may be implemented using conventional means of subroutines, encryption and decryption.

The instructions "get" and "ask" that obtain information from user devices have an additional functionality as follows.

The execution of both instructions is monitored by the database processor. Such monitoring may be enabled, e.g., by ensuring that both instructions, when attempting to access a user device, are configured to first access the database processor and the latter accesses the user computing device. That is, the database processor mediates the access requests from "get" and "ask" to the user device.

The monitoring of the "get" and "ask" instructions is further configured to ensure the following two conditions.

1. The informational attributes asked of the user device by "get" and "ask" instructions are contained within the specified "User Info List" associated with the service (cf. FIG. 5).
2. No single computer program may ask and obtain ALL of the informational attributes from the user device.

The above two conditions compel service providers to provide services that utilize more than one computer program and limit the totality of information that a single computer program may receive from a user device. The above two conditions, along with the actions of encrypting the identifiers in the token list and the termination and clearing of the VMs and the session object constitute the trust model provided by the database processor to the user community.

The database processor operates in a manner as to preserve the trust model. In this sense, the latter represents a contract between the user community and the database processor, i.e., the trust model specifies the meaning of the phrase "user data privacy", the contract being enforced by the database processor.

Figure 9:
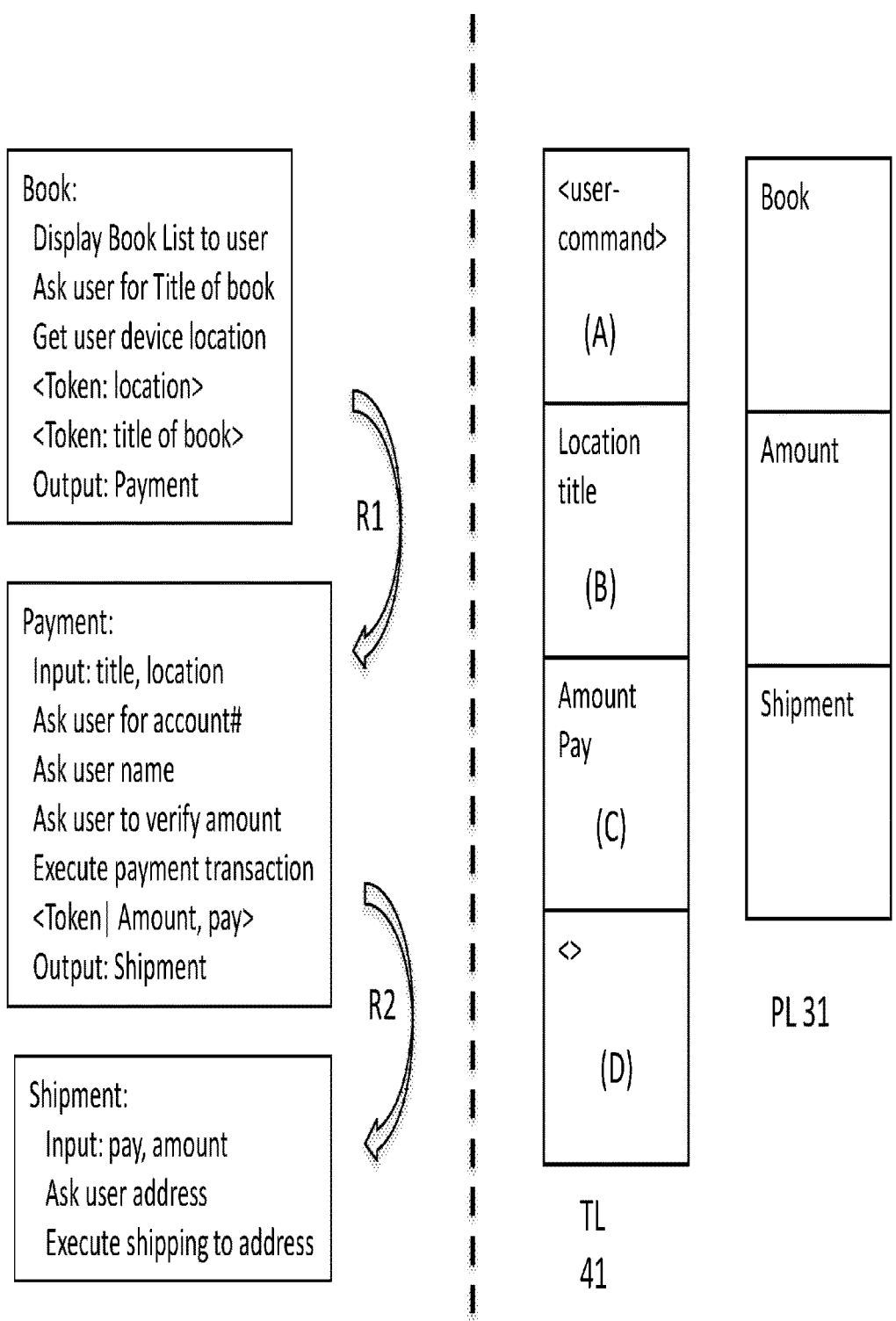
FIG. 9 shows an exemplary rewriting of the programs of FIG. 8A implicit in the operation of the database program.

The operation of the database processor may now be further described in FIG. 9 and as follows with respect to the programs shown in FIG. 8A.

The user device issues a request to the database processor that establishes a session and begins monitoring the PL and TL lists. The user device injects the program named "Book" in the program list. The database processor monitors the program list PL, attempting to find matching entries in the directory. When it finds a successful match, i.e., condition MC is satisfied, it executes method RM.

Execution of method RM causes the creation of a VM in which the program named "Book" begins execution. The output of the program, namely the tokens "location" and "title of book" are stored in TL in encrypted form, and the string "Payment" (in the clear) is stored in the PL.

The program "Book" terminates and the database processor terminates the VM. The monitoring process continues since the PL list is not empty, i.e., it contains the name "Payment". The monitoring now finds a match between the directory entries and the name "Payment" in PL.

The database processor, since it has found MC to be satisfied, creates a second VM in which the program named "Payment" begins execution, producing tokens "amount" and "pay" (in encrypted form) in TL and the clear string "Shipment" in PL. After the program "Payment" concludes, its VM is terminated.

Since PL is still non-empty, the monitoring by the database processor continues and finds a successful satisfaction of MC, whereby a VM is created to execute the program named "Shipment" operating on tokens "amount" and "pay". This VM is also terminated when "Shipment" concludes its execution. No names of programs are outputted by the program "Shipment". Thus, the list PL becomes empty and no more matches are found. The database processor may terminate and clear the session.

Technical Explanation of the Database Processor

A technical explanation may be provided of the working of the database processor. To receive service provisioning from a service provider, a user device injects a computer program into a computational environment where the computer program may execute. The running of the computer program is controlled in the manner in which it asks for user data or produces output, e.g., the output of the computer programs is constrained to be either tokens written to the token list or names or other identifiers of computer programs written to the PL list.

Furthermore, the computer program rewrites itself, in the sense of a Post Rewriting System [cf. Emil Post (1947), *Recursive Unsolvability of a Problem of Thue*, The Journal of Symbolic Logic, vol. 12 (1947) pp. 1-11. Reprinted in Martin Davis ed. (1965), *The Undecidable: Basic Papers on Undecidable Propositions, Unsolvable Problems and Computable Functions*, Raven Press, New York, pp. 239ff]. That is, a computer program S rewrites itself as computer program T given the data contexts "u" and "v", known as pre- and post-contexts, respectively. The notation $uSv \rightarrow uTv$ denotes the above notion.

An implementation of such a rewriting system thus retains no "memory", since the state uTv may not be rewritten as uSv, i.e., the "arrow" may only be traversed from left-to-right and not in the backwards direction and that the pre- and post-contexts, i.e., the "u" and "v" remain unchanged in the left and right-hand sides of the above notation.

As will become clear momentarily, we will associate data elements in the TL list (41, cf. 7) with the pre- and post-contexts, i.e., the "u" and "v" in the above notation. We will associate computer programs denoted by the upper-case letters such as "S" and "T", etc., with names of programs in the program list PL (31, cf. FIG. 7). Thus, the notation "uSv→uTv" may be interpreted as "if the program S operating on input "u" produces output "v" then S may be rewritten as T (with the same input and output data contexts)".

In the present invention, computer programs or apps, provided by e.g., service providers, are injected by a user device into a computational environment. The environment generates a session with virtual machines for executing the injected computer programs, with each computer program being executed in its own virtual machine. Assume an injected computer program, say S, is provided with input "u". S executes, i.e., runs in the virtual machine, and produces output, i.e., token, "v" and the name of a program, T. The output (and input) elements are associated with the session and not the virtual machines in the session.

The session, at this juncture, contains the data "u", the data "v", and the program S. The computational environment terminates and clears the program S and its associated virtual machine and accesses the directory to get a program, say T, which is injected into the session. The session now contains the program T and the contexts "u" and "v". We may thus represent the above operation of the computational environment by saying that the computational environment rewrites S as T using the rule "uSv→uTv". Given the exemplary programs shown in FIG. 8A, we may describe the working of the database processor as the rewriting implicit in the following pair of Post rewriting rules. Note that "< >" denotes the empty context.

< >Book<title><location>→
  < >Payment<title><location>
<pay><amount>Payment< >→
  <pay><amount>Shipment< > wherein the database processor is provided a suitable directory containing programs Book, Payment, and Shipment. FIG. 9 shows a pictorial rendition of the rewriting process by the labels R1 and R2. Additionally, FIG. 9 shows lists TL 41 and PL 31 containing the indicated contextual elements.

The preceding paragraphs have described a process R1 (FIG. 9) in which a first VM, VM1, is created for the execution of program named Book. The output produced by this program is used by the database processor as matching criteria to locate a second program "Payment." The database processor then creates a second VM2, causing the execution of the program "Payment" in VM2. The causality relationship between the programs "Book" and "Payment" is referred to as a rewriting operation encapsulated in the above descriptions as represented by a rewrite rule R1 of Post logic.

Similarly, the operation R2 denotes the rewriting of program Amount as program Shipment and the rewriting is shown as label R2.

It is to be noted that the rewriting operation is not explicitly described or contained in any component of the database processor. It is implicit in the operation of the database processor, i.e., it is a side-effect of the monitoring condition and the method RM by which the database processor operates.

Thus, condition MC and method RM executed by the database processor serve to describe, implicitly, the operation of program rewriting. Such implicit working of the rewriting process is by design. Since the rewriting process is never declared explicitly, it is never available for access by third parties, and hence it may not be used to discern the information that links different data elements together.

Illustrative Embodiment

Figure 10:
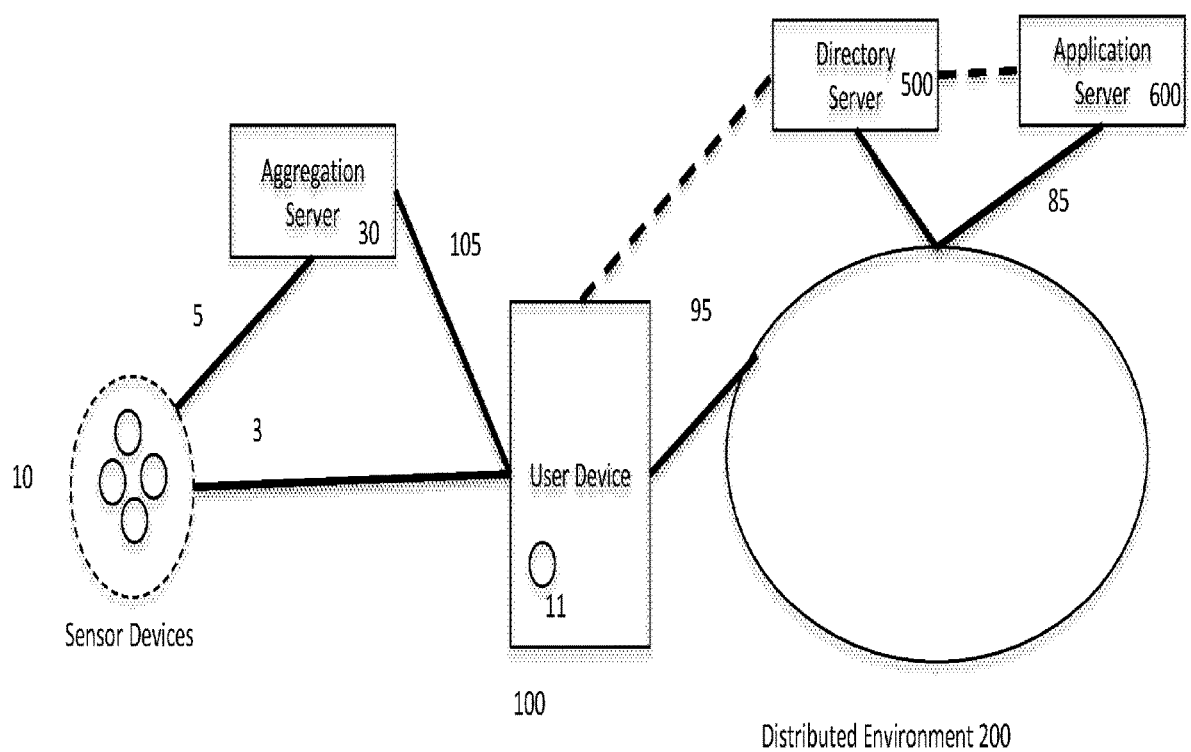
FIG. 10 shows an exemplary system architecture for an illustrative embodiment.

We now provide descriptions of an illustrative embodiment of the present invention (cf. FIG. 10).

Various sensor devices 10 (FIG. 10) may be located in an environment also containing a user device 100 that may contain one or more (internal) sensor devices 11. The devices 10 may be in association with the user device 100 by means of link 3. Alternatively, they may be aggregated via link 5 to a server 30 that is associated with the user device 100 via link 105. The user device 100 is connected to the distributed computing environment 200 via link 95. It may also have access to the directory server. The database processor program described above (203, cf. FIG. 3) runs in the environment 200.

The environment 200 is also linked to a directory server 500 and an application server 600. The latter may also be optionally connected to the directory server.

The database processor creates session objects and VMs, etc., as described above. These are not shown in FIG. 10 since they have been described above and shown in FIG. 3.

We consider an application which enables the user to buy a book online, pay for it and arrange its shipping. The entire process appears as an end-to-end or unitary transaction to the user, though it may be carried out by multiple interacting entities, i.e., computer programs supplied by various providers. The user utilizes his user device and provides information, e.g., title of book, payment, etc., as needed. Some information, e.g., location, may be gleaned from sensors in his device. All information is provided to a database processor operating in a manner as to preserve the user's information in the sense that the individual components of the unitary transaction may not be linked to derive an overall knowledge about the user. Furthermore, the individual components of the unitary transaction that receive user information are computational entities that are created and cease to exist to carry out a computation and then cease to exist.

Service providers using application servers create computer programs offering various services to users of user computing devices and smart devices. Smart devices generally refer to devices containing one or more processors, one or more network interfaces and one or more sensors to sense environmental indicia from their surroundings. Examples of smart devices include smart appliances, smart vehicles, and so on. A directory server is populated with the computer programs so created and offered to consumers. A consumer using a user computing device, e.g., a smart phone, browses or searches a directory server 500 and discovers a program enabling it to buy books online. (For example, the program may be advertised as preserving user data privacy.) The user device downloads and launches the program, perhaps later.

Figure 11A:
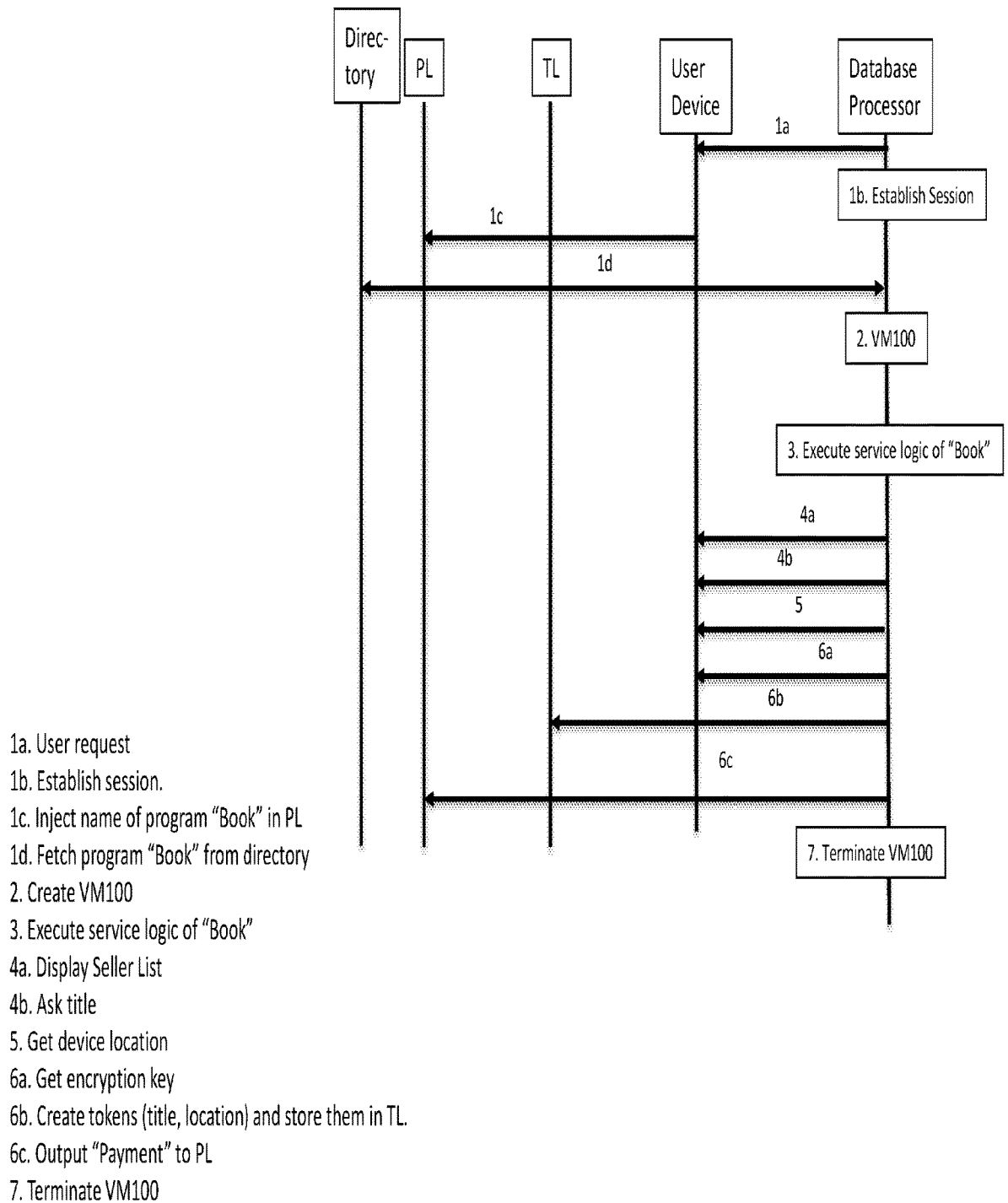
FIGS. 11A, 11B and 11C depict details of the operation of an illustrative embodiment.

FIG. 11A depicts the situation wherein the user device has selected a computer program. It issues a request (step 1a) to the database processor to establish a session (step 1b) and causes the selected program's name, Book, to be stored in PL (step 1c). In step 1d, the database processor fetches the computer program "Book" from the directory. As described above, this causes the database processor to create a virtual machine VM100 (step 2) that executes the logic of program "Book" (step 3). The execution results in a list of books being displayed and the user supplying the title of a (selected) book to the program (steps 4a and 4b). The program also obtains the location of the user device from the device's sensor in step 5. (The details of this acquisition process have been described above.)

Next, in step 6a, the program asks for encryption keys from the user device and, in step 6b, creates tokens for the data elements "title" and "location". The tokens are stored in TL. In step 6c, the program outputs "Payment" to PL. Program "Book" ends its execution, thus VM100 is terminated.

In step 8a (FIG. 11B), the database processor finds "Payment" in PL and, in step 8b, fetches the program "Payment" from the directory. In step 9, it creates a virtual machine VM200. In step 10a, the program begins execution and in step 10b reads tokens "title" and "location" from TL. In step 10c, it requests decryption keys from the user device to decrypt the tokens "title" and "location". Step 11 leads to the acquisition of payment information from the user and its processing in step 12. In step 13a, the program fetches decryption keys from the user device and in step 13b creates tokens "Pay" and "Amount" and stores them in TL. In step 13c, the program outputs "Shipment" to PL.

The program now terminates execution, causing VM200 to be terminated.

Figure 11B:
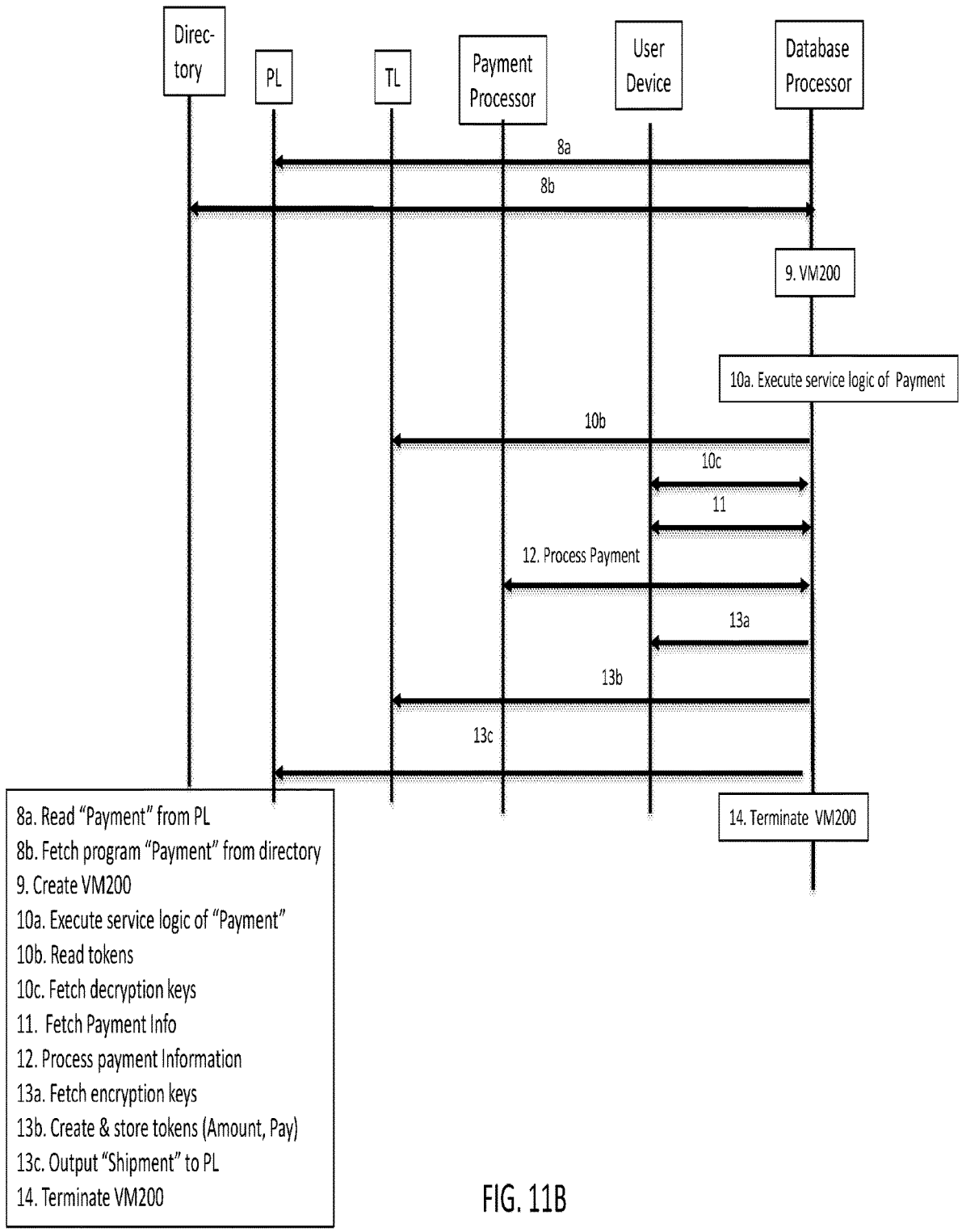
Figure 11C:
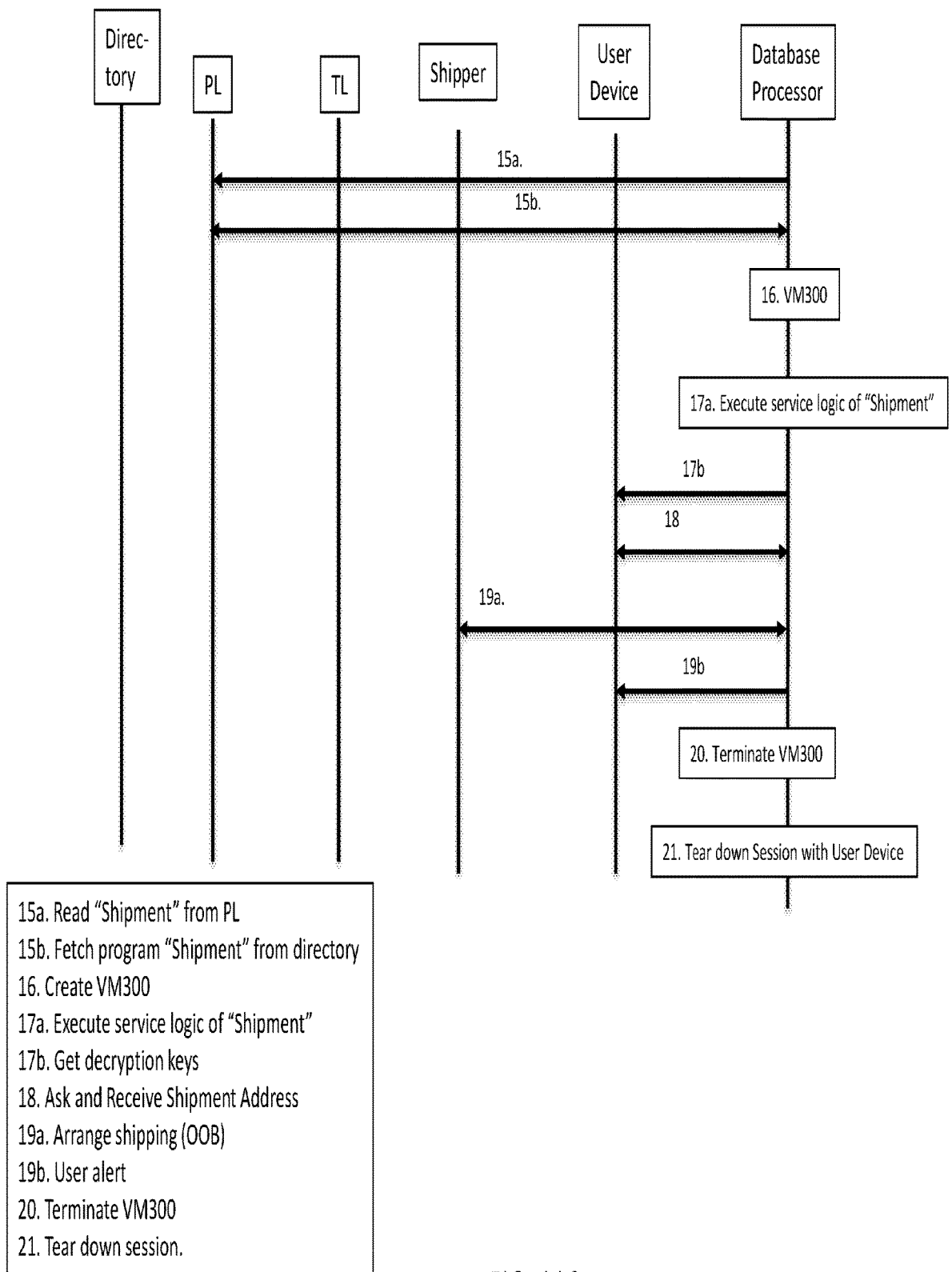

FIG. 11C similarly describes the execution of program "Shipment" in virtual machine VM300 at the conclusion of which no output is provided to PL.

It is important to note step 19a "Arrange shipping (OOB)" wherein the program "Shipment" communicates the address of the user to the shipper. The abbreviation OOB (Out-of-band) stands for a communication that is considered to be "special" in the sense that it communicates user data to an external entity.

The database processor flags all communications in which data obtained from a user device is communicated to an external entity. The database processor may then follow up a flagged (OOB) communication with an alert to the user device. Step 19b shows the alert to the user device generate by the database processor. That is, the database processor generates an alert message to the user device whenever it detects an output in the clear relating to a user provided informational element.

Continuing with FIG. 11C, since no output to PL is produced by "Shipment", the PL list becomes empty. Furthermore, Shipment concludes its execution. Thus, VM300 may be terminated and the monitoring process does not find any new matches. Thus, the session may be cleared. In this sense the data elements, i.e., contents of the lists PL and TL are ephemeral.

We have thus illustrated that user information provided during the provisioning of the overall service to the user does not result in any of his information being retained in the system. This implies, for instance by referring to FIG. 2, that the linking of user information from different components of an overall service provisioning infrastructure is not possible in the invention described herein.

Skilled readers will understand that many variations of the above decentralization of the user experience are possible in which various service providers may provide components of an overall service.

An aspect of note is that the programs run in the database processor in virtual machine environments, write encrypted information into the respective lists in the data store using encryption keys from the user device. Thus, no other process can read the data in the lists and construct an integrated user profile. Moreover, as the programs terminate, no state information is left in the data store.

It is, of course, possible for a service provider to retain certain information acquired because of the user receiving an overall service. For example, the Shipper may record the address to which a shipment was delivered. But the name of the consumer is not known to the shipper.

Thus, the use of an out-of-band communicating process may reveal fragments of user data to one or more service providers. The present invention envisions that such out-of-band communications are highlighted by the database processor to the user. Thus, the user is made aware of the possible revelation of fragments of his data to a service provider.

Whereas the above embodiment has assumed that the overall service (e.g., buying a book online) is effectuated by multiple interacting entities, in other embodiments a single provider may provide all the components of the service (for example, by providing all the necessary computer programs). This does not limit the present invention since the execution of the computer programs uses a system that preserves user data privacy as described above.

In this respect, it is appropriate to mention, and the invention described herein envisions, the use of block-chain systems to implement services as smart contracts provided by multiple entities. A smart contract may be visualized, in abstract terms, as a computer program of a certain form, operating on data stored in the ledger(s) of the block-chain system. That is, the ledgers are akin to the data store and the smart programs are akin to the computer programs described herein. In this sense, the rewriting process that underpins the operation of the database processor may be viewed as providing a component of the operating system for smart contracts.

Skilled practitioners would have noticed that the exemplary descriptions of the database processor posit a non-determinism in its operations. That is, the list PL may contain multiple names of programs or a name in PL may match multiple program names in the directory.

The inventions described herein envision overloading the "Output" program instruction described above as follows. We may use the Output statement not only to specify names of programs, but we may specify additional attributes such as names of suppliers and various program attributes that narrow the searching of the directory.

Other Illustrative Embodiments

While the present exposition has concentrated on the Seller-Shipper-Payment service experience, many other examples of service experiences exist that may benefit from the inventions described herein. For example, autonomous vehicles such as smart cars are expected to contain many internal sensor devices that will report various kinds of data. The present invention envisions that users of such cars can derive benefits from the techniques described herein wherein sensor data from cars trigger computer programs (provided by service providers); such programs may then use the system and methods described herein to offer services to such cars without imperiling the owner's data privacy.

As another example, user's physical activities may be monitored and analyzed by smart devices worn by a user or by devices that are near a user, e.g., installed in exercise machines. Activities may then be analyzed, rated and scored and the data from such analysis may be communicated to health care providers or insurance providers.

User Data Portability

In traditional telecommunication systems, it is common for consumers to own their telephone numbers. A consumer may retain his phone number when switching from one service provider to another. The change was necessitated by regulations and is known as local number portability.

It is possible to envision several reasons, including legislative that may require a user to own his data and be able to switch providers, bringing his user data from the old to the new provider. Personal medical records provide a compelling example. A consumer may have his medical data stored on his user computing device, or in a private storage system accessible to service providers upon presenting requisite credentials that are only available from the user device. A consumer may then request medical services that access his medical data by recourse to his user device.

The term social graph is often used in social networking examples. The term refers to data comprising a user and his friends and followers. It may come to pass that portability of social graphs may be required or mandated. In such situations, a user can switch from one service provider to another, taking his social graph with him, in a sense described below.

Consider the current situation in online networks today wherein consumers trust certain service providers more than other service providers. For example, many consumers trust Google with their user name and password credentials. One assumption made by consumers supporting this behavior may be that Google's services are more secure and less likely to be penetrated by malicious parties. The evidence for this assumption is the facility supported by many service providers that allow consumers to access their accounts using Google credentials. Thus, a user may use his Google credentials to login into Twitter or Facebook, by way of example.

As a final example, the "winner take all" phenomenon on the Internet is known to create ever more powerful enterprises that offer many services. It may then be envisioned that they may, either voluntarily or under legislative requirement, be required to create a (business) unit or entity that handles user data and provides special handling or legislatively required guarantees. This implies that all the user data must then be under control of the unit and, hence, may be ported from one to another service provider.

We now describe how the subject matter described herein may be used to support user data portability. This can be accomplished by adding the following additional requirement to the descriptions provided above.

We extend the condition MC, described above, as follows. In addition to matching names contained in the list PL with names of programs in the directory, the user is allowed to state disqualifying matching criteria regarding one or more service providers. Thus, for example, the user may be allowed to state disqualifying criteria, e.g., "no programs from supplier-1 are to be chosen that match a name on the list PL" that modifies the condition MC and, hence, the behavior of the database processor.

Returning to the embodiment illustrated by FIGS. 11A, 11B and 11C, the modification to the MC condition may disqualify programs from a certain supplier to yield successful matches. Thus, the user device never receives any services from programs supplied by the disqualified provider.

Similarly, a supplier may be designated as to be selected by the MC condition.

The various embodiments described herein may offer a variety of advantages with respect to computing technology. Some of these advantages may include the following:

1. User computing devices may be freed from running computer programs, e.g., apps, thus conserving processing resources, power and so on. This may be particularly important in the case of mobile user computing devices such as smart phones where it is important to conserve battery power.
2. Apps may not need to be downloaded to user computer devices. Rather, when a user selects an app from the directory server (500, cf. FIG. 7), he may be provided an option to have the selected app injected into the database processor directly, without the intermediate downloading operation. This frees the user from managing apps on his user computing device. Thus, the user's handling and management of his device is simplified. This also implies that apps on user computing devices need not be updated periodically, thus saving networking bandwidth and capacity. Furthermore, app may be recommended to a user who may then act upon the recommendation without having to download the app to his device.
3. The directory server (FIG. 6) represents a re-architecture of app store technology. The latter is currently used by many service providers. By removing the download and updating functions currently provided by app store technology, we improve and simplify the technology and operation of app stores.
4. By extending the well-known DH algorithm and its look-alikes to securely handle data communications from multiple sensor devices via a single user computing device, we extend and simplify the reach and working of networking protocols to handle the newly emerging technologies of smart devices (such as autonomous cars, smart household appliances, etc.) that make extensive use of such sensor devices. Since DH (and its look-alikes) are used extensively in the industry, such an extension will improve the efficiency, operation and cost of networking protocols.

Certain Illustrative Commercial Embodiments

We provide a few commercial embodiments of the inventions described herein.

Figure 12:
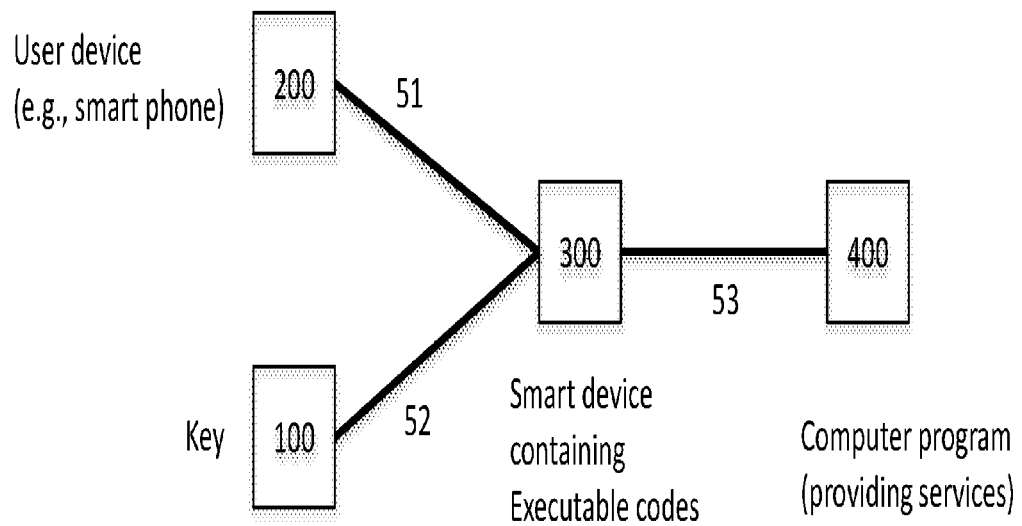
FIG. 12 shows a first illustrative commercial embodiment.

FIG. 12 shows an embodiment wherein a smart device 300, e.g., a smart car, a household refrigerator, or a smart door lock to a home, etc., is configured to provide services to consumers via wired/wireless connection 53. (The use of the term "smart" is intended to denote devices that contain one or more processors which may be configured with executable codes.) The smart device may obtain its executable codes from one or more computer programs 400, the obtaining being pre-provisioned, periodically provisioned, or provisioned on demand. The program 400 may also provision a device, key 100, with executable codes. Finally, a user device 200 may be provided with executable codes by the program 400. Again, such provisioning may be demand-driven or comprise a periodic out-of-band process.

As a commercial example, the key 100 and user device 200 are needed in conjunction for device 300 to provide services. Thus, a smart car 300 may provide programmed services only if the user device 200 and key 100 are used in conjunction since, as shown above, data from the key may not be accessible to the car 300 unless authorized by the user device 200. In this sense, the connections 51 and 52 (FIG. 12) depict the dependence of device 300 on devices 200 and 100, respectively, to provide its programmed services.

In this sense, the use of the key 100 and the user device 200 may be termed as akin to two-factor authorization of programmed services delivered by device 300 and, furthermore, the service is privacy preserving. The privacy of the data gathered by the key 100 and provided to the device 300 is guaranteed by the inventions described above.

Finally, it is an explicit consequence of the present invention that the association between the key 100 and the device 300 is controlled by the user device 200. That is, a different user device, say 500, may establish an association with key 100 and, if successful, invoke the services of device 300. Thus, it is the user device 200 that controls the association between the device 300 and key 100. This allows services provided by device 300 to be ported to different users.

Figure 13A:
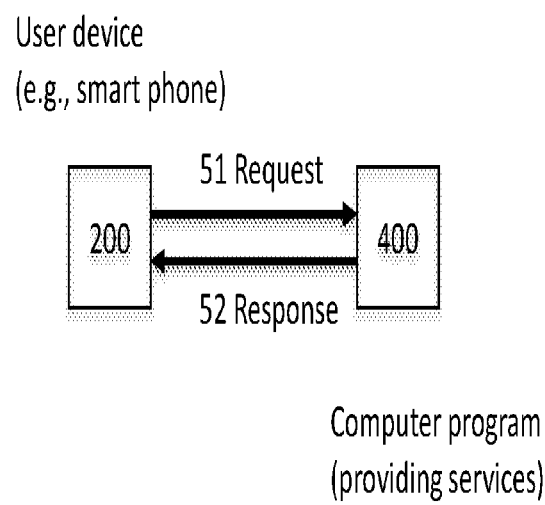
FIGS. 13A and 13B show a second illustrative commercial embodiment.
Figure 13B:
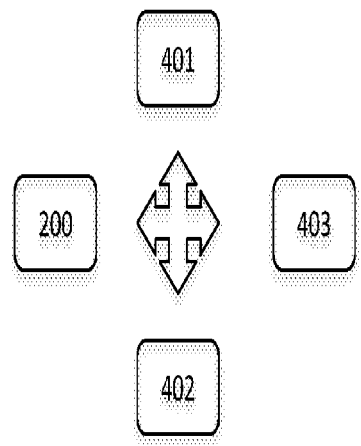

FIGS. 13A and 13B show a different commercial embodiment. FIG. 13A provides an abstract view of service disaggregation compelled by the inventions described herein. A service provider, e.g., online seller of books, is engendered by the dictates of the present invention to disaggregate its service offering so that it is provided by more than one computer program, the more than one computer program interacting between themselves, and the user device being one of the interacting components.

That is, whereas FIG. 13A shows service provisioning 400 as a "black box" operation, FIG. 13B shows the service 400 being disaggregated into the components 401, 402 and 403. (The present invention dictates more than one component.) For example, an online book buying service 400 may be engendered to be disaggregated into components Book 401, Payment 402 and Shipment 403. Furthermore, the interactions between components 401, 402 and 403 must necessarily involve the user device 200.

Thus, the user device 200 becomes a component of the service provisioning process and not simply a device that requests and receives services. The user device, when acting as a component of service provisioning, provides and controls user data that is needed for service provisioning. In this sense, the user device becomes a control component of service provisioning.

Figure 14:
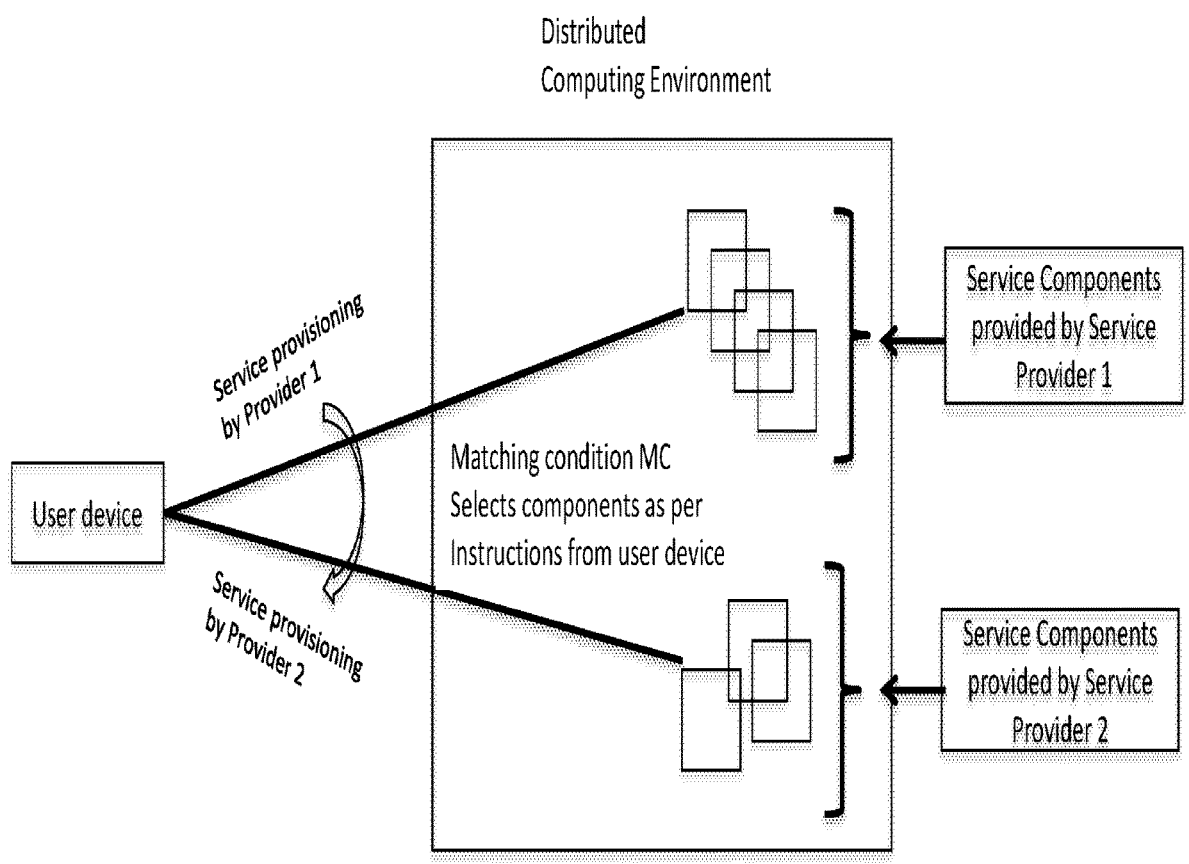
FIG. 14 shows exemplary service portability from one service provider to another.

FIG. 14 shows service portability across service providers wherein a user may port his service from a first provider to a second provider. Such porting is effectuated, as described above, by compelling the service to be disaggregated and then utilizing the user device to choose components that are not provided by the first service provider. This notion of portability of service is made possible because the user device controls the user's data and, hence, may cause the latter to be provided to selective service providers only.

Privacy Switch

We begin with a summary of some aspects of the invention described above and illustrated in FIG. 15A that is a duplicate of FIG. 10. A computing environment 200 may be used to run other selected computer programs, the selection being performed by a service provider or a consumer utilizing a user computing device 100. In some embodiments, the selection may be performed by programmatic means, e.g., by a computer program triggered by one or more sensor devices. The selected computer programs may obtain user data from the user computing device. In one aspect, the present invention describes methods by which the selected computer programs may operate and provide services without compromising the privacy of the user's data.

Figure 15A:
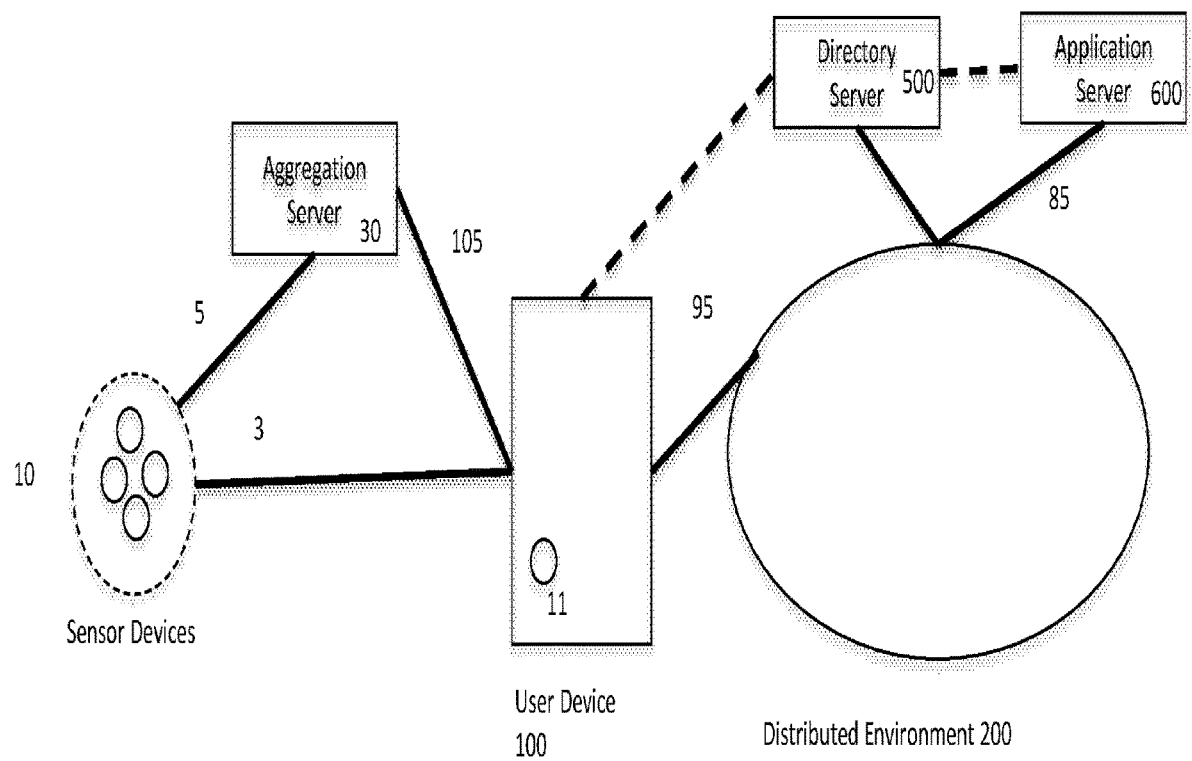
FIG. 15A is a duplicate of FIG. 10.
Figure 15B:
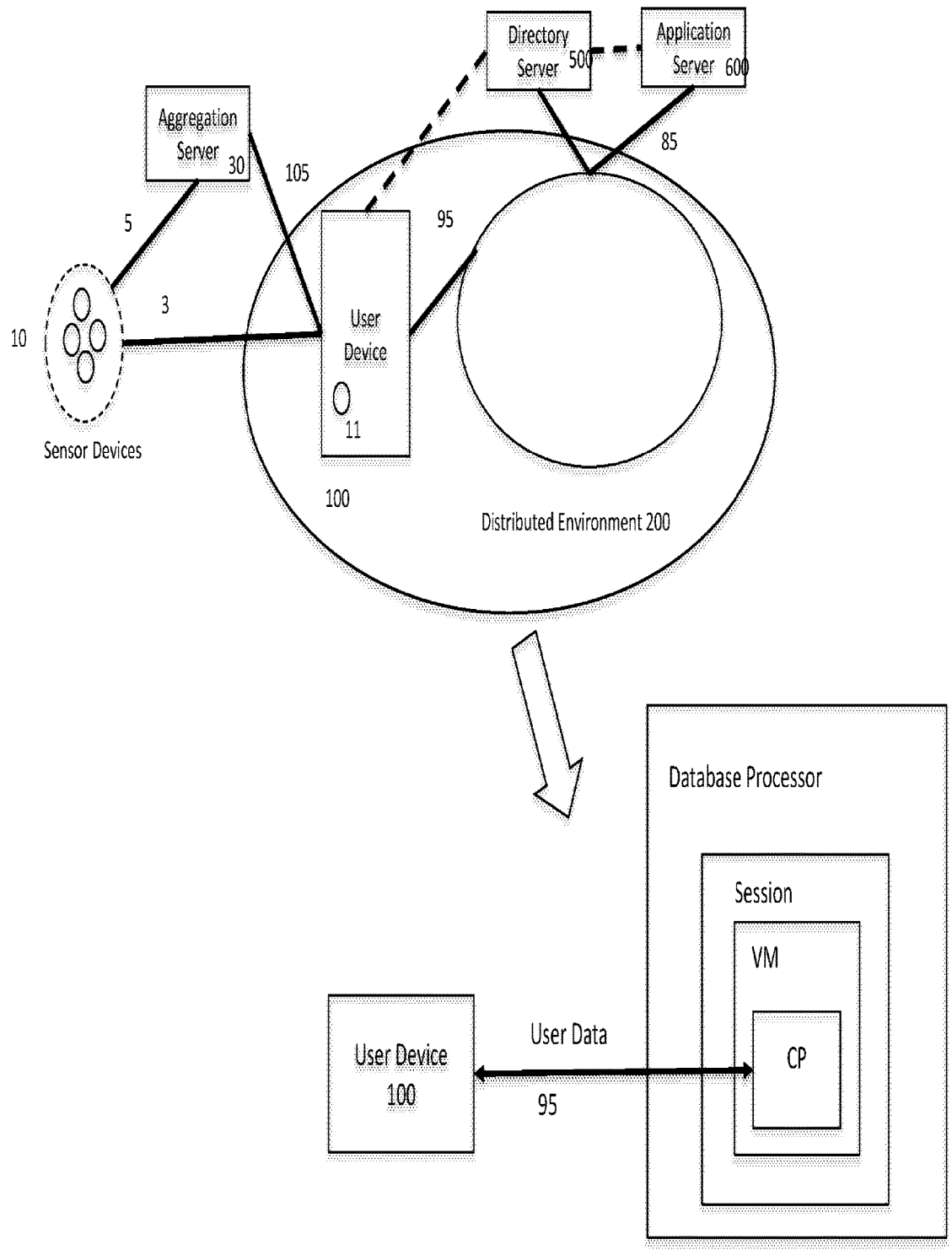
FIG. 15B shows an expanded view of the user computing device 100 and computing environment 200 of FIG. 15A wherein the computer/application program, CP, has been injected into a (distributed) computing environment.

FIG. 15B expands on two elements of FIG. 15A, viz., the user computing device 100 interacting with the computing environment 200 via connection 95. The computing environment is created and managed by a database processor or virtualized OS. The database processor may be asked to create a session object within which one or more virtual machines, VM, may run. An application program may run in a VM; such application programs (or simply, programs) may ask and receive user data from the user computing device 100 (FIG. 15B) for their computations.

We use the phrases "cause a program to be injected into an environment" or "inject a program into an environment" as abbreviations to denote the operation by which a computer program, a user computing device, or a service provider may select and cause an application program to run in a VM in a session created and managed by a database processor or a virtualized OS. For example, a service provider may cause a ride-sharing program to be injected or inject a ride-sharing program into an environment. FIG. 15B shows an exemplary program CP injected into the computing environment 200, interacting with a user computing device 100 via connection 95.

The invention described herein shows that a computer program injected into an environment may provide a service to a user computing device in such a manner that at the conclusion of the service, the service provider does not retain any user attribute information provided by the user computing device. At the same time, the service provider is assured that the user data provided to him is verifiable and accurate. In this sense, the services provided by injected programs are said to be privacy-preserving.

That is, the user computing device and associated computer programs described below operate in a manner that enforces the user's privacy concerns and the data integrity concerns of the service provider whilst delivering products and/or services to the user. The invention proposes a system or arrangement as depicted in FIG. 15C, some of whose details will be further described in the presentation to follow.

Figure 15C:
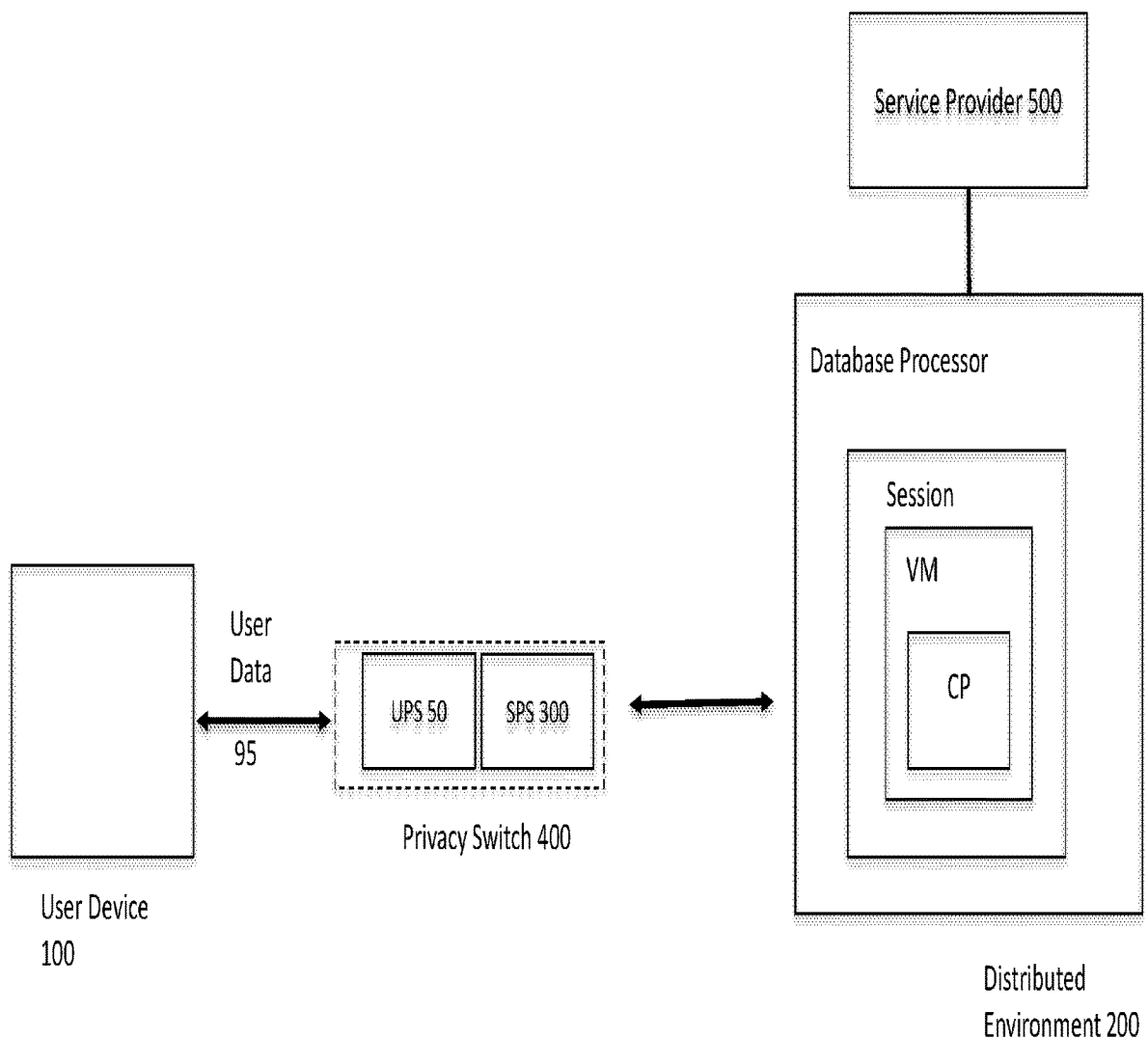
FIG. 15C shows a new logical network element, the privacy switch, intended to provide privacy-preserving services to consumers.

Generally, FIG. 15C depicts the introduction of a logical network element, privacy switch 400, into the arrangement of FIG. 15B. In one embodiment, the privacy switch comprises of two parts, a User Privacy Switch (UPS) 50 and a Server Privacy Switch (SPS) 300. The privacy switch may be implemented as a collection of software entities. In one embodiment, the UPS is implemented as a collection of software programs running in the user computing device 100, labeled in FIG. 15D as UPS 50 and the SPS 300 is implemented in a standalone server complex, e.g., a cloud-based computing environment that, in turn, connects to the computing environment 200. In some embodiments, the SPS 300 may be implemented as a part of the computing environment 200.

The UPS 50 of a privacy switch has two settings, on or enabled and off or disabled, under the control of the user. When set to "on", the UPS along with the SPS act in a way to preserve the privacy of the user during service provisioning as detailed in the following descriptions. When set to "off", the UPS and SPS become non-functional and the user computing device returns to conventional behavior. In the descriptions that follow, the UPS setting is assumed to be "on". Note that a user computing device behaving in a conventional manner may not preserve user data privacy during service provisioning. To avail himself of privacy preserving services, a user may set the UPS to the "on" setting.

In an embodiment of the present invention, the UPS and the SPS execute in virtual machines.

In simple terms, we may then say that a privacy switch PS is a combination of UPS and SPS (FIGS. 15C and 15D) that allows a user computing device to interact with and receive services from a service provider in a privacy-preserving manner when the UPS is "enabled" or set to the "on" position.

We now further describe and characterize the functions provided and the operations carried out by the Privacy Switch (in conjunction with the computing environment created by the database processor or the virtualized OS).

We observe that a service provider being represented by a computer program, provided with user information, may need to process the received user information, the processing extending beyond the operations of copying and saving received information. We consider a few such possible processing needs and observe that they lead to a further categorization of user information as follows.

1. Alias Information: An example of an alias is the common use of usernames chosen by consumers. Service providers use usernames to correlate user provided information with previous historical usage patterns. Example: A user may provide a username or alias, such as @john, that was used by him in the past so that historical transactions may be associated with the current transaction to determine recommendations.
2. Identity Information: A service provider needs to process identity information provided by the user to authenticate the user. Example: Biometric information may be used to authenticate the identity of users.
3. Assertions/Preferences based on Personal Attributes or Historical Data: A service provider needs to verify the accuracy of information provided by the user. As an example, a user may assert that his "age is greater than 21" based on a processing of the user's driver license dataset by a known algorithm. A user may assert that he likes classical music based on processing his historical purchase data by a known algorithm.
4. Approximate Information: Service provider needs to resolve information that only approximates a user's actual information/data. Example: user provides a zip code for his location, but the service provider needs a street address, e.g., to deliver an item to the user.

The privacy switch (400, cf. FIG. 15C) addresses the above identified four needs of service providers whilst assuring privacy concerns of users. The details are made clear in the descriptions that follow. References to "user computing device" in the following descriptions are to be interpreted as referring to a user device 100 that incorporates UPS 50 (cf. FIG. 15C or FIG. 15D).

In one embodiment, the present invention presents methods by which user information viz., alias, identity, assertions/preferences and approximate information, collectively referred to as obfuscated objects, may be presented to a service provider, who may then verify the presented objects. The verifying process yields concrete benefits to the service provider and will be referred to as authenticity, resolvability and provenance, and will be further described later.

Aliased/Username Information

It is commonplace for service providers to use historical usage data of a user, indexed by an identifier such as a username, to customize a user's service experience. Thus, many services provide recommendations and advertisements to users based on such historical data saved from previous visits by the user. Keeping a user's identity or other informational attributes private from a service provider may negatively impact the service provider's capability to personalize the user's service experience.

On the other hand, a username is not the only kind of user attribute information that may compromise a user's privacy. For example, an identifier such as a telephone number can be used to contact the user later. A user's IP address may be utilized to derive a physical location using geographical databases that map IP addresses to physical locations, as taught by prior art.

Therefore, both the user and the service provider have concerns that need to be addressed.

In some embodiments, the present invention provides a solution to the above problem by requiring that 1) user identifiers be known through non-interpretable identifiers, and 2) communications between a user computing device and an external computing environment be mediated by an entity that obfuscates user identifiers and other user attribute information. Since a user may change identifiers at his discretion, any interpretation associated with an identifier will be ephemeral. We will sometimes use the term "alias" to denote non-interpretable identifiers.

In one embodiment, the entity obfuscating the communications between user computing devices in a session is a privacy switch acting in a specific manner described as follows.

Figure 16:
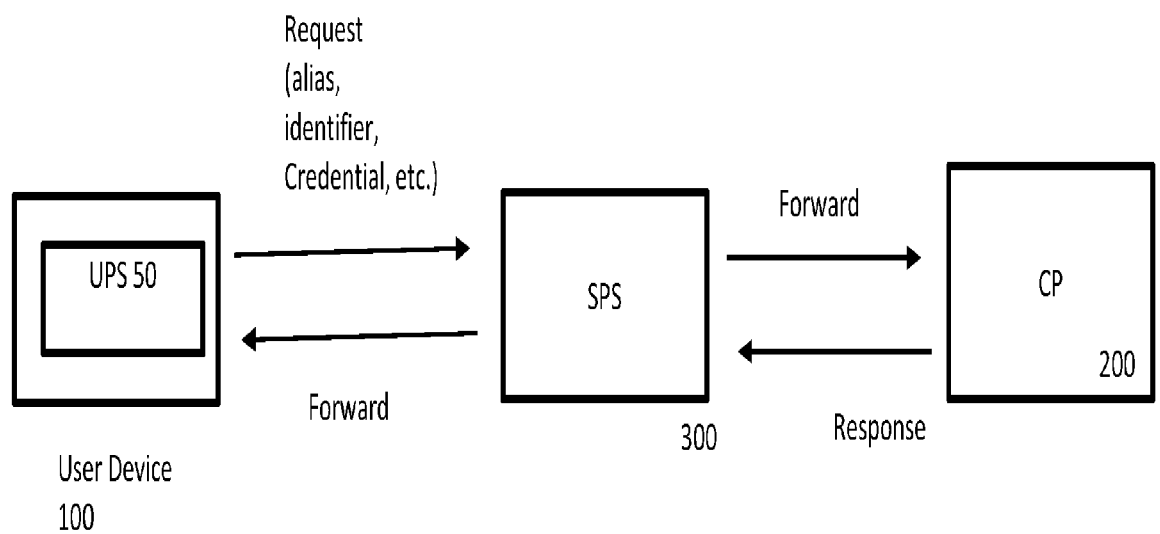
FIG. 16 shows communication paths between the UPS/User computing device, SPS and computing environment 200.

FIG. 16 shows the operation of the arrangement by which the SPS 300 acts as an intermediary for communications between the user computing device 100 (equivalently, UPS 50) and the exemplary computer program CP 200. That is, CP 200 and UPS 50 are in a session created by a database processor. UPS 50 sends a request that is received by the SPS 300 and forwarded to CP. In the reverse direction, data from CP is received by SPS 300 and forwarded to UPS 50. In one embodiment, UPS 50 may use the commonly known approach of "pulling" information from SPS 300.

As will be described later, requests from UPS 50 to the CP 200 (via SPS 300) may comprise various types of service requests, including authentication, credit card transactions and other user attribute information.

We observe that the requirement of obfuscation mentioned above, may be implemented by requiring SPS 300 to assign an identifier to a request received from UPS 50 before forwarding the latter to CP 200. We describe such processing by subsystem SPS 300 as follows.

A user device 100 with UPS 50 is invited or "discovers" (in an out of band process) a service offered by a computer program CP 200. As stated above, we assume that UPS is enabled. User device 100 (equivalently, UPS 50) selects an identifier e.g., "@john", and sends a request (or initiates a dialog), that arrives at SPS 300 that, in turn, creates a second identifier, say "@john123", and forwards the received request to CP 200, replacing the identifier @john with @john123. Thus, CP 200 assumes that the request came from an entity identified as @john123. CP 200 receives a request from user computing device/UPS identified as "@john123" whereas, by keeping an association list (@john, @john123), SPS 300 knows the user computing device as being identified as "@john".

Thus, CP 200 may be in a session with SPS 300 with username "john123". In actuality, CP 200 is in a session with user computing device 100 using the username "@john" since SPS 300 acts as an intermediary or proxy for the user computing device 100.

By maintaining the association list (@john, @john123), SPS 300 may continue to act as an intermediary between the user computing device 100 and CP 200 for dialogs in future sessions. SPS 300 may save transaction data related to user computing device 100 using identifier "@john123" and use it in subsequent requests received from user computing device 100.

Figure 15D:
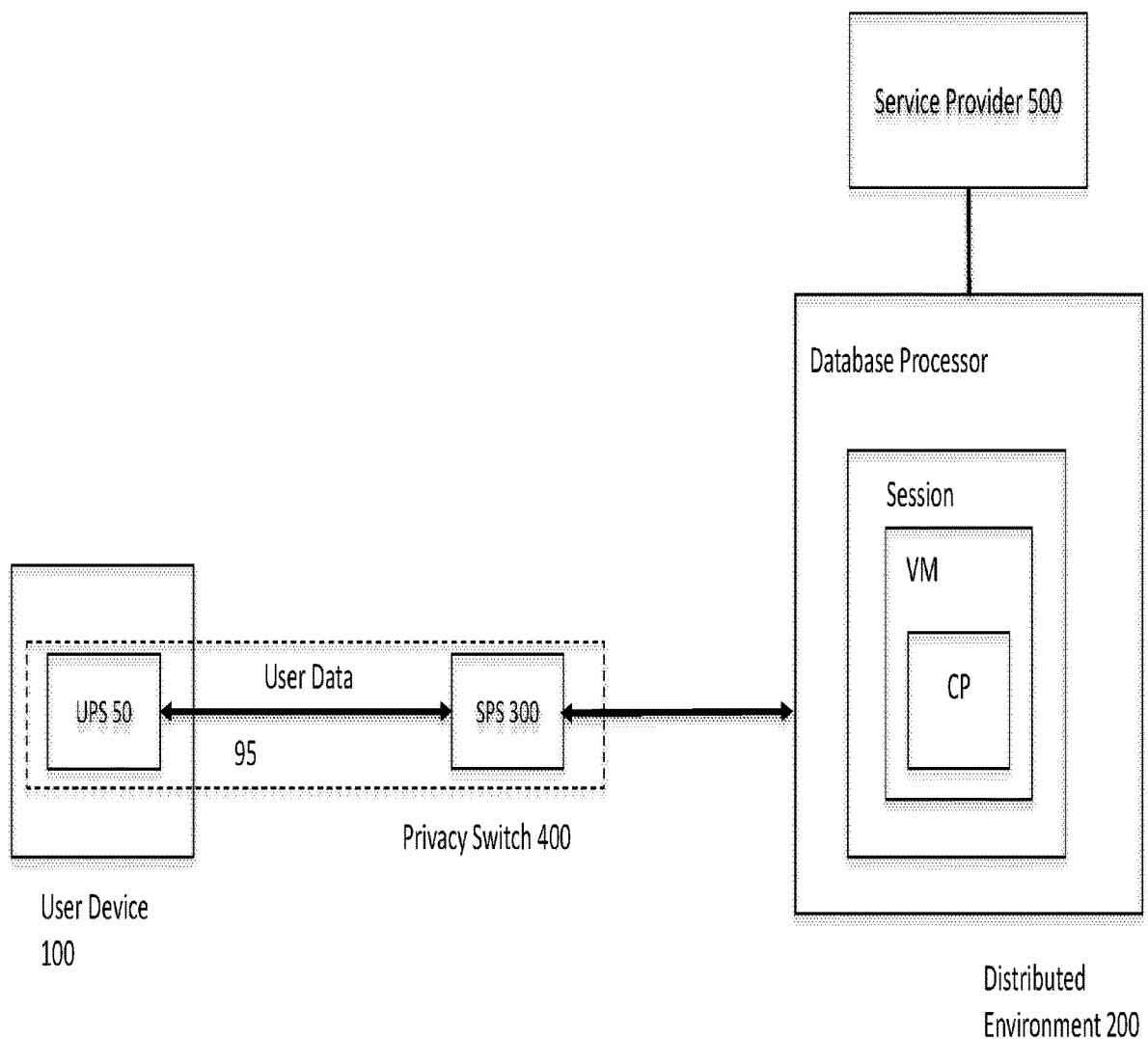
FIG. 15D shows one embodiment of the privacy switch of FIG. 15C.

Such operations of assigning identifiers to user computing devices and maintaining association lists comprising identifiers to preserve user privacy provide one example of operations performed by SPS 300 of FIG. 15D.

The SPS may help the UPS to create another type of association list comprising credentials and usernames which may then be stored and managed by the UPS. In such an embodiment, SPS provisions the UPS with specific algorithms (detailed later) that are used to generate an association list, e.g., (A3, A4), wherein A3 is a cryptographic object called a "credential" and A4 is a username (in the clear) such as "@john123".

An association list comprising credentials and usernames, e.g., (A3, A4), may then be used in various ways, e.g., it may be used by a user computing device to log into a computer program or a website. The latter may then undertake an operation to "verify" the authenticity of the credential A3 (details of which process are described later). Upon successful verification, the user device may be authorized to log into the computer program or website. (In one embodiment, the SPS is used in the indicated verification operation.)

Thus, in such an embodiment, the UPS creates the association list comprising credentials and usernames and maintains the association list, whereas in the previous embodiment, the SPS created and maintained the association list. Using the associated list comprising credential and username, a user computing device may directly communicate with a service providing program, i.e., without using the SPS as an intermediary.

We have thus shown two embodiments. In one embodiment, the user computing device communicates with a service providing program via the SPS, the latter creating and maintaining one type of association list. In the other embodiment, the user computing device creates and maintains a second type of association list with the help of the SPS but may communicate directly with a service providing program without using the SPS as an intermediary.

Identity Information

Most services available to consumers on the Internet/Web require the consumer to input user identity information. We may categorize identity information as being the subset of user information that uniquely identifies a user. For example, whereas names or addresses may not uniquely identify a person, social security numbers and fingerprints are unique identifiers. Username/password combinations provide another example of identity information that is unique to a user. Since identity information is unique to a user, it merits special attention when considering user privacy.

We propose a method for disclosing identity information that may be used to provide information to a requesting program by a user computing device.

The user computing device converts identity information into a representative dataset that is then encoded as a cryptographic object, called a credential. The credential has the property that it is opaque to all entities. The credential may be verified (in a sense described below) by a computational entity called the verifier. However, the verifier is unable to re-derive the user's identity information.

Thus, a user's identity information may be converted into a credential that may be presented to a computer program. The receiving computer program may request a verifying entity to verify the authenticity of the credential, without knowing any more information about the user. The verifying entity is able to verify the credential without being able to re-derive user information from the credential.

We present details of the method below.

In current practice, a user may register with a service provider to obtain services. The process of registration may entail the user selecting a username and a password that are used by the service provider to authenticate the user. Since passwords may be hacked by malicious entities, it may be advisable to consider cryptographic credentials.

In a current technological trend, biometric information, e.g., fingerprint data, facial image data, etc., has been used as credentials to authenticate a user. For example, mobile or smart phones may use fingerprint data from a user to authenticate him to the device or to one or more service providers. However, users generally do not wish their biometric data to be shared with a service provider because of privacy concerns.

To circumvent this issue, smart phones keep fingerprint data in a local memory of their processor whose operating system generates a token that is recognized by participating service providers. Typically, these service providers need to have software such as a so-called "app", resident on the smart phone that accepts the token from (the operating system of) the smart phone and transmits it (or a representation) to the participating service provider. Such a method begets a closed system of service providers, all participating in the acceptance of a common set of tokens (or representations of such generated by their apps).

In short, a user can authenticate himself to the operating system of his e.g., smart phone, and the smart phone, in turn, provides a token whose validity is then accepted by other service providers. Thus, the user is permitted access to a participating service provider's system due to the service provider trusting the operating system of the smart phone.

Smart phones and other user computing devices have developed technology that provides a secure internal storage area for storing user data, e.g., biometric data. Such internal storage areas are only accessible to the operating system of the smart device and may not be accessible to external third-party software. We are encouraged by such inventions and utilize them in the present invention as explained below accordingly.

In one aspect, the subject matter described herein allows the trust placed in a token from an enterprise to be replaced with a method, i.e., a sequence of steps or actions carried out by one or more (possibly distributed) computing entities manipulating cryptographic objects. Such a method can then be verified independently of any service provider, operating system, device or platform.

The verification may thus be carried out in a device and platform independent manner. Such independence is crucial in its security implications. A trust model that relies on a single enterprise is inherently unsafe and susceptible to attack because it is a single point of failure. In a device and platform independent method distributed amongst many computing entities, different entities may check other entities and the method may continue to perform its functions even if some parts are under attack. For instance, it should be noted that the robustness of Internet transport or routing relies on having multiple paths between a source and destination (IP) address. As a further example, telecommunications networks often use distributed computing entities to achieve desired levels of reliability. Likewise, data centers distribute their data in geographically separated entities.

Furthermore, encapsulating user data as credentials that may be securely verified (without violating user data privacy) frees users from creating and remembering user names and passwords, a known source of privacy invasion and security problems in security of computer operations.

Figure 17A:
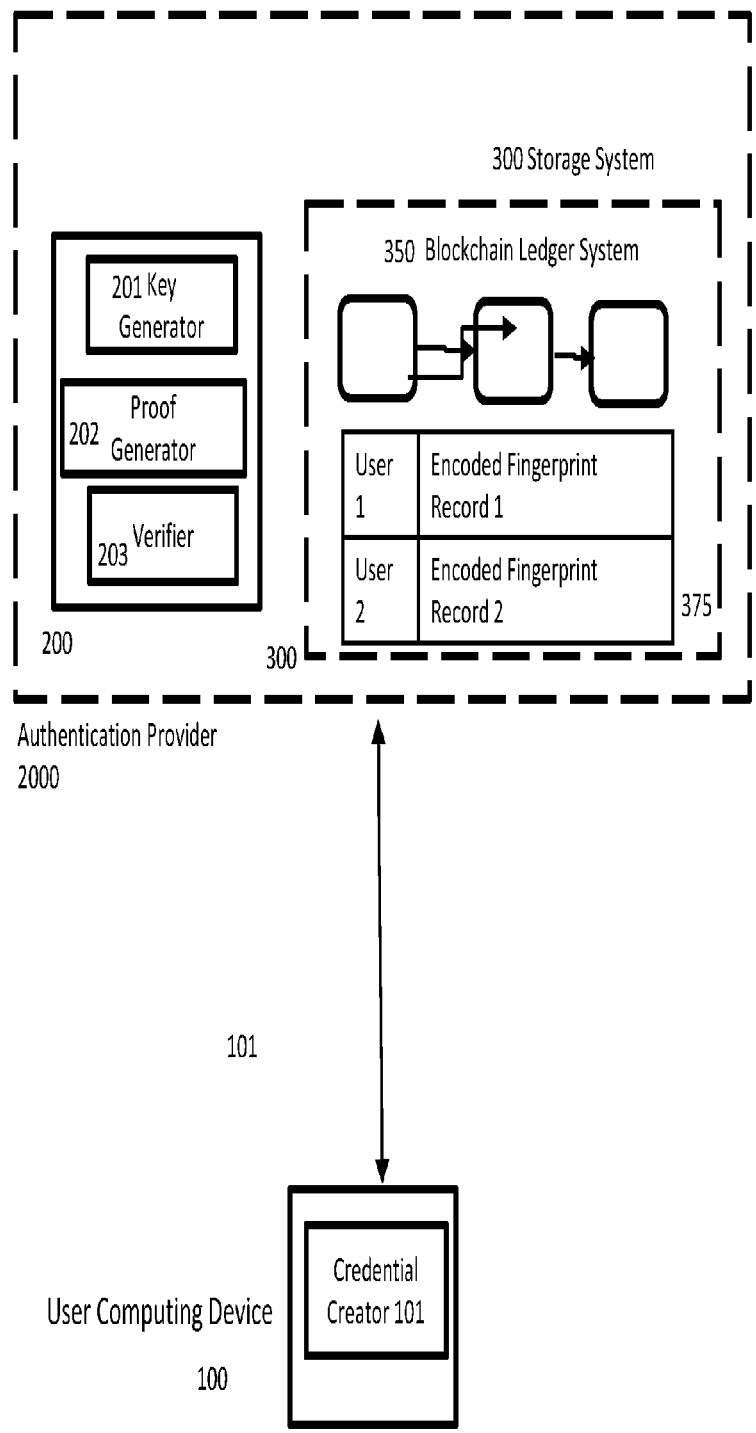
FIG. 17A shows the general architecture of the authentication provider.

FIG. 17A shows a general architecture of one example of an operating environment in which aspects of the disclosed subject matter may be practiced.

A user having established an account with a service provider using an identifier, say @john, may be asked to provide a credential that may then be used to authenticate future visits. Alternatively, the user may present a credential and a username together as a pair.

To generate a credential using biometric fingerprint information, a user may proceed as follows.

In one embodiment, the user computing device contains an integrated fingerprint scanner. The scanner is capable of scanning/capturing a user's fingerprint, converting it into a matrix of data and storing the fingerprint and data matrix for later computational use in the memory of the user computing device. In one embodiment, the fingerprint and data matrix is stored in a secure storage area of the user computing device that is accessible only to the operating system or selected applications allowed by the operating systems. Modern smart phones represent one example of a user computing device with an integrated fingerprint scanner.

A fingerprint scanner is one example of a device that facilitates capture and use of a user's biometric data. There are other examples of user's biometric data, such as retina scans, camera sensors that capture facial features, voice signature imprint, etc., that may also be used for identifying users. The use of the fingerprint biometric data in the present invention is purely exemplary and is not intended to limit the present invention disclosed herein in any way.

A user's fingerprint (biometric) data may be captured and processed by the user computing device or transmitted to a server where it may be processed by a combination of computational activities performed by the user computing device and the server. In the subject matter disclosed herein, we assume, without limitation, that the fingerprint data is processed by a combination of computational activities occurring in both the user computing device and server(s).

FIG. 17A shows a user computing device that contains software logic 101, referred to herein as credential creator that may be used to create cryptographic data objects called credentials. Details of the process by which credentials are created are described below. We briefly note that the functions performed by the credential creator 101 may be described as processing input datasets or credentials to produce output datasets or credentials that may then be presented to one or more service providers.

A service provider may verify a presented credential using software-based methods described below. In one embodiment, the verification may entail recourse to a third party, a so-called verifier. In a second embodiment, the verifier is integrated into the SPS component of the privacy switch (cf. FIG. 15D). We assume the latter embodiment, without limitation.

Turning now to the creation, presentation and verification of credentials, we begin with FIG. 17A. An authentication provider is an entity that provides algorithms to user computing devices that may be used to create and present credentials. In one embodiment, the SPS component of the privacy switch (cf. FIG. 15D) acts as an authentication provider. In FIG. 17A, an authentication provider 2000 contains components 201, 202 and 203 that represent software programs capable of performing various functions that will be described in more detail later. These functions are collectively labeled as 200 and are assumed to have access to a distributed storage and database system 300. As will be shown, the functions labeled 200 participate in the generation of credentials that serve to authenticate the user and an encrypted version of the user's fingerprint data may be stored in the records 375 of the storage system 300.

In one embodiment, the database system 300 (2000, cf. FIG. 17A) is implemented as a block-chain ledger system and the functions labeled 200 as a set of smart contracts operating on the data in the ledgers.

Assume that an authentication provider wishes to enable user computing devices to create and present credentials to service providers; the latter may then make recourse to the authentication provider for verifying the presented credentials. To achieve this purpose, the authentication provider develops or acquires software programs that allow him to perform the functions depicted as Key Generator 201, Proof Generator 202 and Verifier 203 in FIG. 17A. We first describe a general method whereby these functions are performed and then present a more detailed explanation. The general method is described with reference to FIG. 17B.

[Method M1]:

In a provisioning step, a user computing device is provisioned with specific software called Credential Creator 101, FIG. 17A.

In step 1a (FIG. 17B), user computing device selects identifier @john and requests an authenticating credential for it from an authentication provider.

In step 1b, the authentication provider runs a software program, called a key generator 201 (FIG. 17A), on a specific input, Create Credential Algorithm. The output is a set of computational objects (called keys), PK1 and VK1. The details of this software program and properties of the keys are described below. The authentication provider also runs the key generating program with a second input, Credential Match Algorithm, which produces as output a set of two keys called PK2 and VK2.

In step 2, authentication provider asks and receives from the user computing device an encrypted version of fingerprint data matrix (but not the fingerprint itself). The user computing device may use the software program Credential Creator 101 received as a result of the provisioning step. Further details of the functioning of 101 are explained later.

In step 3, the authentication provider uses the data matrix received from the user computing device and a software program called the Proof Generator 202 (FIG. 17A) to produce two objects, Proof-1 and Encoded Data-1, collectively called a credential, credential-1. Optionally, the input to the Proof Generator 202 may additionally contain other datasets as discussed later.

In step 4, the generated credential, credential-1, and the keys PK1, VK1 and PK2 are sent to the user computing device. Note that VK2 is not transmitted; it is saved by the authentication provider for later use in verifying the credentials.

In step 5a, which may occur when the user computing device wishes to present the credential, the user computing device generates a new credential, credential-2, (using software program credential creator 101, cf. FIG. 17A) and presents it to a service provider/environment (200, cf. FIG. 15D) who may request the presented credential to be verified by the authentication provider (step 6).

In step 7a and 7b, the authentication provider uses a software program called the verifier 203 (FIG. 17A) (along with the previously saved VK2 as input) to verify the presented credential, credential-2, as authenticating the user and responds to the service provider/environment accordingly.

Figure 17B:
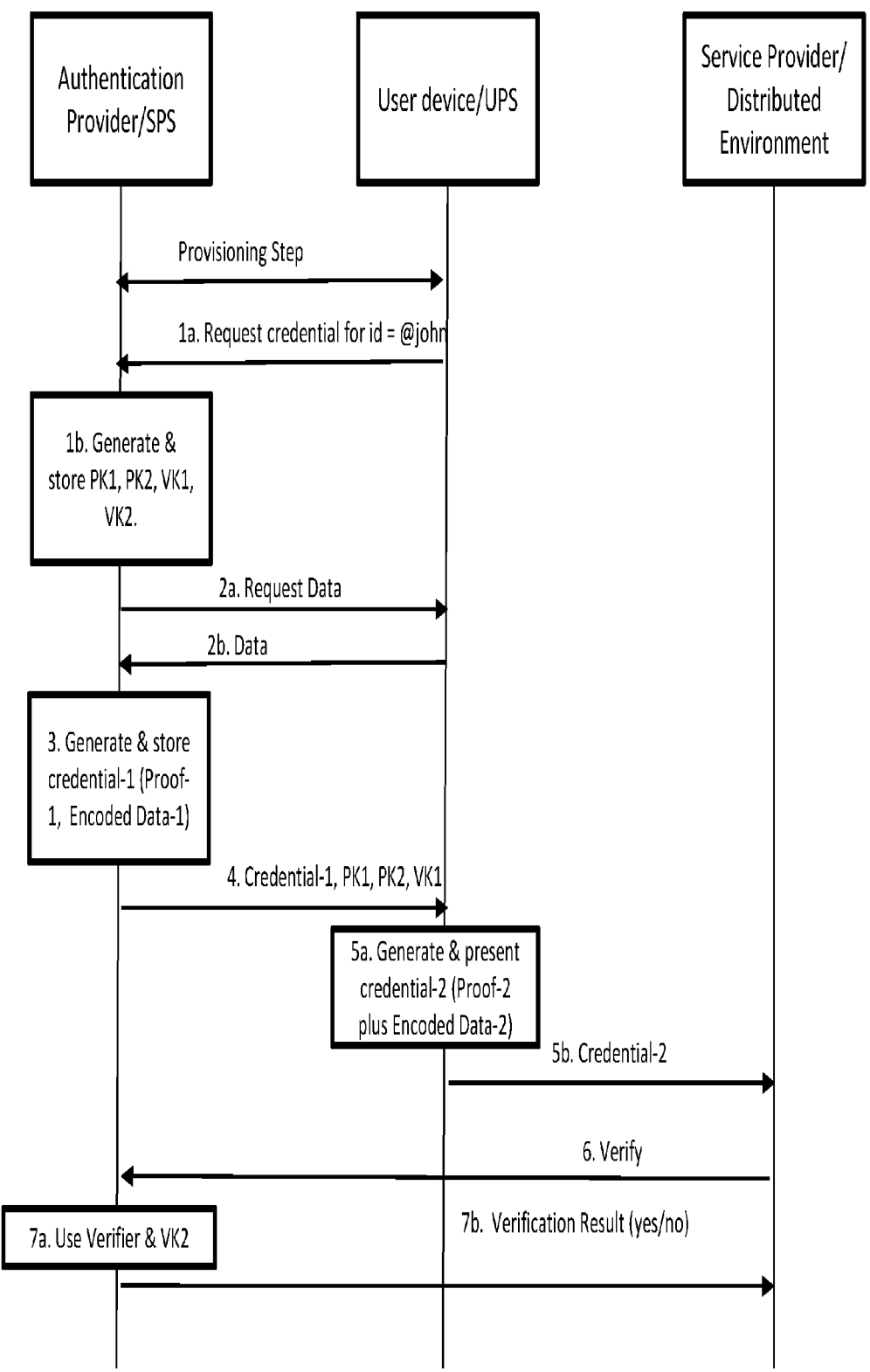
FIG. 17B shows the general method by which a user computing device is provisioned with credentials.
Figure 17C:
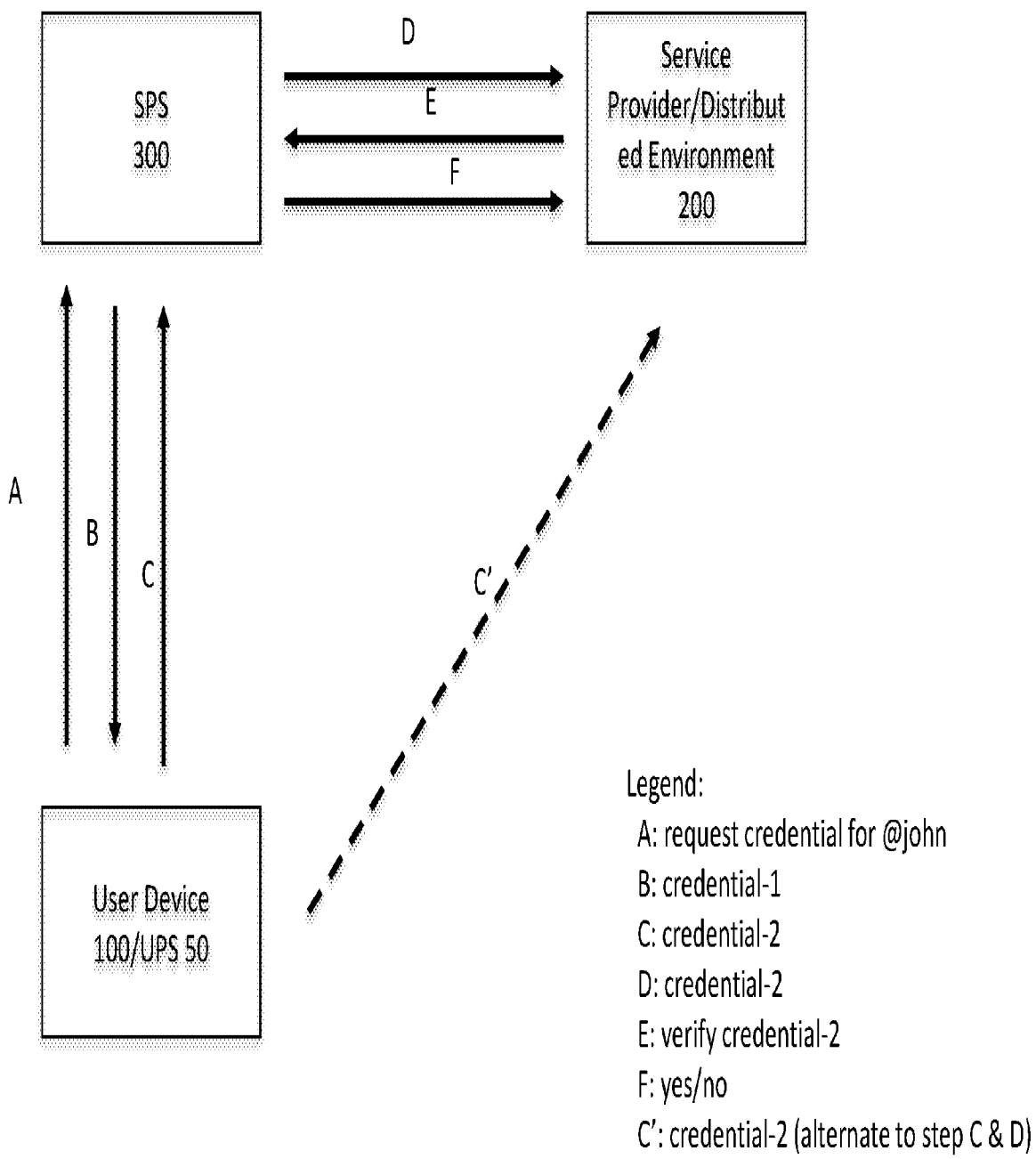
FIG. 17C summarizes the method of FIG. 17B.

FIG. 17C summarizes method M1 wherein we assume, without limitation, that the SPS is used as an authentication provider. Note that the service provider 200 in FIG. 17C may integrate the authentication provider 300 as a sub-component in certain embodiments.

We now proceed to explain the methods by which the various computational objects referred to above, viz., keys, proof, credentials, etc., are derived and authenticated in more detail.

We assume the existence of three software engines KGE (Key Generating Engine), PGE (Proof Generating Engine) and PVE (Proof Verifying Engine). (The components Key Generator 201, Proof Generator 202 and Verifier 203 of the authentication provider shown in FIG. 17A may encapsulate these engines as computer programs.) As is known in prior art, each of these engines may be implemented on one or more computers executing special software logic. A convenient way of describing the functioning of the various engines is to treat them as "block box" devices as shown in FIGS. 18A, 18B, 18C and 18D, respectively.

KGE (111, cf. FIG. 18A) accepts as input a computer program, L, 100. It produces two cryptographic keys, PK 300 and VK 400 called the proving key and the verifying key, respectively.

As an example, software logic has been released in the public domain by Internet providers that processes computer programs and produces key objects (see, for example, "Snarks for C: verifying program executions succinctly and in zero knowledge", by Eli Ben-Sasson, et al., which is available at the website eprint(dot)iacr(org)(slash)2013(slash)507(dot)pdf via a secure http, i.e., https, connection.

It is important to note that the keys PK and VK produced by the KGE are a function of the input software logic. Any changes to the software logic engenders a different PK and VK to be produced. Furthermore, the complementarity of PK and VK is dependent on the input software logic. That is, the output keys uniquely characterize the input algorithm in the sense that any change whatsoever to the input algorithm necessitates changes to the output keys.

The term "key or cryptographic key" refers to digital data objects that satisfy the following properties.
  (P1) The output keys, if rendered on a display screen may appear as a random sequence of binary (hexadecimal) digits.
  (P2) No two distinct input algorithms to the KGE will produce the same output keys.

PGE (222, FIG. 18B) accepts an encoded object EO 500 (i.e., a dataset produced as per the descriptions below) and the proving key PK 300 (produced by KGE above) and produces a cryptographic object called the proof, P (555) and a new dataset Encoded Object (EO-2 550) that is a function of the input EO 500. The cryptographic object "P 555" satisfies the property P1 above, viz., if displayed, it appears as a random collection of (hexadecimal) digits.

Figure 18A:
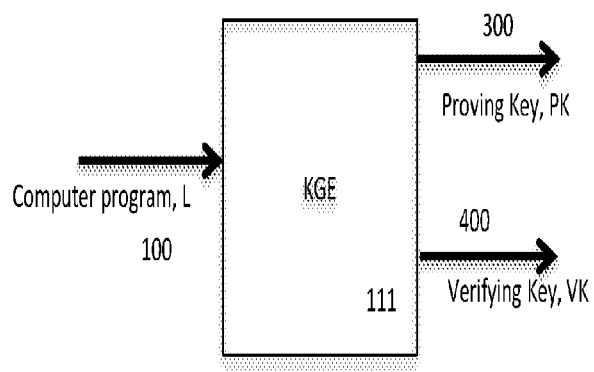
FIG. 18A is a functional block diagram illustrating the operation of a Key Generating Engine (KGE) that generates cryptographic keys and objects.
Figure 18B:
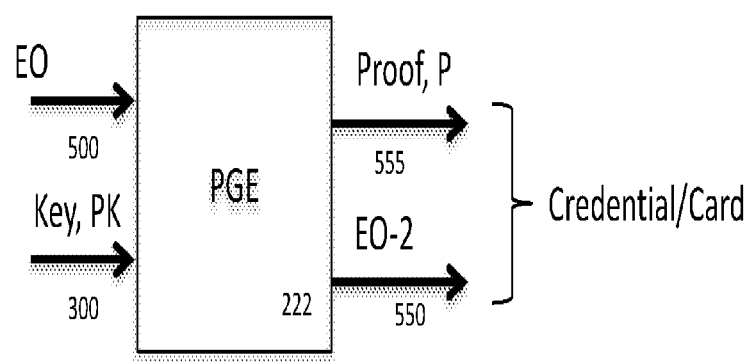
FIG. 18B is a functional block diagram illustrating the operation of a Proof Generating Engine (PGE) that generates a cryptographic proof.
Figure 18C:
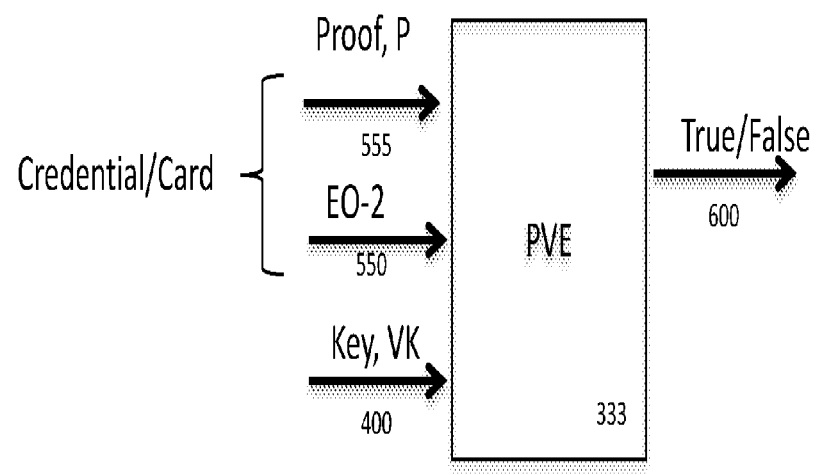
FIG. 18C is a functional block diagram illustrating the operation of a Proof Verifying Engine (PVE) that verifies the accuracy of the cryptographic credential.

PVE (333, FIG. 18C) accepts as input a verifying key, VK (400), produced by the KGE, a proof object P (555) produced by the PGE, and a dataset EO-2 (550) and outputs either "true" or "false". It produces the response "true" if and only if all the following conditions are true; otherwise it produces the response "false".
  the dataset 550 and proof object P (555) is produced by PGE 222 (cf. FIG. 18B);
  the key VK is produced by KGE;
  It is to be noted that PVE (FIG. 18C) thus may be used to verify that the objects "proof" and "encoded data" (FIG. 18B) were produced using the algorithm "L" input to KGE (FIG. 18A). If the objects "proof" and "encoded data" are together referred to as a "credential" or "card", we may then state that the credential or card is verified to have been produced by the given algorithm, L.

We reiterate that the verification of a credential by using the verifying key also ensures that the credential was produced by running the engine KGE with a given algorithm. We refer to this feature as verifying the provenance of the credential, i.e., the credential derives from an algorithm that is known and unchanged.

We now show and discuss enabling embodiments of constructing and using KGE, PGE and PVE.

It is well-known in prior art that a user's fingerprint data when captured by fingerprint sensors/scanners may be represented as a matrix of data, typically a 1000×1000 matrix (see, for example, "Using Chebyshev's inequality to determine sample size in Biometric evaluation of fingerprint data" by J. Chu et al., National Institute of Standards and Technology, Gaithersburg, Md.). For ease of discussion, we limit our enabling example to a dataset with 9 samples, i.e., a square 3×3 matrix as shown in FIG. 19A. (Similarly, user's facial data may also be captured as datasets; understandably, facial datasets are larger in size than fingerprint datasets.)

The functioning of the engines KGE and PGE may now be explained by recourse to FIGS. 19A, 19B, 19C, 20A and 20B as follows.

Generating a pair of complementary keys from an input dataset is well-known in prior art (see, for example, Paar et. al., Understanding Cryptography, Springer, N.Y., ISBN: 978-3-642-04100-6; the article by Eli Ben-Sasson et al. cited above shows how keys may be generated efficiently); thus, KGE may be constructed accordingly.

Turning now to the enabling embodiment of the PGE, FIG. 19A shows the exemplary dataset for a fingerprint data of a user as a 3×3 matrix. The cells of the matrix are numbered one through nine using roman numerals (i, ii, etc.); the cell values are shown as integers 37, 42, etc. In FIG. 19B we map each cell value and its position as a pair to one of the integers 1, 2 or 3 as shown. The pairs represent the cell number and the cell value, thus (i,37) means the sample value 37 in cell "i" of the matrix, etc.

We now construct a 3×3 Sudoku Puzzle (also known as Latin Square) using the integers 1, 2 and 3. One such arrangement is shown in FIG. 19C. As is well-known, Sudoku puzzles satisfy the constraint that the sum of each row and column is equal. (In the example shown in FIG. 19C, the cell values of each row and column add up to 6.)

Whereas the Sudoku Puzzle was chosen to be of order (i.e., dimensions) 3×3 and the input dataset was also assumed to be a matrix of order 3×3, this is merely coincidental. We may choose a Sudoku Puzzle of any order as long as its number of cells is larger than or equal to the number of entries in the mapping table, i.e., FIG. 19B. Note that the order of a Sudoku Puzzle is related to its computational intractability. Thus, engineers may wish to determine the order accordingly.

It is to be noted that knowledge of the Sudoku arrangement of FIG. 19C cannot be used to derive the matrix of FIG. 19A without possessing the data of FIG. 19B. That is, going from FIG. 19A to FIG. 5C via FIG. 19B is computationally easy but reversing, i.e., deriving FIG. 19A from FIG. 19C—without knowledge of FIG. 19B—is computationally intractable.

(The notions of computational ease and intractability refer to the efficiency of computer operations and are well-known in prior art.)

Thus, the functioning of PGE may be described as a software program (engine) that takes a fingerprint dataset and an algorithm L as input. The algorithm "L" manipulates the input dataset to produce the mapping (such as shown in FIG. 19B) and from it produces a completed/solved Sudoku Puzzle, such as shown in FIG. 19C.

Taking the dataset of FIG. 19C, i.e., the complete/solved Sudoku Puzzle, PGE splits it into two parts shown as FIGS. 20A and 20B. Note that putting the two split pieces, FIGS. 20A and 20B, together to get the original completed table, FIG. 19C, is computationally easy; however, deriving the completed table, FIG. 19C, from FIG. 20A is computationally hard. For example, it has been estimated that a 9×9 Sudoku puzzle has tens of trillions of possible solutions (6,670,903,752,021,072,936,960).

Thus, PGE may be described as an engine that takes as input an encoded dataset and an algorithm and produces as output (1) an encrypted dataset ("proof component") representing a partially solved Sudoku Puzzle (FIG. 20A), and (2) the "missing" pieces of the Sudoku Puzzle (FIG. 20B, "missing component"), in the clear.

Now we describe an enabling example of PVE with the help of FIG. 21 as follows.

PVE decrypts the proof component (FIG. 20A), combines it with the missing component (FIG. 20B) that is in the clear, to get a completed table satisfying Sudoku constraints. If the table is complete and satisfies the constraints, PVE outputs "true"; else it outputs "false".

Note, that the computational intractability of the Sudoku Puzzle implies that when we split a Sudoku Puzzle into two pieces and distribute them to different entities, we are relying on the fact that any entity that comes into possession of one piece of the Puzzle will require enormous computational power to "solve" the problem, i.e., compute the missing piece; whereas, an entity that has the two pieces of the puzzle may combine them with a relatively small computational effort.

We now apply the above descriptions of KGE, PGE and PVE to more fully describe the methods carried out as shown in FIG. 17B, i.e., we present details of the provisioning operation and of steps 1b, 3, 5a and 7a.

The authentication provider encapsulates two algorithms, Create Credential and Match Credential, into a software package called the Credential Creator, along with logic to utilize the algorithms. In the provisioning step of FIG. 17B, the package Credential Creator is provided to the user computing device.

The "create credential algorithm" is a computer algorithm that generates proving and verifying keys as explained above. The "match credential algorithm" is a computer algorithm that matches two (actual) fingerprints and produces a yes/no response. Several Internet service providers, e.g., Amazon, have provided fingerprint data and facial image data matching algorithms as open source software.

Figure 22A:
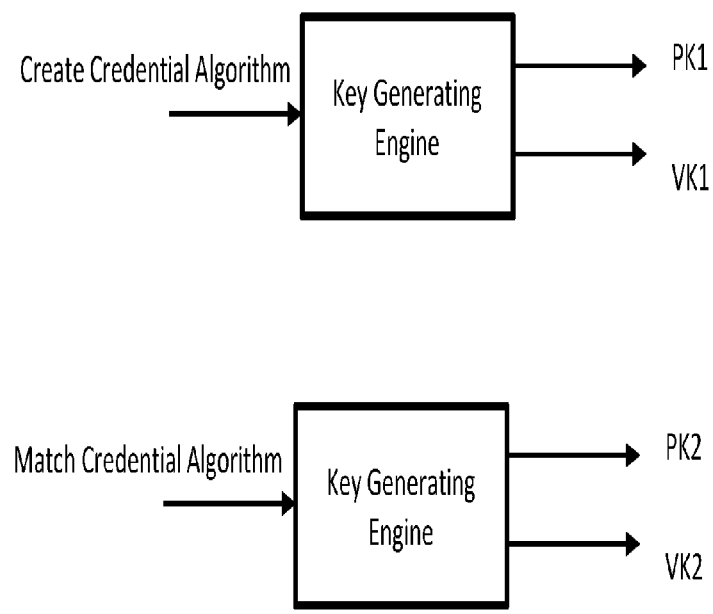
FIG. 22A shows the key generation by the authentication provider.

In step 1b (cf. FIG. 17B), the authentication provider produces keys PK1 and VK1 with Credential Generating Algorithm as input to the KGE. Next, it produces keys PK2 and VK2 with Match Credential Algorithm as input to the KGE. These two cases are shown in FIG. 22A.

Figure 22B:
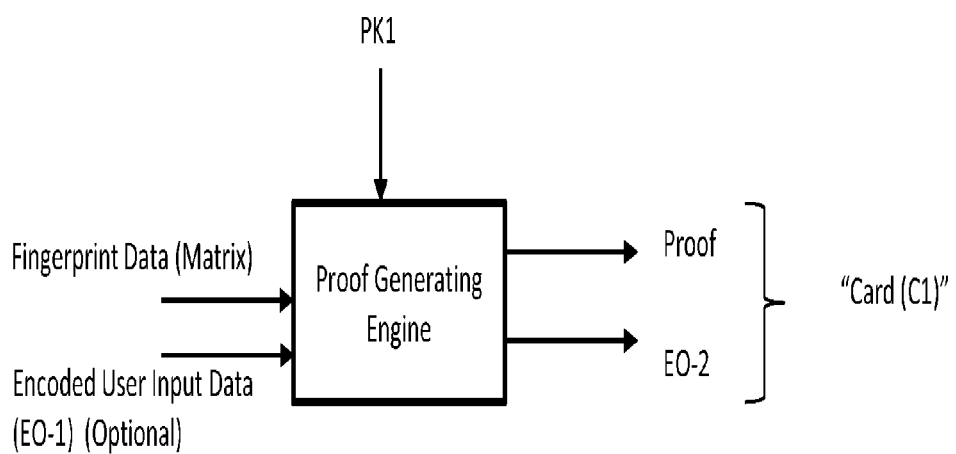
FIG. 22B shows credential generation by the authentication provider.

In step 3 (cf. FIG. 17B), the authentication provider uses PGE to generate a credential, C1, composed of the proof object and an encoded object. This is shown in FIG. 22B. The input to the PGE is the fingerprint data matrix derived by the Credential Creator 101 (cf. FIG. 17A). In certain embodiments, in an optional operation, additional datasets may also be provided as input to the PGE. For example, the user may provide a name or a phrase that gets encoded into the credential. This feature is reminiscent of two-factor authentication in the sense that the credential encapsulates two items to authenticate the user, the fingerprint data and the username or phase. Thus, the credential generation and presentation phases will require two items of information.

PGE (FIG. 22B) produces a proof object and a version of the encoded data as output. The combination of these objects is referred to as a card, C1. It is to be noted that the term "card" simply is a name for the combination of the indicated computational objects, i.e., the proof and the encoded dataset. It does not refer to a physical entity. (The terms "credential" and "card" are used synonymously.)

Figure 22C:
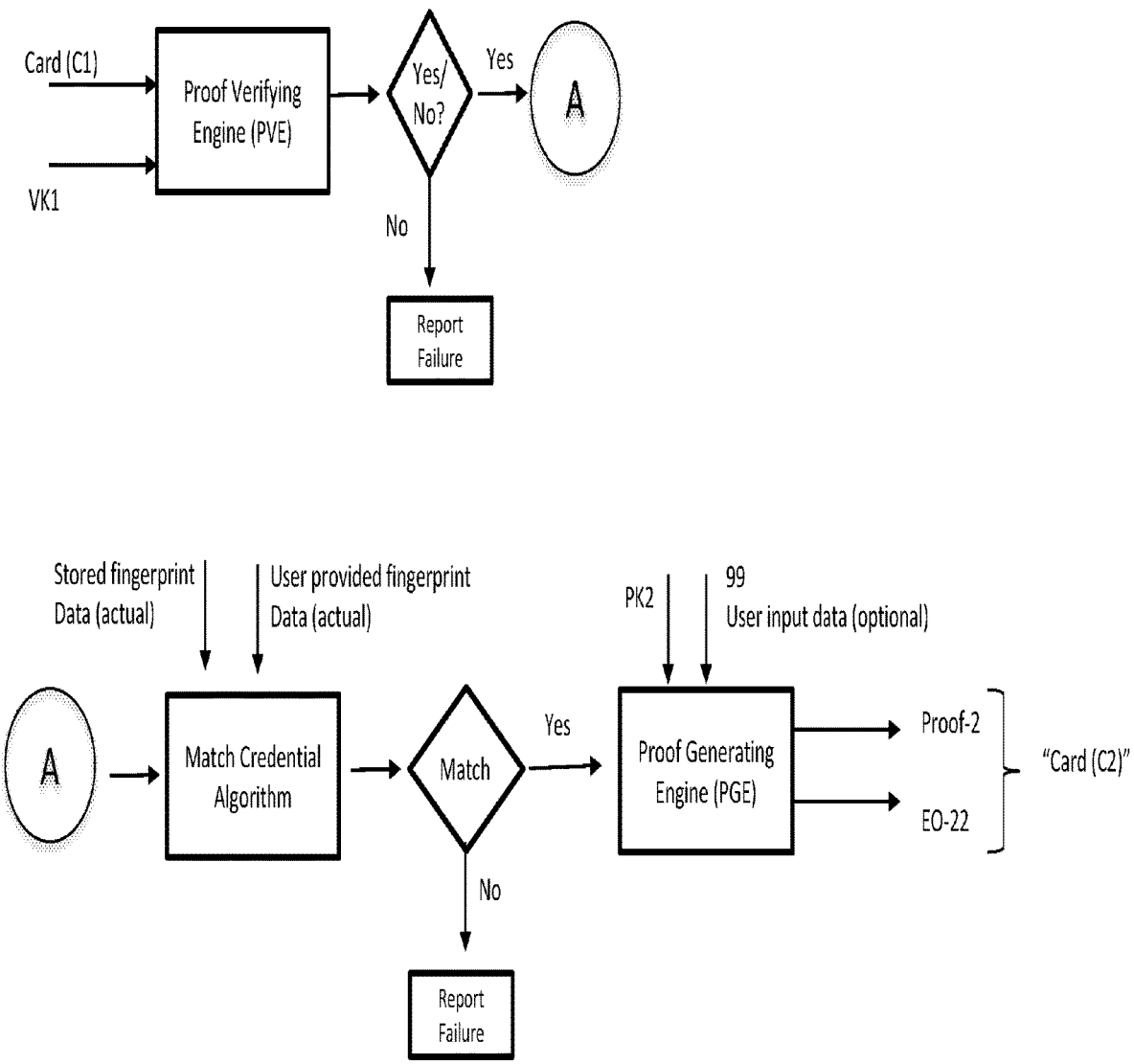
FIG. 22C shows credential generation by the user computing device.

In step 5a (cf. FIG. 17B), the user computing device uses the Credential Creator software package to execute the process shown in FIG. 22C. The process when executed generates a second credential/card, C2.

The process of FIG. 22C may be described as follows. Recall that the user computing device possesses "C1" and has received VK1 from the authentication provider (as described in FIG. 17B). We use C1 and VK1 as input to PVE and verify C1 using PVE. If C1 is verified (i.e., PVE outputs "yes"), we proceed as follows; otherwise we report failure and terminate the process.

The process of FIG. 22C now asks the user to provide his fingerprint (actual) and user input (if any, e.g., a username). These are fed as input to the Match Credential Algorithm to check if the provided fingerprint matches the stored fingerprint of the user. A negative match is reported as failure. Upon positive match, we invoke PGE with inputs PK2 and user data (if any) to generate card C2.

Figure 22D:
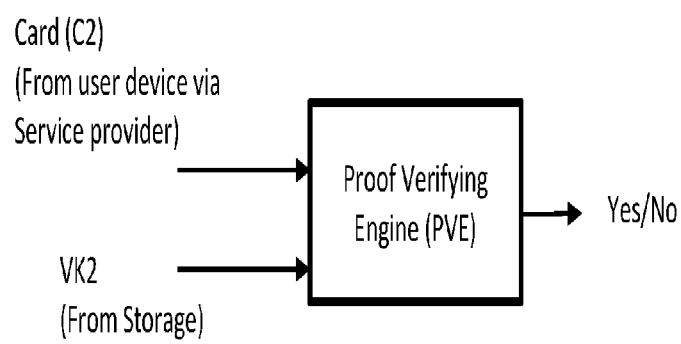
FIG. 22D shows credential verification by a service provider.

In step 7a (cf. FIG. 17B), the authentication provider uses PVE and VK2 to verify C2 as shown in FIG. 22D.

It is important to observe that whereas C1 encodes the relationship between a fingerprint data matrix and a user specified input, C2 encodes the two facts:

1. (1) The verification of C1 establishes the relationship between the fingerprint data matrix and user input;
2. (2) The verification of C2 establishes the relationship between the user input and the actual fingerprint of the user.

From facts (1) and (2), it follows that the user input data "links" the fingerprint data matrix to the user's actual fingerprint.

The verification of C2 thus establishes that the user who generated C1 is the same as the user who generated C2. It is also to be noted that there is no disclosure of user identity to the authentication provider and the data objects that it may store, generate or verify. Note, since the user input is encoded into the fingerprint data matrix, the authentication provider is unaware of the user input. All the data objects obtained by the authentication provider (as provided by the user computing device or the service provider) are cryptographic objects.

Accuracy of Provided Information

The above discussion has shown how a user's fingerprint or other biometric data may be used to create credentials by using the engines KGE and PGE. (The credentials may then be verified by using the engine PVE.) The input to these engines are a pair of algorithms called Create Credential and the Match Credential Algorithms.

We may use the KGE, PGE and PVE engines to create and verify credentials from datasets relating not only to fingerprints but other biometric datasets such as facial images. As mentioned above, facial images may be viewed as matrices of pixel data that may be encoded as data matrices suitable for manipulation by algorithms. Just as the Create Credential and Match Credential Algorithms manipulate fingerprint data matrices, we would need algorithms that manipulate facial image data matrices. We may posit two such algorithms and dub them as Create Facial Credential and Match Facial Credential algorithms.

In certain embodiments, a user may also be allowed to add (as user input) selected attribute information, e.g., a string of characters such as "@john", "likes classical music", "address=10 Main Street", etc., by utilizing a suitable API on the user computing device. This is shown as optional input (99) to PGE in FIG. 22C.

In addition to fingerprint and image datasets, a user's financial information (e.g., credit card) or driving license, when treated as a dataset, may be used as the input dataset. Note that a typical driving license contains both a user's facial image and user attributes such as street address, date of birth, etc. If user attribute information from a user's driver license or credit card are encoded as verifiable credentials, it will then be possible for a service provider to ascertain the accuracy of the user's information.

Thus, for example, a user may be able to present credentials to a service provider that denote that the user's age is greater than 21, based on the credentials being derived from the user's driver license. That is, a user computing device may be provisioned with suitable software, mimicking the Credential Creator 101 shown in FIG. 17A, to process image dataset of a driving license.

More specifically, we may use two algorithms Create DL Credential and Match DL Credential as input to KGE to derive two sets of keys (PK1, VK1) and (PK2, VK2), respectively, as described above in FIG. 22A. That is, the KGE engine is fed the Create DL and Match DL algorithms that are different than the ones shown in FIG. 22A.

Proceeding further with the description, in step 2a (cf. FIG. 17B), the user computing device is provisioned with a suitably modified Create Credential software package (cf. FIG. 17A).

To generate a credential from a driver license dataset, we may now use the method M1 described above. Note that the only change needed to method M1 to process the driver license dataset rather than fingerprint dataset is the use of the different algorithms, viz., the Create DL and Match DL Credential algorithms.

Note that since a user's driver license contains both an image of the facial features of the user and his date of birth, the credential derived from it may serve to authenticate both the user and his age. Similarly, since the driver's license contains the user's street address, the credentials based on the driver license may also verify the street address of the user, etc. (The accuracy of additional informational attributes added by a user to the input dataset may also be established in a similar manner.)

Similarly, a credit card containing a user's fingerprint and/or facial image data, along with additional informational attributes such as account number, etc., may serve as the basis of a cryptographic credential. Again, this may be achieved by using algorithms that manipulate credit card datasets.

We now return to the embodiment described above in which we had asserted earlier that SPS may create and store an association object representing a username. We provide the following description to support that assertion.

We posit the existence of two algorithms, say Create Username and Match Username. The former algorithm operates as follows.

The user is asked to provide or choose a first username. The algorithm generates a unique dataset, i.e., a table of data, dependent on the provided username. That is, the dataset is a function of the input. The dataset and the first username may be used, as described above, to generate a first credential/card, C1, that is stored in the SPS.

The Match Username algorithm operates as follows. The user is asked to provide a second username. The algorithm generates a second dataset related to the provided second username. We may now match the first and second user names (equivalently, we may match the first and second datasets). Upon a successful match, we may generate a second credential/card, C2, as described above. Note that C2 will contain a cryptographic object and a clear data object, the latter being either the first or second username.

A service provider receiving card, C2, may treat it as an association object since it contains a cryptographic object and a clear object. To verify its authenticity, the service provider may request the same from SPS (as described above).

Driver licenses, credit cards and other such instruments that contain authenticating and miscellaneous attribute information regarding consumers may thus be used to create credentials that authenticate and validate a user's identity, his informational attributes and the accuracy of assertions made by a user, by employing algorithms that can process the datasets related to these instruments along with the KGE, PGE and PVE engines.

It is to be further noted that the verification of a credential by PVE further entails the fact that the input algorithm that generated the credential, e.g., Create Credential Algorithm of FIG. 22A, etc., was unchanged, since otherwise the PVE would have failed in its verification. That is, successful verification by PVE entails the provenance of the algorithm input to the key generating engine.

Thus, the obfuscated object corresponding to a username, created and maintained by the UPS as described above, may also be verified, as to its authenticity and provenance, by using the PVE engine.

The various software engines and algorithms used in the credential generation and presentation processes discussed above may be provided by entities that offer instruments such as driver licenses or credit cards to consumers. In certain embodiments, the verifying function associated with the various credentials discussed above may be integrated by and into such instrument providing entities.

Approximate Objects

In some embodiments, a service provider may need user data to provide services through an application program injected into an environment, e.g., an application program may be in a session with a user computing device and may need the location of the user to provide services to the latter. We propose that attribute information of a user may be represented by an approximate object by converting the attribute's singular value into a range of values.

That is, we take an attribute's value "v" of data type "t" and derive an approximate object from it by adding additional elements (v1, v2, etc.) of the same type and chosen by an algorithmic process. As an example, the attribute age with value "21", i.e., "age=21", may be converted into the approximate object "age=(15, 18, 21, 45, 54, . . . )"; the attribute/value "name=john" may be converted into "name=(john, peter, smith, . . . )", etc. Note that the attribute's value is included in the range.

We require that the range of an approximate object, i.e., its cardinality, be finite and pre-determined.

The notion of approximate objects was introduced in prior art by McCarthy (cf. J. McCarthy, Approximate Objects and Approximate Theories, *Principles of Knowledge Representation and Reasoning, Proc. of 7$^{th}$ International Conf.*, Colorado, 2000) and by Zadeh (cf. L. Zadeh, From Computing with Numbers to Computing with Words, *IEEE Trans. On Circuits and Systems*, 45(1)105: 119, 1999) to capture various kinds of approximate information. In McCarthy's formulation, all information is approximate. For example, the statement "John is nearby" may be true in certain domains and false in others.

As used herein, an approximate object "x=(a1, a2, ... )" means that the attribute "x" has, as its value, one and only one of the elements of the set AS=(a1, a2, ... ). That is, there exists an element "z∈AS" for which the predicate "x=z" is true and the predicate "x=y" is false for every element y≠z of AS.

In McCarthy's treatment, all information is approximate and can be determined only by domain specific means, i.e., by a suitable "approximate theory". In our usage, a user computing device has precise information that is converted into an approximate object. The reverse process, by which an approximate object is rendered precise, can only be performed by the user computing device that created the approximate object.

That is, a user knows or may utilize his user computing device to determine the value "z" above. For example, GPS sensors of a user computing device may be used to determine the location of the user. We may then say that an approximate object in our formulation may be resolved, i.e., rendered precise, by the theory engendered by the user computing device.

For example, the attribute/value "near=2 miles" in McCarthy's formulation may be interpreted as true in some domains (theories) and false in others. In our usage, the attribute/value "near=2 miles" may be interpreted as true/false by a user or a computer program running on a user computing device, possibly utilizing the sensors available to the user computing device. In simple terms, McCarthy's notion of an approximate theory (or a domain) needed to resolve an approximate object is realized by a user computing device along with the sensors available to it.

The authenticity and provenance of an approximate object may be verified using the methods described above by converting it into a credential using algorithms provided by the represented service provider (as described above). Upon receiving such a credential, the service provider may verify it (by recourse to an entity possessing the PVE engine), the verification serving two purposes, viz., that the approximate object was provided by the user, i.e., authenticity, and that the algorithm provided to generate the credential was known and unmodified (provenance).

To show the utility of approximation objects, consider a computer program, say RP (Retail Program), injected into a computing environment. Assume RP provides retail locations of a service provider that are closest to a given location of a user. The following steps are exemplary.

3. RP queries user computing device, UD, for its location.
1. UD provides approximate object, ALO, representing its location wherein UD is located.
2. RP uses the approximation object, ALO, to calculate 3 closest retail locations, say X, Y and Z.
3. RP provides X, Y and Z to UD.
4. UD, since it knows its exact location, computes the distance to each member of the group X, Y and Z and selects the member/retail location with the least distance from it accordingly.

The user computing device may now wish to connect with the selected retail location directly, e.g., it may wish to acquire a route to the selected retail location. To compute such a route, however, we need the exact starting location of the user computing device; the approximate object is insufficient for this purpose.

That is, we need to resolve the approximate object to its "precise" value. And, by the dictates of the present invention, such a resolution must be privacy-preserving. We propose the following method to solve the resolvability problem and exemplify it by returning to the behavior of program RS in the example above, viz., a user wishes to find a route from his location to a retail location provided by a program RS.

We assume that the service provider possesses a table, TR, containing a listing of all his retail stores indexed by their location.

[Method: Resolvability (M2)]
1. Let the approximate object corresponding to an attribute, L, be denoted by ALO. Note that the cardinality of ALO is finite and pre-determined.
2. Service provider injects RS into an environment. A session is established between RS and a user computing device, UD.
3. UD initiates dialog with or requests RS for location of nearest retail store.
4. RS asks user computing device, UD, for its location.
5. UD responds that it can provide ALO.
6. RS asks for ALO of cardinality e.g., 5 (without limitation). In certain embodiments, the cardinality may be negotiated between UD and RS.
7. UD provides ALO with cardinality 5.
8. RS searches table, TR, to determine, e.g., three, retail stores closest to an area bounded by the ALO elements. RS communicates the location of these 3 stores to UD.
9. RS calculates the nearest store from the list of 3 stores provided by RS.
10. RS invites a route-finding program into the session and re-directs it to UD.
11. UD initiates dialog with route-finding program and conveys its exact location to it.
12. The route-finding program calculates the route and informs UD.
13. UD terminates its interaction/dialog with the route-finding program and informs RS.
14. RS clears all virtual machines in the session.

FIG. 23 shows two exemplary approximate objects representing a user's location attribute. The "dots" show the elements of the approximate object with one of the dots being the exact location of the user computing device and is known only to the user computing device.

We further explain this aspect of the invention in the illustrative embodiment of the next section.

Illustrative Embodiment (Private Ride Sharing Service)

Having described various categories of user provided information and its processing in a privacy preserving manner as depicted by FIG. 15D, we present an illustrative embodiment encompassing the various techniques described above. That is, we show by the following illustrative embodiment, the utility of the invention proposed herein and depicted in FIG. 15D.

In the illustrative embodiment below, we consider a service provider that offers a ride sharing service. More generally, of course, similar techniques may be used to deliver any service or product or to perform a transaction. The elements comprising the ride sharing service may be enumerated as follows.

1. User requests a ride utilizing the user computing device.
2. Service provider causes a ride providing device (e.g., automobile or other vehicle) to be sent to the user's location.
3. The user is picked up and brought to his destination.
4. The user pays for the service using the user computing device.

Some concerns of the user may be enumerated as follows.
1. User would like to keep his identity and username private.
2. User would like to keep his pickup and destination location private.
3. User would like to keep his credit card/payment data private.

The service provider may also have some concerns, some of which may be listed as follows.
1. Drivers are provisioned to the user on the basis of being closest to the location of the user to minimize the "waiting" time of user.
2. Provider would like to authenticate user, i.e., no malicious users.
3. Provider would like to be assured of payment verification.

Figure 24A:
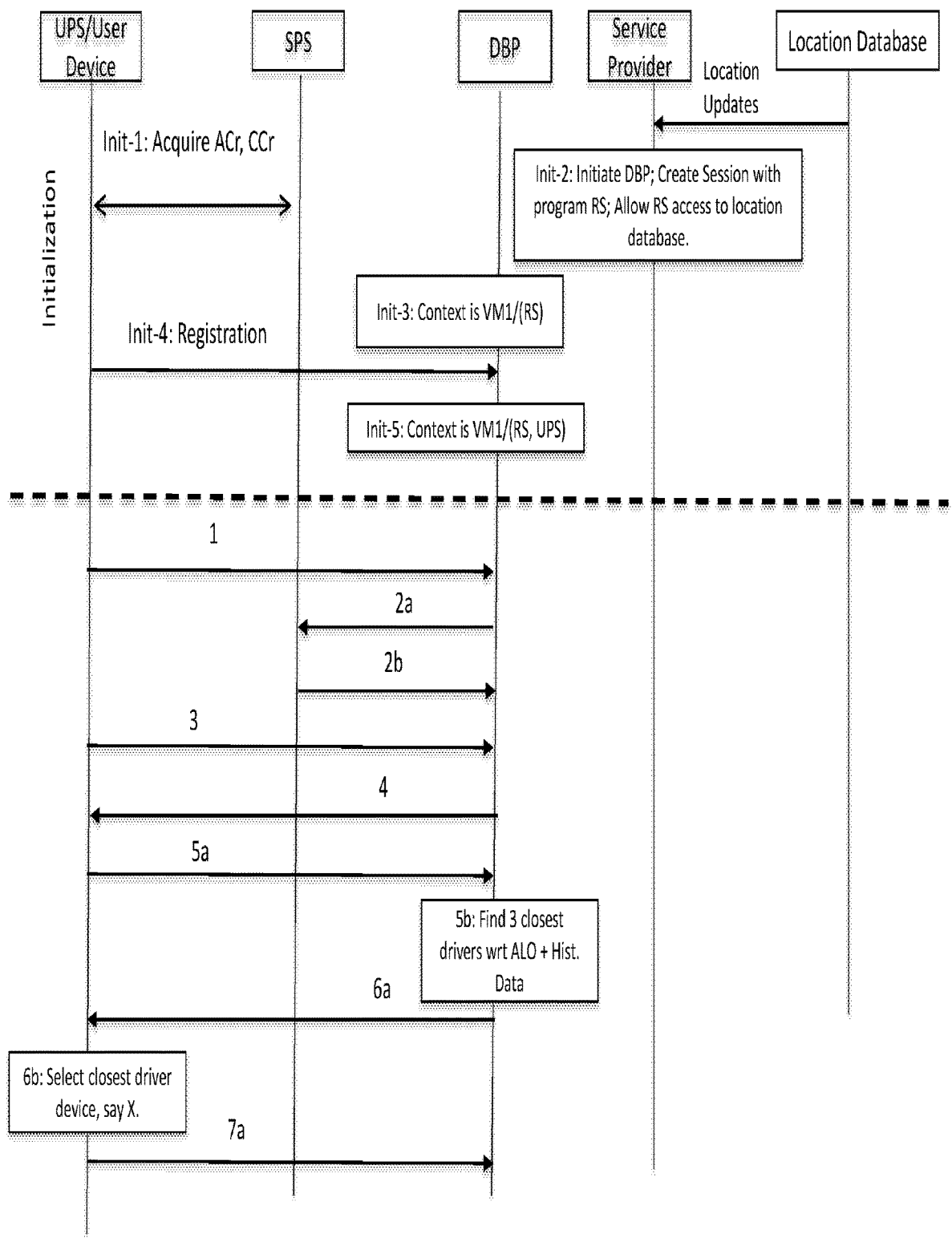
FIGS. 24A, 24B and 24C illustrate an exemplary service using the methods of the invention described herein.
Figure 24B:
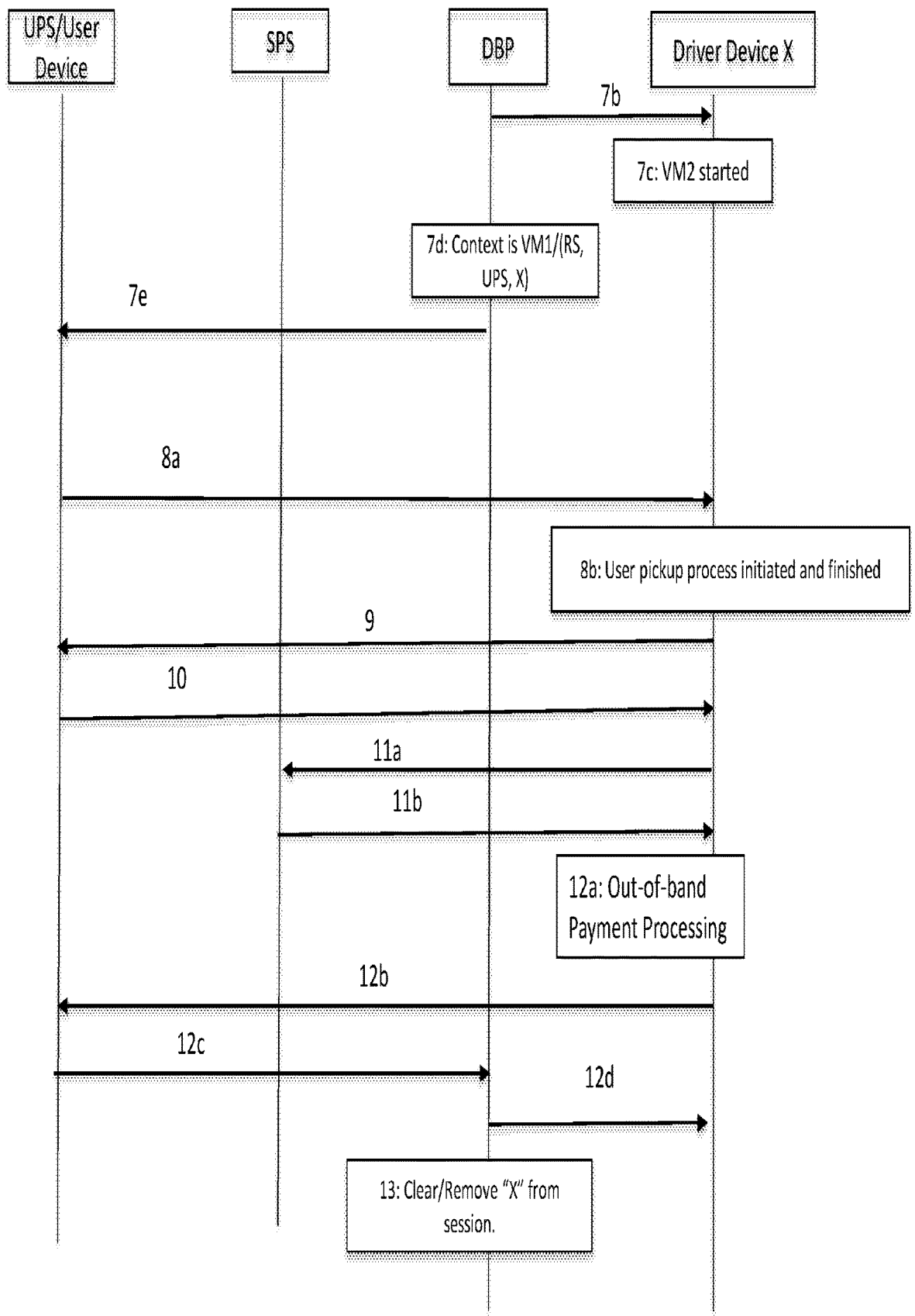
Figure 24C:
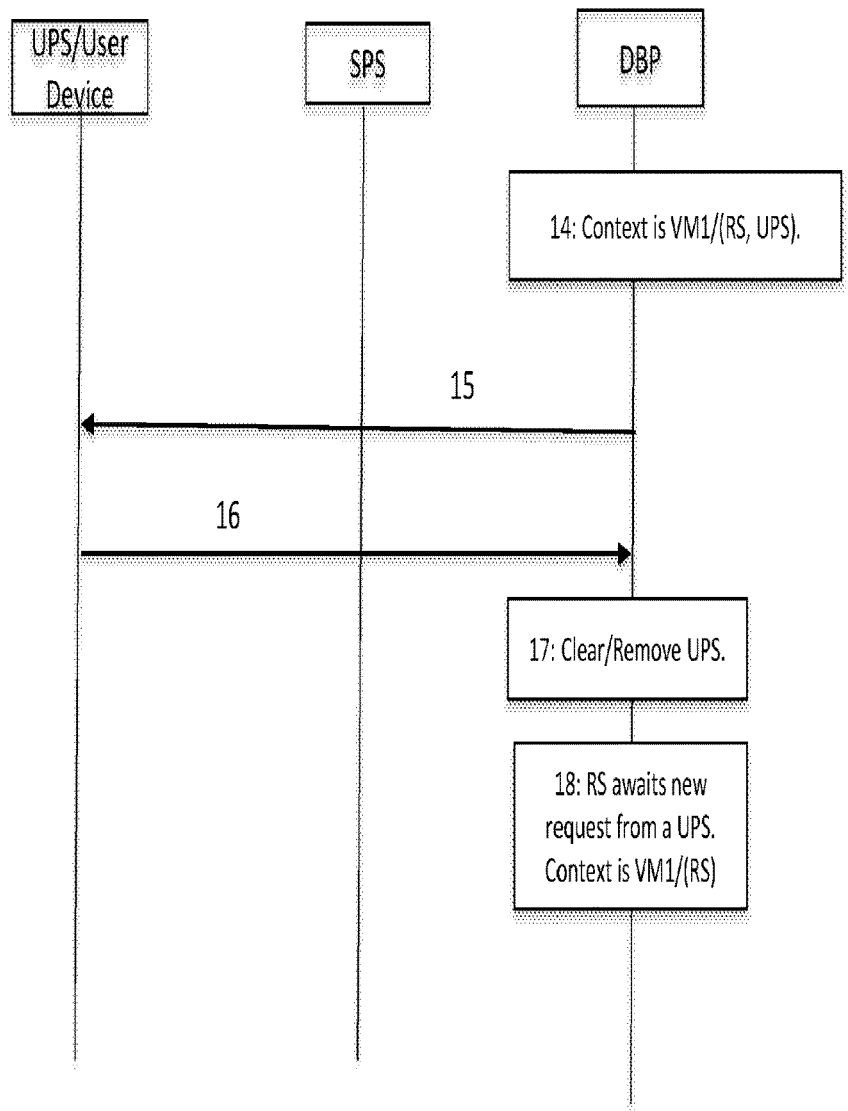

FIGS. 24A, 24B and 24C show one way of implementing the private ride sharing service (as per the service description above) and addressing the concerns of the user and the service provider. The implementation is exemplary and is meant to describe one way in which the techniques of the present invention may be applied to implement this service.

While this particular embodiment employs three computer programs in a single session, more generally any suitable number of computer programs may be employed in a session. Other embodiments may employ more than one session involving multiple devices, computers and programs.

We assume that the private ride sharing service provider decides to be represented by a ride sharing computer program RS that matches drivers to users who want a ride. The service provider has a computing environment that is managed by a database processor, DBP. The latter is suitably configured to create sessions, virtual machines, VM, and run injected computer programs in the VMs as described in the invention herein.

The description of the illustrative embodiment proceeds as follows with respect to FIG. 24A.

A service provider receives location updates from a group of devices, called driver devices (e.g., mobile communication devices that are used by the drivers). The location updates received from the driver devices are stored in a database. The service provider, wishing to offer privacy-preserving ride sharing services, develops or acquires the computer program RS.

In an initialization step, Init-1, a user computing device requests and receives authentication and credit card credentials, ACr and CCr, respectively, from SPS. The user computing device encapsulates the credentials into association lists by choosing an appropriate username, e.g., (ACr, @john123) and (CCr, @john123).

In initialization step, Init-2, the service provider initiates a computing environment managed by the database processor, DBP, and requests the latter to create a session with a first virtual machine, VM1, in which RS is to be executed. (For ease of understanding, the program RS corresponds to the exemplary program CP in FIG. 17C.)

Thus, the session contains a VM, VM1, that runs the computer program RS. We denote this situation as "context is VM1/(RS)" shown in step Init-3.

Note that the service provider may run multiple virtual machines in a session, each of which may run a copy of the RS program to support multiple contemporaneous user requests.

In an alternative embodiment, the program RS may be discovered by the user computing device in a directory and cause it to be injected into the computing environment.

In yet another embodiment, the injection of the computer program RS into the computing environment may be caused by a trigger received by a computer program running on a user computing device, the trigger being available to the user computing device.

It is assumed that RS is pre-provisioned and configured to access the "driver device location update" database.

A user computing device wishing to avail itself of privacy-preserving ride sharing services may request the same from the program RS. Such a request may entail the user computing device to open an account, receive specific service logic, etc. We refer to such operations collectively as the "registration" step shown as Init-4.

Once the registration step is complete, RS invites the user computing device into the session. We may then denote the context as VM1/(RS, UPS) as shown in step Init-5.

It is important to observe that we are assuming the embodiment described above wherein the UPS and RS are in a session and communications between the two are not being intermediated by the SPS.

Step Init-5 concludes the initialization phase. We now proceed with the remaining explanation of the exemplary embodiment.

In step 1, UPS issues a login request to RS using the association list (ACr, @john123). Alternatively, the UPS may respond to a login request received from RS and provide it the ACr and username.

In step 2a, RS requests SPS that the presented credential be verified and receives an affirmation in step 2b. Note that the service provider is assured that the presented credential is authentic but does not know any identity information related to the user, other than the identifier, @john123, which it may use with respect to prior historical data. For example, the service provider may examine its historical data to determine that @john123 prefers certain kinds of music to be played while using the ride sharing service or prefers smart cars with certain capacity. Note, further, that the user utilized the identifier @john to initiate the request but may change this identifier for future requests.

In step 3, UPS requests a ride from RS.

In step 4, RS requests UPS to provide its location.

In step 5a, UPS responds with a data object approximating its location (ALO). RS may verify the accuracy of the ALO using the methods described above; we consider this step to be optional.

In step 5b, the program RS calculates and selects the three (without limitation) closest driver devices to RS, based on the location updates received from the driver devices and the ALO object from UPS. Note further that RS knows the user as @john123 and has access to historical data of @john123 because of the service provider. Thus, its selection of driver devices may be influenced by historical data, e.g., it may modulate its selection of nearby driver devices based on ratings provided by @john123 and other users.

In step 6, the locations of the three selected driver devices is communicated to UPS by RS. In step 6b, since UPS knows its own precise location, it calculates and selects one of the three driver devices, say X. That is, the UPS resolves the ALO and selects device "X" based on the resolution. In step 7a, the UPS communicates its decision to RS.

We continue the above descriptions with respect to FIG. 24B.

In step 7b, the program RS, having received the decision from UPS that the latter has selected driver device "X", invites device "X" into the session and requests device "X" to launch a second virtual machine, VM2 (step 7c).

The session context is now VM1/(RS, UPS, X) as shown in step 7d. The (operating system of) device "X" is running its own virtual machine, VM2.

In step 7e, RS re-directs UPS to device X.

Note that the notion of a program re-directing future requests to another program is well-known in prior art. For example, when a website changes its address, requests incoming to the old address are re-directed to the new address. Note further that such re-direct requests may be discontinued later.

In step 8a, UPS communicates its precise location to driver device X to initiate a pickup request. Note that the user computing device's revelation of its precise location is made to device "X" and not to RS since UPS has been re-directed to device X above in step 7e.

Step 8b shows the processes by which UPS is the subject of pickup and drop off processes by driver device, X. We omit details of these operations since they are specific to the underlying service provider and subject to user interface and customization.

In step 9, device "X" requests UPS for payment. In step 10, UPS presents Credit-card Credential, CCr, and the username @john123 to device "X". In step 11a, device "X" requests the SPS to authenticate CCr and in step 11b receives an affirmatory indication.

In step 12a, device "X" records the payment received from UPS as per the credential CCr using an out-of-band process. Recall that CCr conveys no user information to device "X". It merely provides an assurance that the credential is authentic and that a payment processor may proceed with processing the payment as coming from an unknown source.

In step 12b, device "X" sends a request to UPS to terminate the current dialog. In step 12c, UPS informs RS that "X" may be cleared from the session. In step 12d, RS requests X to clear VM2. In step 13, RS removes "X" from the session.

We continue the above descriptions with respect to FIG. 24C.

After step 13, the current context is "VM1/(RS, UPS)". This is indicated in step 14.

In step 15, program RS informs UPS that the device "X" is no longer in the session. In step 16, UPS informs the program RS that it is finished with its ride sharing request.

In step 17, program RS removes UPS from the session. Note that removing UPS from the session may entail logging out the program UPS.

After step 17, program RS has no other program communicating with it in the current context VM1(RS) and, as per its design, may be configured to await a request from a UPS (step 18).

We observe that step 7b requests driver device "X" to launch a virtual machine. The purpose of this request is to ensure that X's interactions with UPS have an additional level of privacy. However, such an additional level of privacy may be deemed optional in certain embodiments and driver device "X" may not be required to run a virtual machine, i.e., "X" may interact with UPS without such an intervening software layer.

It is instructive to re-consider step 12a above wherein the device "X" utilizes an out-of-band method to process a payment from the user computing device made with a credit card credential. As has been discussed above, the credential is secure and preserves the privacy of the user.

However, avid readers may observe that UPS conveys its precise location to device "X" in step 8a. Device X also knows where @john123 was dropped off. That is, the total knowledge of device X about the user after the above process comprises of the elements: "identifier=@john123", credential CCr, and the pickup and destination locations. The identifier @john123 preserves the user's privacy, as does credential CCr; however, X's knowledge of the pickup and drop off locations may be deemed to be problematic about user privacy. We observe as follows.

First, the device "X" knows that it picked up @john123 from a first location and dropped him at a second location, without knowing the identity of the person.

Second, device "X" acquires user's pickup and drop off location information in a virtual machine, VM2, that is cleared when the device is de-registered, i.e., "X's" knowledge is ephemeral.

Thirdly, the device "X" is removed from the session containing RS and UPS.

Finally, once device "X" has been cleared from the session, the UPS is also cleared from the session. Any information related to the user that may remain with RS comprises only obfuscated objects. Thus, the service provider does not retain any user attribute information provided by the consumer during service provisioning, other than obfuscated identifiers and cryptographic objects that are opaque.

In an alternative embodiment, the program RS, since it runs in a session created by the DBP, may also be removed. Furthermore, the DBP may be asked to tear down the session itself. The DBP may then initiate a new session running a new copy of the computer program RS that accepts new ride sharing requests. Thus, the service provider may not retain any user attribute information.

Improvements to Current Database Technology

We now turn to addressing the problem of stored user data, e.g., a database. Database technology is necessary since many applications and services depend on databases. However, it has been a long-standing problem in data processing that databases are susceptible to malicious access, e.g., data breaches, unauthorized access, etc. When a database is breached, commercial transactions may be impacted, services may be disrupted, and users may lose private data. Protecting databases from data breaches is a significant technological problem and many attempts have been described in prior art. However, the technological problem continues to persist.

An important aspect of the present invention is its contribution to improving database technology in such a manner as to prevent unauthorized data breaches. Reports emerge every so often of companies suffering data breaches in which the databases they operate for their commercial tasks are attacked by malicious entities who succeed in gaining access to stored data. In many cases, the stored data belongs to customers of the companies. In other instances, the stored data may comprise intellectual and commercial property of one or more entities. Thus, both commercial companies and the user community suffer from data breaches.

The present invention provides methods by which data in a database may be distributed and/or stored so to prevent data breaches. Briefly, the invention allows certain data in a database to be replaced by cryptographic data that is immune to data breaches. The data replaced by the cryptographic objects itself is stored in user communications devices (It should be noted that the term "user computing device" is from time to time used interchangeably in this document with the term "user communications device"). Specifically, certain data may be designated by system or user policy as private. Data designated private may then be replaced by cryptographic objects. The data designated as private is modified and stored in one or more user devices that are controlled by users (using privacy switch technology introduced earlier).

Once the replacement and data distribution strategy has been executed, the data that remains in the original database is deemed harmless, as per a system or user stated policy.

The present invention defines methods by which data remaining in the database and the data stored in user communication devices may be combined and presented in response to queries or used in database operations. That is, query processing technologies are presented herein that shield applications from knowing the data distribution strategy and the handling of cryptographic data objects.

The receiver of responses to queries are unaware of the strategy by which the data is stored in partitions or retrieved.

The user/communications devices that contain designated private data can only be accessed by programmatic means that are under the control of the users of the devices using the privacy switch technology. Even if a user communication device suffers a data breach, only the data stored in the computing device may be accessed unlawfully, which would represent only one record (or at most a small percentage) of the overall database maintained by the service provider.

Thus, the present invention proposes new database technology that improves the prior art in database technology in the sense that it increases security by minimizing the damaging effects of data breaches.

More concretely, protection from access by malicious entities is achieved by replacing all data attribute values designated as private with cryptographic objects called Referential Identifiers (RIDs) that have the property that they cannot be reverse-engineered to obtain the user data that they have replaced, without solving a computationally intractable problem. Since the database does not contain any data designated as private, malicious access to it is, by definition, benign.

Data protection of stored data is achieved as follows. The data attribute values that have been replaced by the RIDs are distributed amongst associated user communication devices (that operate using the privacy switch technology described above), from which data may be requested in response to a data request. However, the requesting entity needs to first solve a computationally intractable problem for the request to succeed, and, secondly, to guess a secret known only to the user of the associated user communication device (each user may have his own secret).

Thus, data deemed private is not stored in the database. It is replaced by a computational object called a RID that points to user communication devices where the replaced data is stored. From a single user's point of view, then, his private data no longer resides in the database. It resides in his personal user communication device. (In embodiments, the private data may in practice be stored in external storage systems, e.g., cloud storage, but under the control of the user communications device.) A malicious third-party wishing to access the user's data record needs to access both the database and the data stored in the user communication device. Further, it is required to solve a computationally hard problem to get the actual data. We show that distributing data in such fashion leads to increased privacy and security of data, but requires new query processing methods that are detailed herein.

A feature of the new data model is that it may be implemented by extending current database technology as embodied in commercially available systems. Alternatively, it may be used to implement new database systems from the outset. The new database technology presented herein offers several benefits as compared to conventional database systems and, in some cases, compared with private block-chain ledger-based systems.

It is well-known in prior art that block-chain ledger systems are a form of distributed databases. Thus, the improvements detailed below apply to block-chain systems particularly and, more generally, to distributed database systems.

In public block-chain ledger systems, the trust model is centered on a distributed group of computing nodes called miners; any third-party may choose to become a miner by implementing certain networking protocols. Thus, the "correct" database state is represented by the blocks of the ledger in a public block-chain system that are distributed amongst a group of entities. In a private block-chain system, the trust model is centered on a single entity that defines the true state. There may be one or more miners, but they are all under control of a single entity. In the new database technology presented herein, a single entity and associated user communication devices define and maintain the true state.

Exemplary conventional database technology that may be extended by use of the methods of the present invention include, without limitation, relational databases, object-oriented databases, no-SQL databases, columnar databases, etc.

A database system using the technology presented herein has the following benefits/features, in addition to the features discussed above.
1. The database provides a secure, anonymity-preserving audit trail that can be verified by a designated third party.
2. A user may store his personal data attributes, i.e., a profile, on his user communications device or may store a copy of his profile data in third-party storage systems, e.g., a cloud-based storage system.
3. An unauthorized user of a device may not use it to access data. Data stored in a lost user device may be recovered from a copy stored in external storage.

In contrast, a ledger-based system using a private key mechanism to authenticate users is unable to function or recover transaction data if a user loses his private key. A malicious entity, upon finding a lost private key, may use it to access the corresponding block-chain account without hindrance.

Furthermore, there is no known way to prove that a private key belongs to a given user. Possession of the private key implies ownership of the private key. Common folklore recites stories describing users storing their private keys in safety deposit lockers of banks.

In the new database technology presented herein, a user upon losing his user communication device may acquire another user communication device and use it to access his account. An entity finding a lost user communication device may not use it for accessing the database.

We now present details by which a relational database may be extended to achieve the above-mentioned capabilities. The choice of relational database technology is exemplary and is made without limitation. For example, any database technology that builds models of objects with attribute values may be used.

Alternatively, we may implement the proposal described herein as a new database technology from the outset.

A relational database system allows objects to be modeled as a collection of rows (tuples) in one or more tables in which the columns of the tables represent attributes of the objects. Thus, a customer "John" may be represented as a row of a table and his attributes may be represented as columns SS #, Name, Age, Occupation, etc. A teacher may be represented as a row of a table with attributes describing the courses he teaches and the teaching hours of the courses. A supplier may be represented as a tuple with attributes showing the parts he supplies, etc. A collection of attributes whose values uniquely determine an object (tuple, row) is called a key attribute, or simply a key of the table. A table may have more than one key. Often, a particular key is singled out and referred to as the primary key.

Illustrative Embodiment (Customer Credit Reporting Database)

FIG. 25 shows an exemplary database table with attributes SS #, Name, Tran #, Amount, Description, etc. The attribute "SS #" is designated as a (primary) key of the table. By system policy, one or more attributes may be deemed private and marked accordingly. Alternatively, in an out-of-band communication, the user, or both a system policy and the user, may choose the attribute(s) to keep private. In FIG. 25, the attributes SS # and Name are marked as such. Generally, private attributes will comprise a superset of the (primary) key attributes. The attributes Trans #, Amount, Description, etc., in FIG. 25 will be called the non-private attributes.

In simple terms, we partition the set of attributes of the table into two groups, private and non-private, the former being a superset of the primary key attributes.

Current database systems allow query languages that may be used to retrieve objects and their attribute values. Thus, relational database query languages allow rows or columns to be retrieved from one or more tables, or to combine tables, etc. In a certain mathematical sense, relational database query languages are known in prior art to provide a "complete" notion of data operations. Relational databases and query languages and their variants have been commercially available for decades.

FIG. 25 shows an exemplary database table 650 that may be utilized by a credit reporting agency. The database table contains records of customers indexed by their social security number and name. The database records may additionally contain attributes that are non-identity related, e.g., transaction number, transaction amount, transaction description, etc. The latter may not be considered worthy of being private. Database 650 shows two exemplary data records for customers (Name=John, SS #=1234567890) and (Name=Smith, SS #=2434560987). Additional database records have not been shown for reasons of brevity.

We introduce the notion of referential identifiers (RID) as a special name that 1) forms a key of the table, and 2) replaces the attribute values designated as private. FIG. 26A shows the database table 651 obtained by replacing the private attribute values of table 650 FIG. 25 by the arbitrarily selected names @xyz123 and @abc243. We may think of the name @xyz123 as a "placeholder" for the attributes values that it has replaced, viz., [SS #=1234567890, Name=John]. Similarly, name @abc243 is a placeholder for [SS #=2434560987, Name=Smith]. (Table 651 FIG. 26A contains a new column "Encrypted RID Value" that will be explained later.)

Thus, the database table may now contain a column titled RID that contains the designated names.

We will refer to the arbitrary names as RID names and the attribute values they replace as RID values. Thus, @xyz123 is an arbitrary name called an RID name. The corresponding value of the RID name is [SS #=1234567890, Name=John]. (Again, the corresponding Encrypted RID value shown in FIG. 26A will be discussed later.) Similarly, @abc243 is an arbitrary name called a RID name with RID value [SS #=2434560987, Name=Smith].

Clearly, we need to restore the replaced data [SS #=1234567890, Name=John] and [SS #=2434560987, Name=Smith]. The present invention proposes that each such replaced data item be stored in the corresponding user's computing device. Thus, the original database record of a user is distributed between two places/devices: the original table continues to contain the non-private data record and the user's computing device contains the private data.

Figure 26B:
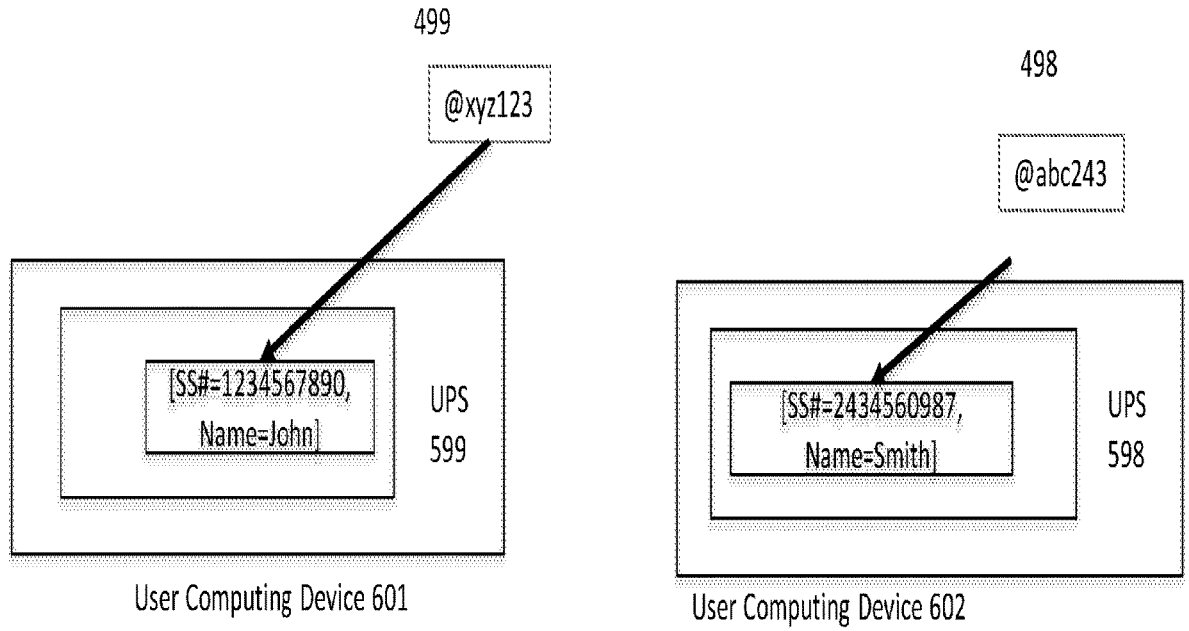
FIG. 26B shows the user communication devices associated with the modified database of FIG. 26A.

Let us assume that the user named "John" has a user communication device shown as 601 in FIG. 26B. We thus store [SS #=1234567890, Name=John] in device 601, shown in FIG. 26B as 499. Similarly, assuming user communication device 602 is user Smith's device, we store [SS #=2434560987, Name=Smith] in 602, shown as 498 in FIG. 26B, indexed by the corresponding RID names.

Thus, the data that originally resided in table 650 (FIG. 25) has now been extracted and replaced by other data (cf. table 651, FIG. 26A) and distributed to user communication devices (FIG. 26B). One method to achieve such a data distribution is to contact the users whose data is stored in the database 650 (FIG. 25) and request their permission to use their computing devices to store their data. The methods by which users are contacted are discussed below.

In this manner, it may be seen that a RID name in a table may be viewed both as representing a key (attribute) of the table and a "link" to data residing in another device. Further, when viewed as an attribute, the RID has a name, e.g., @xyz123. When viewed as a link, it points to a value, e.g., [SS #=1234567890, Name=John], or (with an abuse of usage) it has a value.

Clearly, to get a complete data record of, say, the user "John", query processing methods will need to access both the database table 651 of FIG. 26A and the data residing in John's user communication device. The latter operation may be thought of as finding the value pointed to by the RID name (or as resolving the RID name).

We now describe a method by which an existing database table may be modified as described above.

For each row of the database table, in one embodiment we contact the corresponding user and ask him to choose a RID name. Next, we replace the private attributes of the customer's record with the chosen RID name and send the value of the RID to the UPS of the user's computing device. The latter stores the value of the RID in the user communication device. Further, the UPS communicates the chosen RID name to the SPS wherein it is stored in a table (cf. 652, FIG. 26C).

In certain embodiments, the RID names received by the SPS from user communication devices and stored in the SPS may additionally contain information that may be used to contact the corresponding user communication device. For example, when communicating the RID named @xyz123 to the SPS, the UPS may also be programmed to attach the device ID of the user communication device. This is shown as column marked "Device ID" in table 652 (FIG. 26C). The values stored in this column are assumed to be identifiers that may be used to communicate with the user communication device, e.g., phone number capable of receiving text messages, or email address, etc.

Note that sending device information of the user to the SPS does not violate our privacy policy since the SPS does not convey user information to any requesting entity; it only provides binary answers to verification inquiries regarding credentials.

Table 652 (cf. FIG. 26C) also contains the column labeled "Verifying key" whose purpose may be explained as follows.

We have described above the generation of authenticating credentials for a user from his biometric data. The process involves the SPS provisioning the UPS with algorithms for generating a credential, called a card. The SPS further uses the algorithms to produce two keys called the proving and verifying key. Upon being asked for authentication, the user may then present his card and the SPS may authenticate the user by utilizing the presented card and the corresponding verifying key. The values VK2-1 and VK-2, etc., as shown in FIG. 26C, represent the verifying keys corresponding to the indicated Device Ids (and RID names).

When asked to save the RID value, it is desirable that a user be asked to generate authentication credentials, which may then be subsequently required for authentication purposes when the user is asked to provide the stored RID values. Thus, upon receiving a request to store a RID value, the user generates his authentication credential (card) enabling the SPS to store the corresponding verifying key.

When asked to provide the stored RID value, the user presents his card to the SPS, which verifies the card and hence is assured that the user is authenticated.

Figure 27A:
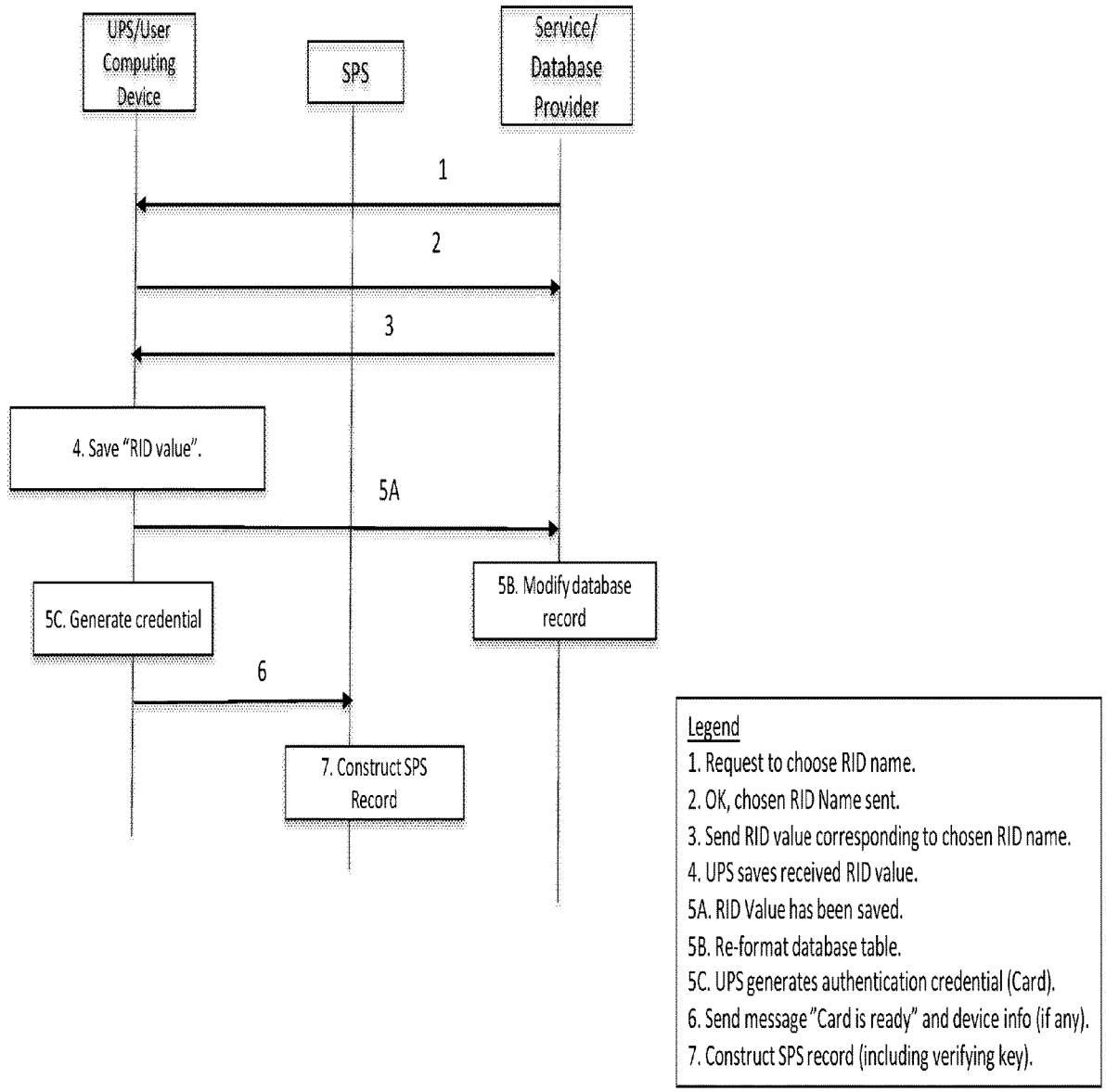
FIG. 27A describes the modifying method.

FIG. 27A describes the process by which personal information in a database is modified and distributed amongst the SPS and user communication devices. In an alternative embodiment, a database may be structured as such from the outset. The communications between the UPS, SPS and the database provider shown in FIG. 27A may all take place over one or more wireless and/or wired communication networks.

In step 1, the user communication device is invited by the database/service provider to choose a RID name for his private information that may be protected. Alternatively, in some embodiments the system may choose the RID name.

In those cases, wherein a new data table is being constructed from the outset, the user communication devices may be contacted or invited according to pre-provisioned lists, e.g., a list of subscribers or prospective customers.

In step 2, the user communication device creates a RID name and sends it as requested. Step 2 may be performed automatically, i.e., without requiring user input or intervention, by a suitably configured computer program available from the service provider, e.g., as a downloadable app, that chooses a random identifier that satisfies the requirements of the service provider, e.g., it uniquely determines, i.e., is a key of, the row of the database table.

In step 3, the database provider sends the "value" corresponding to the chosen RID.

In step 4, the UPS saves the received RID value and in step 5A informs the database provider that it has performed the saving operation.

In step 5B, the service provider modifies the database by replacing private information of the user with the RID name received from the user communication device.

In step 5C, the UPS/user communication device generates an authentication credential (card) for the user of the user communication device. We require that each RID value be associated with a credential (card). It is thus proper to say that the card is associated with the RID value. The process of generating credentials has been described above in detail. Note that the credential generating process entails the SPS storing a verifying key VK2, for each credential corresponding to a stored RID value. In step 6, the user communication device communicates the message top the SPS that the card has been generated for later use as needed. The UPS may further provide device identification information to the SPS.

In step 7, SPS constructs table 652 (FIG. 26C) based on information received from the user communication device(s). After step 7, table 652 (FIG. 26C) has the verifying keys VK2-1 and VK2-2 for the corresponding RIDs with names @john123456789 and (@smith2434560987, respectively, along with any provided device information.

A note on terminology: The rows of the modified data tables will be called data records. We also note that the data tables may be stored in one or more storage servers.

A customer wishing to seek a loan or undertake a purchase subject to credit availability approaches a vendor or a financial institution, e.g., a bank. In conventional commerce, vendors or banks require personal information that they may use to get a customer's credit history from a credit reporting agency. A conventional credit reporting agency may then use a database system such as shown in table 650 (FIG. 25) to provide credit reports on consumers to requesting clients.

Figure 27B:
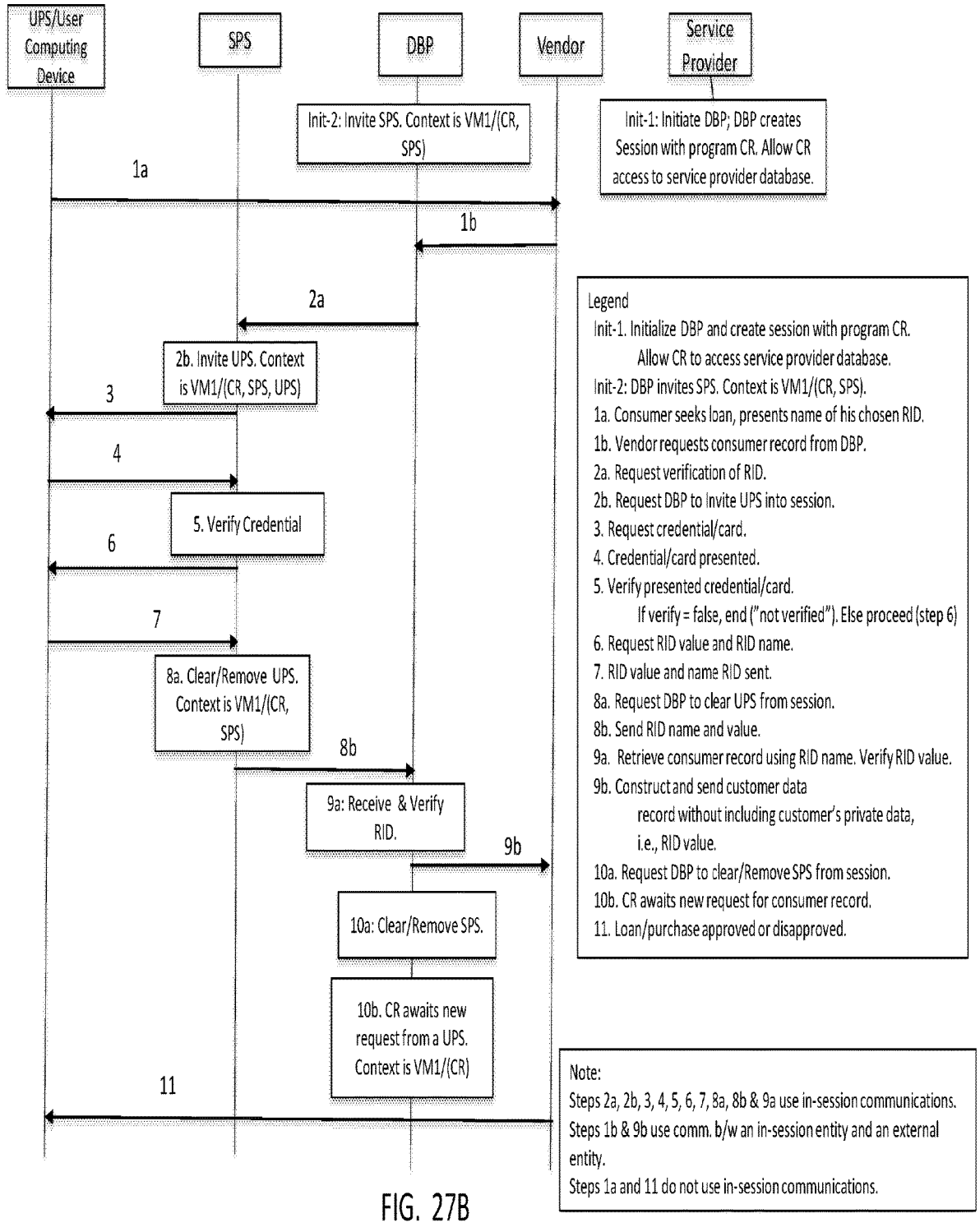
FIG. 27B describes the method by which a modified database may be used to answer queries.

Having modified table 650 of FIG. 25 as shown in table 651 of FIG. 26A, we may use the method shown in FIG. 27B by which a consumer may not be required to give personal information to a vendor when, e.g., requesting a loan or making a purchase from the vendor. Rather the customer may present an obfuscated identifier to the vendor who may then use it to request the credit reporting database to respond with the customer record. The customer record returned by the database is such that it will contain the customer's non-private data (as designated by policy), but none of his private data. At the same time, the vendor will be assured by the database that the data record in the response is a true record of the user, i.e., the user and his data have been verified by the database to be accurate.

The following notes are important to keep in mind in the forthcoming descriptions and with reference to FIG. 27B.

We will use the idea, as discussed above, of computer programs representing computational entities such as the UPS, the SPS and the database. These computer programs are configured to run in a session that allows them to communicate between themselves and, in restricted form, to one or more external entities. Thus, a first computer program representing, say the UPS, may communicate with a second computer program representing the SPS, both the first and second computer programs being in the same session. (In prior art, such communications between computer programs within a session may be enabled by using inter-process communications.)

It is therefore important to note that there are two kinds of communications being described by FIG. 27B (and other figures) and their associated descriptions.

One type of communication is between computer programs within a session. Another type of communication is between a computer program in a session and a computer that is not in the session, which will typically occur over one or more communication networks such as the Internet. We will point out the two different types of communications as needed in the descriptions that follow.

Figure 37:
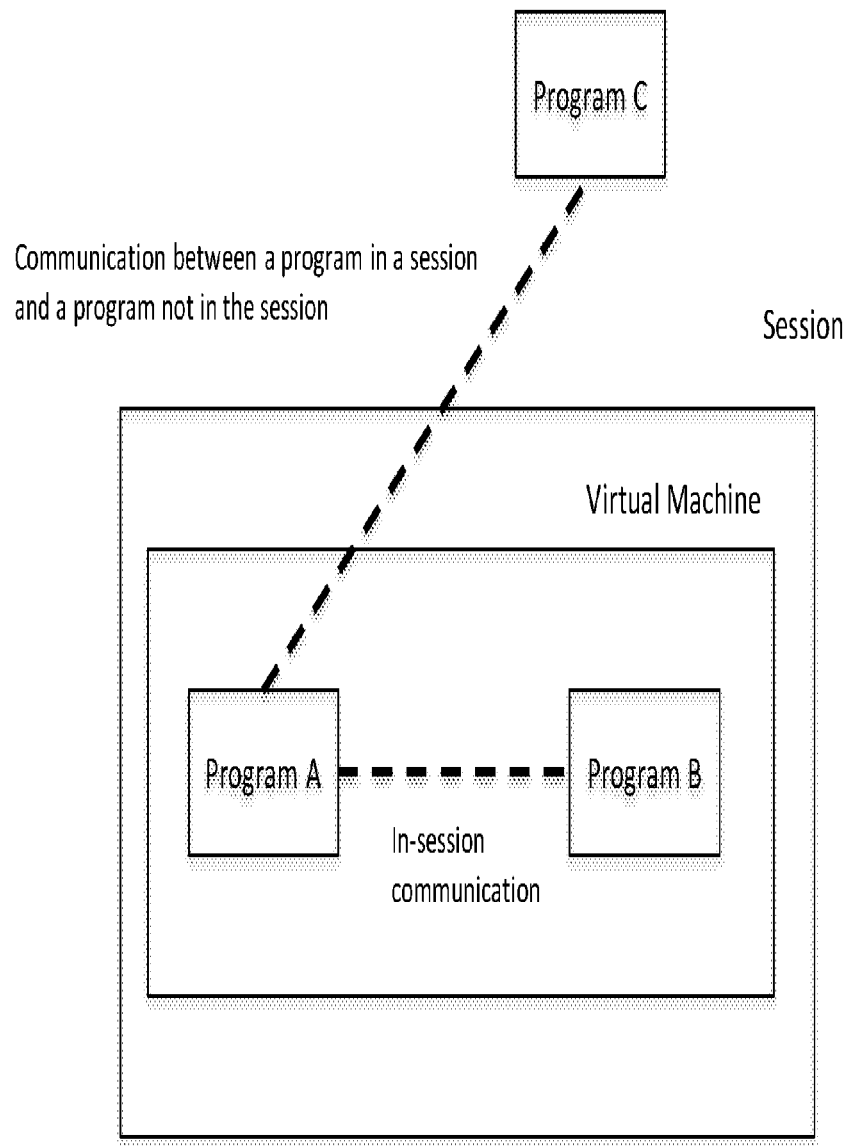
FIG. 37 shows an exemplary session running two computer programs A and B in a virtual machine. The program A and B may engage in in-session communication between themselves and with program C that is not running in the session.

In a first initialization step (Init-1), a credit reporting service provider initiates the database processor DBP (as described above) that creates a session containing a specific virtual machine, VM1 that runs computer program, CR. That is, as described in detail above, the credit reporting agency is being represented by the computer program CR that runs in a virtual machine VM1 that is itself a computer program in the session created by the DBP. We may use the terminology "context is VM1/(CR)" to denote this phenomenon, i.e., the session created by DBP contains a virtual machine VM1 and program CR runs in VM1. We note that more than one computer program may be invited into the session by the DBP (as is well-known in prior art) and made to run in VM1. FIG. 37 elaborates the concept further wherein two computer programs, "program A" and "program B", are shown running in a virtual machine in a session. Further, programs A and B may communicate with each other via in-session communications. Programs A or B may also communicate with external programs, e.g., program C in FIG. 37.

Returning to step Init-1, additionally, the program CR running in VM1 is given access to the service provider's database. Thus, CR uses the type of communication between an entity in a session and a computing device that is not in the session to access the service provider's database.

In a second initialization step (Init-2), DBP invites the computer program SPS into the session. The context is now VM1/(CR, SPS). That is, the session contains two computer programs.

In step 1a, a consumer seeking a loan or a purchase from a vendor, utilizing a user communication device presents his RID name to the vendor. (Recall the RID name is an obfuscated identifier.) The vendor seeking to get a credit report on the consumer presents the consumer's RID name to the program CR (step 1b). (Step 1b represents communication between an external device not in the session and a computer program in the session.) Without limitation, let the RID name be @john1234567890. Note, as described above, that the RID name is a key of the database table.

In step 2a, CR asks SPS to verify the presented RID name. In step 2b, the SPS consults table 652 (FIG. 26C), requests the DBP to invite the UPS/user communication device corresponding to the presented RID name, @john1234567890, into the session. The context is now VM1/(CR, SPS, UPS). Note that steps 2a and 2b are both in-session communications.

In step 3, the SPS requests, using in-session communication, the user communication device to present the corresponding credential. The user communication device responds in step 4. Note that presentation of credentials, as has been described in detail above, may require the user to use his biometric data associated with the credential and one or more privately known pieces of data, referred to above as user input datasets. In step 5, the SPS verifies the credential using the verifying key in table 652 (FIG. 26C). Details of verifying credentials upon request have been provided above. If the verification fails, the SPS may inform the program CR accordingly. We assume that the verification succeeds and proceed with the description below.

In step 6, the SPS requests the user communication device to provide the RID value and RID Name. In step 7, the requested RID value and RID name is provided.

In step 8a, the SPS requests DBP to clear/remove UPS from the session. The context is now VM1/(CR, SPS). In step 8b, the SPS sends CR the RID name, attaching to it the RID value. Step 8b uses in-session communication.

In steps 9a, CR receives the RID name and value and verifies the RID value (described later), In step 9b, CR constructs the customer record (taking care not to include the RID value in the customer record) and sends it to the vendor. Note that step 9b uses communication between a computer program in the session, viz., CR, and an external device, viz., vendor.

In step 10a, DBP removes the program SPS from the session. In step 10b, the context being VM1/(CR), the program CR awaits the next service request. In step 11, having received the customer record, the service provider may inform the customer about his credit decision.

The question arises, in steps 9a and 9b, that since the RID value is not included in the constructed customer's data record to preserve his privacy, why request it from the user communication device? We also need to explain the verification of the RID value referred to in steps 9a and 9b. The answers are provided below (cf. Section titled "Encrypted RID Value").

Thus, a conventional database system may be extended, or a new database may be implemented by using the methods described above to modify the data into privacy-preserving data tables and querying the data tables as described. The data in the latter may be operated on by using conventional database query languages, supplemented by methods executed by the database processor or by user communication devices containing privacy switch component UPS as described herein; furthermore, one or more UPS may be associated with a single SPS.

Encrypted RID Value

We now explain the column "Encrypted RID Value" shown in FIG. 26A, and provide answers to the questions raised above, viz., why an RID value is requested from the user communication device, and how is an RID value verified by the service provider.

Storing the RID value in the user communication device introduces a vulnerability that may be exploited by malicious users. The vulnerability may be explained by the following example.

Consider a user, John, whose user communication device contains a stored RID value as per the discussion above. During the execution of the method of FIG. 27B, John's device is requested to provide the stored RID value in step 6. John, acting maliciously, may edit the stored RID value and cause a fake value to be sent. For example, John may use private information of another person who is known to have excellent credit rating.

To prevent such malicious activity, we require that the RID value provided by the user communication device must "match" (in a sense described below) that is previously stored in the service provider database. Thus, when a user communication device is requested to provide a RID value, and it responds with RID value, say V1, the latter is matched against data stored in the database tables. If the match succeeds, we may assume the value provided by the user communication device to be verified; otherwise it may be considered erroneous.

The general idea underlying the "matching" process takes the values of the private data attributes of the user, concatenates them and creates an encrypted string that we refer to as the Encrypted RID value.

We now describe methods for encrypting and verifying RID values in more detail.

Prior art teaches a method called SHA256 (and many variants that are publically available), developed and offered to the public by the National Security Administration, that takes as input a string of characters and produces as output a second string of characters, usually called the digest. The method SHA256 has the properties that unique inputs always produce the same output/digest and no two distinct inputs produce the same output. It is also computationally hard to "guess" the input from a given output. The notion of computationally hard problems has been described above.

Method: [Encrypt RID/value]
1. Input 1: The RID value for the user U. Note that the RID value may comprise one or more attribute values.
2. Output: A data object called the Encrypted RID value to be stored in the service provider database.
3. Method:
   a) The service provider concatenates the various strings comprising the input RID value and provides the result as input to SHA256.
   b) The output of SHA256 is a string of characters called the Encrypted RID Value.
   c) Store Encrypted RID Value in the service provider database.

Next, we present a method to verify an RID value returned by a user communication device (upon request) by matching it against the Encrypted RID Value.

Method: [Verify RID/value]
Consider an exemplary RID value provided by a user communication device. To verify it, we proceed as follows.
(a) Input: Ask user communication device of user U for the RID value. Generally, the RID value may comprise one or more attribute values.
(b) Concatenate the attribute values in the input RID value and provide the result as input to SHA256. Let the result be "V".
(c) Match "V" against the Encrypted RID Value stored in the row corresponding to user U in the service provider database.
(d) A successful match indicates that V is verified.

Lost Computing Device

Various embodiments presented herein require data to be stored in a user communication device, e.g., key attributes, credentials, etc. It is therefore important to consider the case wherein a user communication device is lost.

In current practice, consumers are typically asked to choose a username/password when purchasing or activating a new user communication device. In case this device is lost, the consumer is asked to produce the same username/password whereupon the service provider may assume that the consumer is authenticated and may provision the consumer with a replacement device.

While this gets the consumer a replacement device, for purposes of the present invention, the consumer also needs to be provisioned with "replacement" credentials. Rather than create the needed keys anew, we present a technique that allows re-use of the previously stored proof and verifying keys, PK and VK, but with a new credential/card. This is more computationally efficient (since we do not have to generate the various keys) and it also preserves the consumer's historical record.

We require changes in the proof generating engine (PGE) of FIG. 22B, the Match Credential algorithm requisitioned from the SPS and the method of FIG. 22C. Recall that the user's biometric data is first analyzed into a dataset called the feature set and, second, a representation is derived from the feature set to generate a credential. The original biometric and feature datasets are stored in the user communication device. The Match Credential algorithm works by requiring the user to provide his actual fingerprint (as one input) and compares it to the stored fingerprint data (second input) during the credential presentation process (FIG. 22C).

As a first change, we require that the proof generating engine (FIG. 22B) be modified to transmit the feature dataset of the user and the input datasets provided by the user to the SPS. The SPS stores this information for later use. Note that this not a violation of the user's privacy since the feature dataset cannot be reverse engineered, as described above, to identify the user.

Figure 36A:
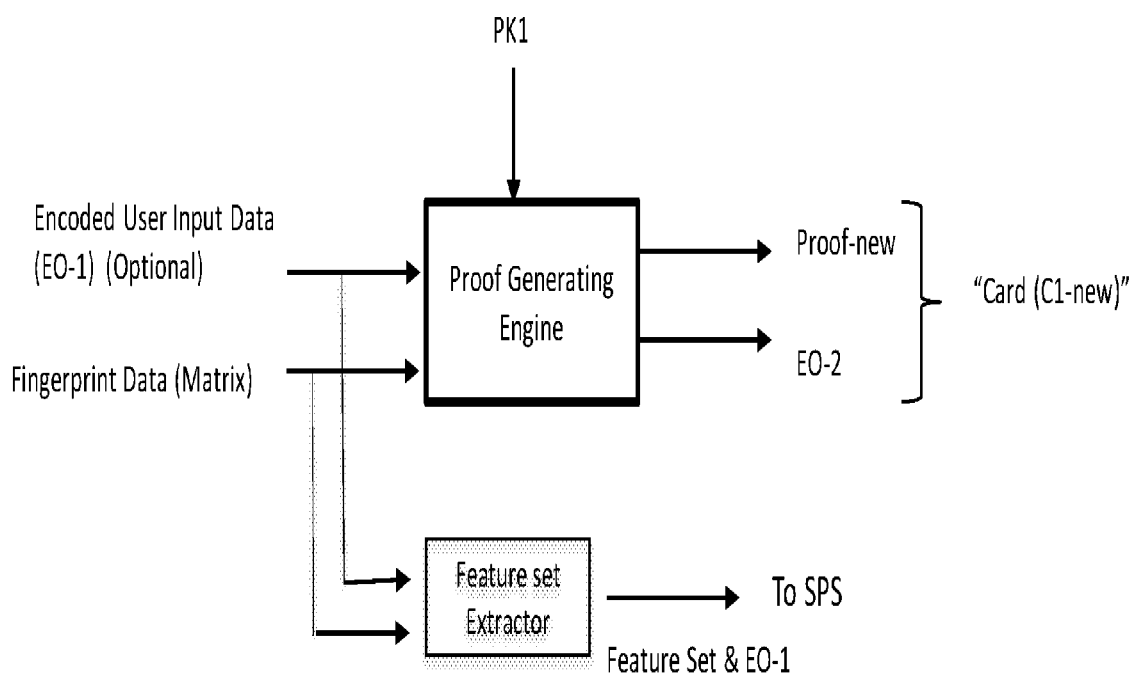
FIG. 36A shows modifications to the Proof Generating Engine for handling lost user communication devices.

That is, we modify FIG. 22B as shown in FIG. 36A in which the user input EO-1 and the user's fingerprint feature set is provided to the SPS.

As a second change, we modify the method of FIG. 22C and show the modifications in FIG. 36B.

In new step 50, the user is asked if the new user communication device is a replacement for an old device. A negative response causes the method of FIG. 36B to proceed as before (FIG. 22C). A positive response causes the method to proceed with step marked "B" (FIG. 36B). The user is asked to provide his fingerprint and a feature set is extracted (51). The previously stored feature set (52) is requested and received from the SPS and the Match Credential algorithm compares 52 with the newly extracted feature set 51. If the match is unsuccessful, a failure is reported. Upon a successful match, the method proceeds as before to generate Card (C2-new).

Alternatively, step 51 may extract the user's fingerprint feature set and provide it to the SPS where it may be matched against the stored feature set. The new user communication device may then be informed as to the result of the match.

A successful matching of the user's stored and provided fingerprint feature sets (elements 51 and 52, respectively, in FIG. 36B) causes the user's fingerprint dataset to be provided to the PGE from whence the method proceeds as described above (cf. FIG. 22C) to generate a card, C2-new.

Now the method for replacing a lost user communication device proceeds as follows.

The user acquires a new computing device and requests credentials from the SPS. The user is asked to identify himself using the same input datasets (EO-1, FIG. 22B, equivalently FIG. 36A) that he provided when generating the credentials in the original (now lost) device. SPS matches the newly provided input datasets with the old stored input datasets and upon successful match, provisions the new user communication device with Generate and Match Credential algorithms as before along with the keys PK1, PK2 and VK1 that it had generated previously (cf. FIG. 22A). Note that SPS retains VK2 as before. That is, we follow the method outlines above in FIG. 22A.

The new user communication device now proceeds as in FIG. 36A to generate a new proof "Proof-new" resulting in a new credential/card, C1-new.

The new credential C1-new is used in method FIG. 36B to generate a new card C2-new. The new user communication device thus now has a new credential, C2-new, that it may present to the database for verification.

The new database technology (cf. FIG. 28E) presented herein therefore enables construction of one or more data tables 200, causing one or more user communication devices 100 to store credentials and key value data; further, the user communication devices may be connected to one or more SPSs 300. Alternatively, the data in the database tables may be modified, using one or more supplementary methods described above, to be devoid of any personal data attributes, the latter being replaced by RID (cryptographic objects). The data in the data tables may thus be manipulated by conventional database query languages supplemented by the methods described herein. User's key-value data may be stored in the corresponding user communication devices 100 or it may be uploaded to a cloud-storage system 400.

In one embodiment, the SPS and the database processor may be provided by a single entity.

It may be argued that requiring a user to approve every inquiry to a database may be cumbersome to users. However, a user communication device may be configured to express a policy statement that is implemented by the database. For example, a user communication device may authorize, e.g., a credit card provider such as American Express or a bank, to obtain credit reports from the credit reporting agency for a specific period, say one month, or a certain number of inquiries, etc. Once authorized, the policy could be implemented by the database server at the credit agency and no further authorizations may be needed for the specified period.

The database server may then get a single authorization from the SPS and use it multiple times in accordance with the policy. A user communication device may also periodically poll the SPS for any outstanding authorization requests. The latter approach also obviates the need to store contact information of user communication devices in the SPS. In such cases, the SPS may use a notification server to alert the user communication devices of needed authorizations. The use of notification servers is well-known in wireless communications technology.

It may also be argued that a user communication device may not have or may lose its network connectivity at a time when an authorization is needed. In some cases, the user communication device may have been turned off or it may have run out of battery power. We refer to such cases as the user communication device being in a "disconnected" mode.

Again, the use of notification servers in wireless communications to achieve "always on" status for mobile devices is well-known in prior art. We may also require a user communication device to deposit its private data objects, according to a policy, with the SPS by which the latter may respond to authorization requests when the user communication device is in a disconnected mode. Such a policy may specify the number of authorizations, the time/vendor for which the authorizations are allowed, etc.

We observe that representing personal data in databases by utilizing the techniques described herein protects personal data against data breaches. Since the database does not contain any personal data, it is immune to attacks on private data. A breach of the SPS may only yield cryptographic objects that are irreversible, by definition, with respect to personal information.

Those skilled in the art will recognize that responses to queries from databases using the technology presented herein may comprise at most one data record. That is, queries essentially ask for data concerning one customer data record. This restriction may be obviated by the user of techniques from columnar databases wherein every column of a data table constitutes an index. Thus, an aggregate query such as "find all data records that have a transaction amount greater than $50" may be answered by finding all data such records in a columnar database indexed on the "transaction amount" column in a pre-processing step and then feeding the resulting data records one by one into the database processor described herein. The results from the latter processing are collected and returned as an aggregate response to the original query.

It may also be observed that all exemplary data records herein relate to users with identifying information. Certain data records, e.g., in commercial cases, may pertain to inanimate objects such as parts, supplies, etc. In such situations, the data records still possess key attributes that may be replaced by RIDs and the associated key value data may be assigned to a pool of pre-provisioned user communication devices, e.g., employees or administrators of the commercial enterprise.

For example, consider a commercial enterprise whose data is stored in a database. The data may pertain to inanimate objects and may not contain any user data. We may partition the database tables into sets of rows, each set assigned to a user communication device belonging to an administrator. Every row in such a database table is then associated with a RID name/value as described above. Additional attributes, e.g., part #, serial #, etc., related to the objects represented in the database may also be represented by RID names and values, i.e., the attributes and values are replaced by RID names and the RID values are stored in the corresponding user communication devices. Queries to the database thus may not be responded to without seeking and getting verification of the RID from the associated user communication device and the SPS.

Thus, in the above exemplary case, the methods of the present invention protect data by using the RID names as locks on the data, the locks being controlled by selected designated administrators. The concern of this embodiment is not on privacy of the user data; rather, it is on locking access to the data.

Finally, a user communication device may be breached and a malicious entity may gain access to the key value information of the user. Note, however, that a user communication device only contains the key value information for a single user. Thus, the vulnerability extends to a single user, not the entire database of the service provider.

We further note that modern user communication devices contain secure storage areas and, as has been observed above, personal data may be stored in such storage areas, rendering it reasonably immune from malicious access.

Additionally, in some embodiments the RID value data need not only be stored in the user communication device. Rather the RID value data may additionally be stored, for instance, in an external storage system, e.g., cloud-based storage complex or a home storage system. Many such systems are commercially available today. The user communication device may then provide a secure key upon inquiry to the database processor which may then use the key to access the RID value data from the cloud storage provider if the user device is unavailable.

The utility of the secure key is that if the user device is not available for some reason, any other entity that presents the secure key may request and receive the private data stored by the user communication device. The calculation (T1=T2) below assures the cloud service that the provided secure key was obtained from the user communication device that stored the private data. Hence, the secure key serves as an authorization credential.

That is, UPS logic (in the user communication device) may generate two random strings of data, say S1 and S2. It may then concatenate S1 and S2 whose result, say S3, is fed as input to SHA256 to produce output, say T1. The UPS may then provide T1 and S1 to the cloud service and S2 to the SPS as the "secure" key. (We may require that the user also presents his credential when sending S2 to SPS.) Now when the database needs to access data from the cloud service, it requests the SPS to verify the RID value. SPS sends the previously saved string S2 (secure key) to the cloud service, which concatenates S1 and S2 and feeds the result to SHA256 to get T2. It then compares T1 and T2. Access may be allowed to the user's private data if T1=T2 and denied otherwise.

Figure 38:
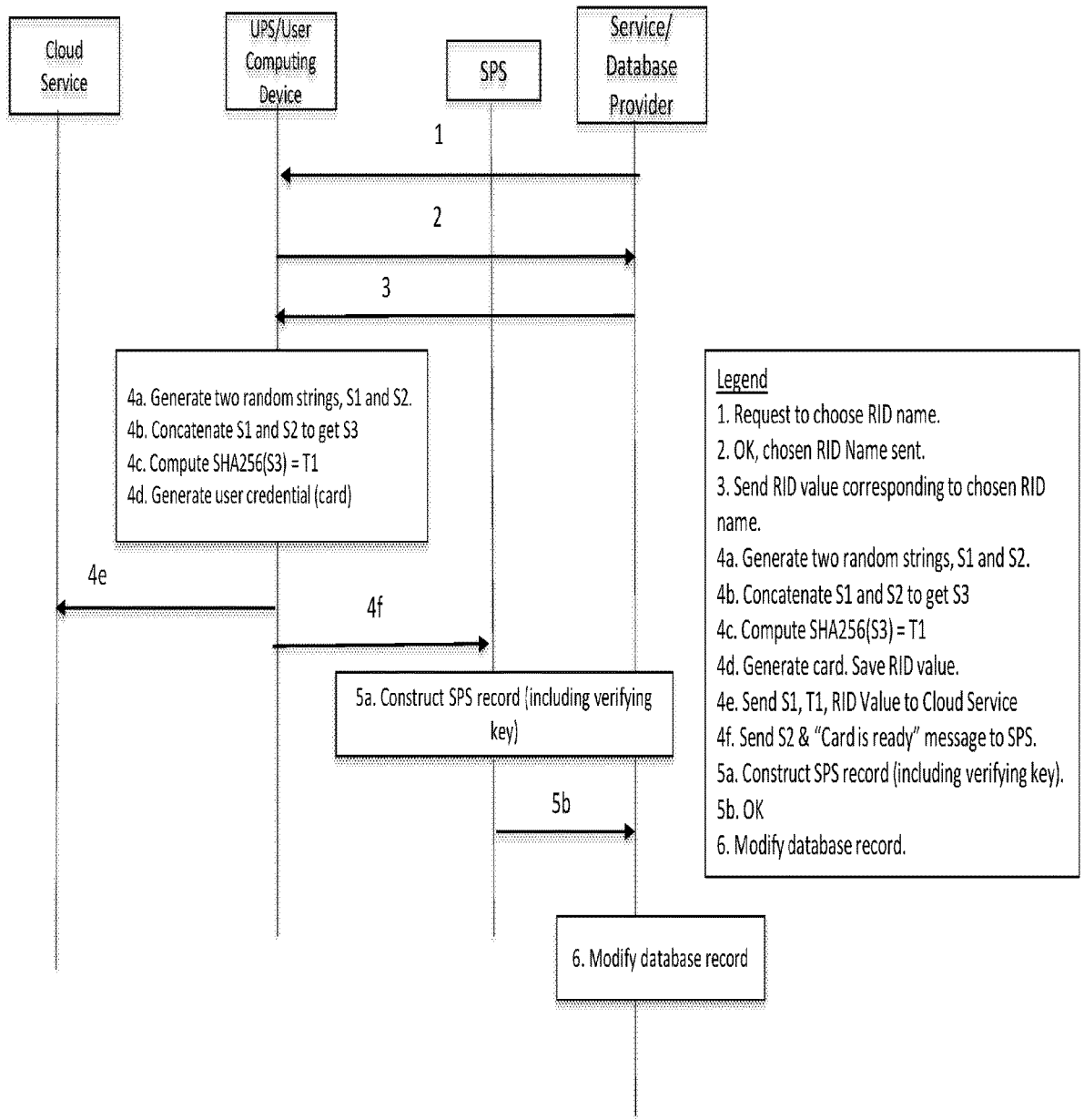
FIG. 38 describes the database modification method in the embodiment wherein the private data is stored both in an external storage system and the user device, e.g., a cloud storage environment.
Figure 39:
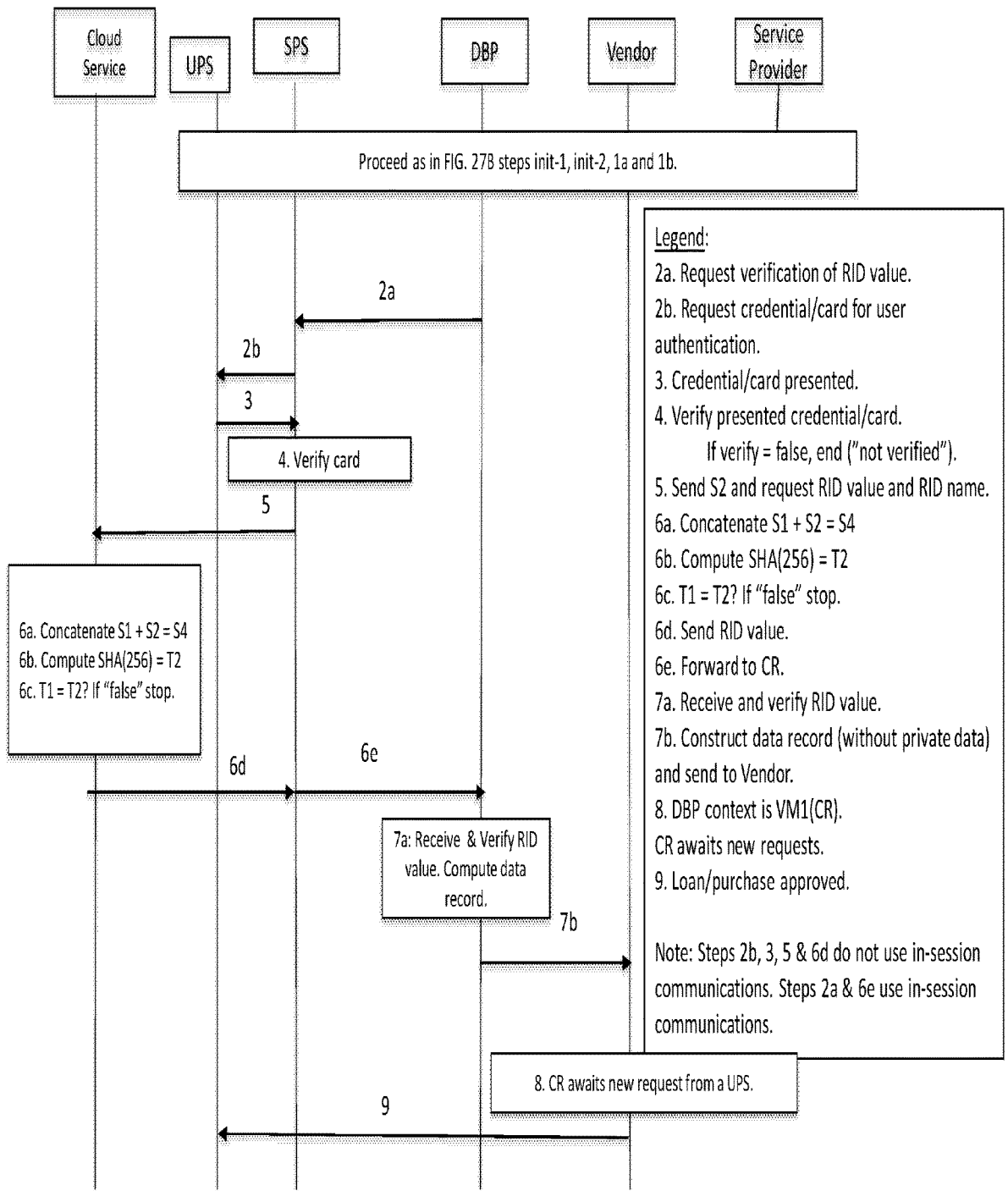
FIG. 39 describes retrieving private data stored both in an external storage system and user communication device(s).

The necessary modifications to FIGS. 27A and 27B are shown in FIGS. 38 and 39, respectively.

Note that steps 1-3 of FIG. 38 are the same as that of FIG. 27A. In steps 4a-4c, we calculate the secure key S2 and the associated strings S1 and T1. In step 4d we generate the user authentication credential (card) and store the RID value received in step 3. In step 4e, we send S1, T1 and RID value to the cloud service. In step 4f, S2 is sent to SPS and it is informed that the authentication credential is ready. In step 5a, the SPS constructs its data record corresponding to the stored RID value and, in step 5b, informs the database provider that it may now modify its database record (step 6).

We now explain the changes needed to the method of FIG. 27B for the embodiment in which the RID value is stored in both the user device and an external storage system. The method is shown in FIG. 39.

Steps Init-1, Init-2, 1a and 1b are as in FIG. 27B. Note that at this juncture, the context is VM1/(CR, SPS).

In step 2a, CR requests SPS to verify the RID value. Note that this entails verifying the RID value and the user via his credential/card. In step 2b, the SPS requests the user device to authenticate the user. In step 3, UPS presents its card to the SPS, which may verify it (step 4).

Upon successful verification of the user, the SPS proceeds in step 5 to send the secure key S2 and request the RID name and value from the external storage system, e.g., cloud service. As described above, the cloud service may verify the key S2 (steps 6a-6c) and sends the requested RID value in step 6d. In step 6e, the RID value is sent to CR.

In step 7a, CR verifies the received RID value. Upon successful verification, it may construct the database record requested by the vendor. Note that this data record may not include the private data of the user, but it may contain non-private data of the user (cf. FIG. 27B). The DBP then may clear SPS from VM1 and send the constructed data record to the vendor as per the latter's request (step 7b).

In the various embodiments described above, the private data of a user was shown to be stored in the user communication device along with the possibility of storing it also in an external storage system. We now describe an embodiment in which a user's private data may only be stored in an external storage system. In such a case, the user device may provide a secure key and a credential to the SPS that may store it for later use. The private data of the user is not stored in the user's computing device.

Figure 40:
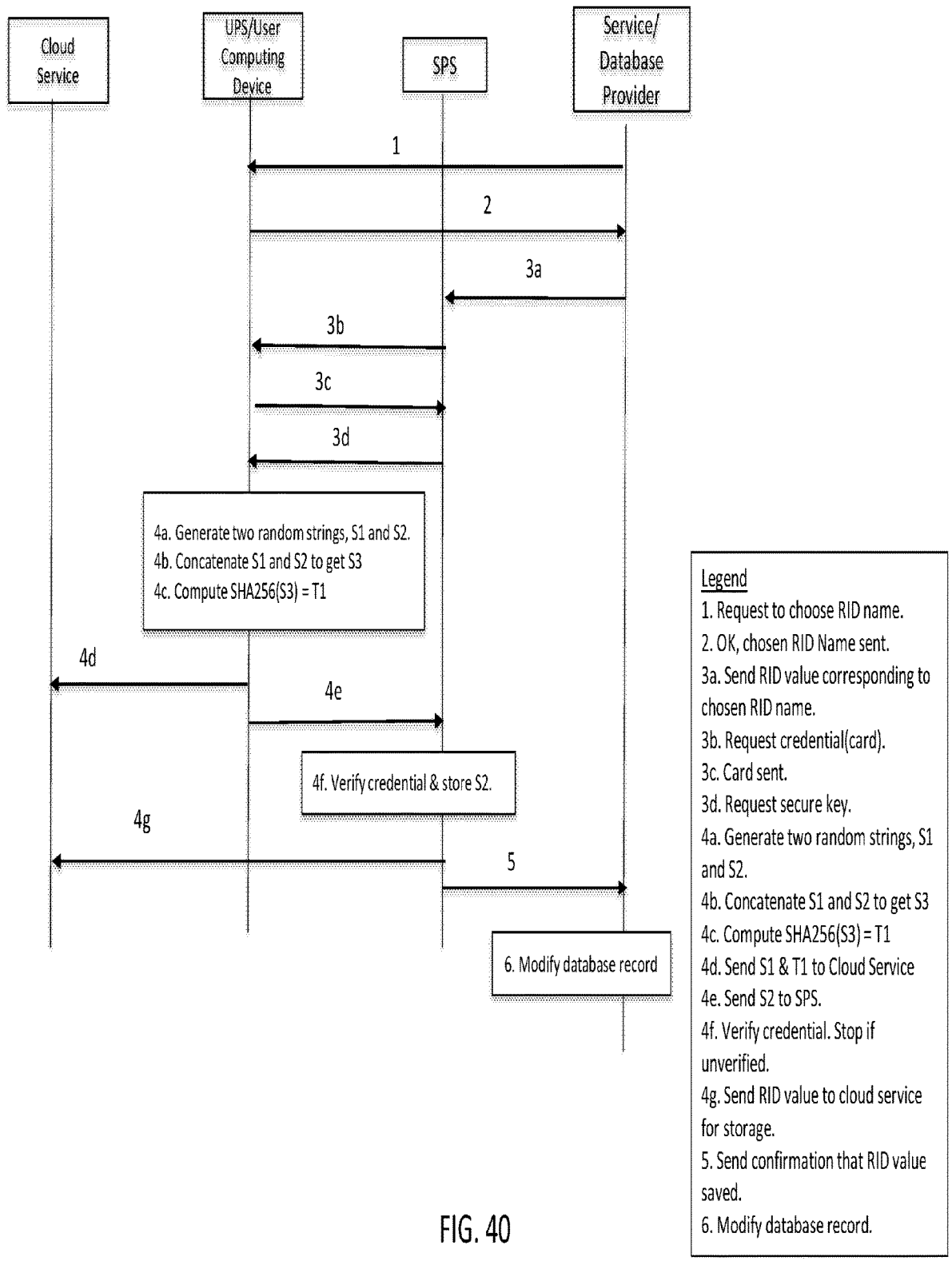
FIG. 40 describes the database modification method in the embodiment wherein the private is stored only in an external storage system, e.g., a cloud storage environment.

FIG. 40 shows the method by which the database may be modified to store the private data exclusively in external storage. The main difference to note between FIGS. 38 and 40 is that SPS does not send the RID value to the UPS. SPS receives an authentication credential from UPS and saves it for later use.

Figure 41:
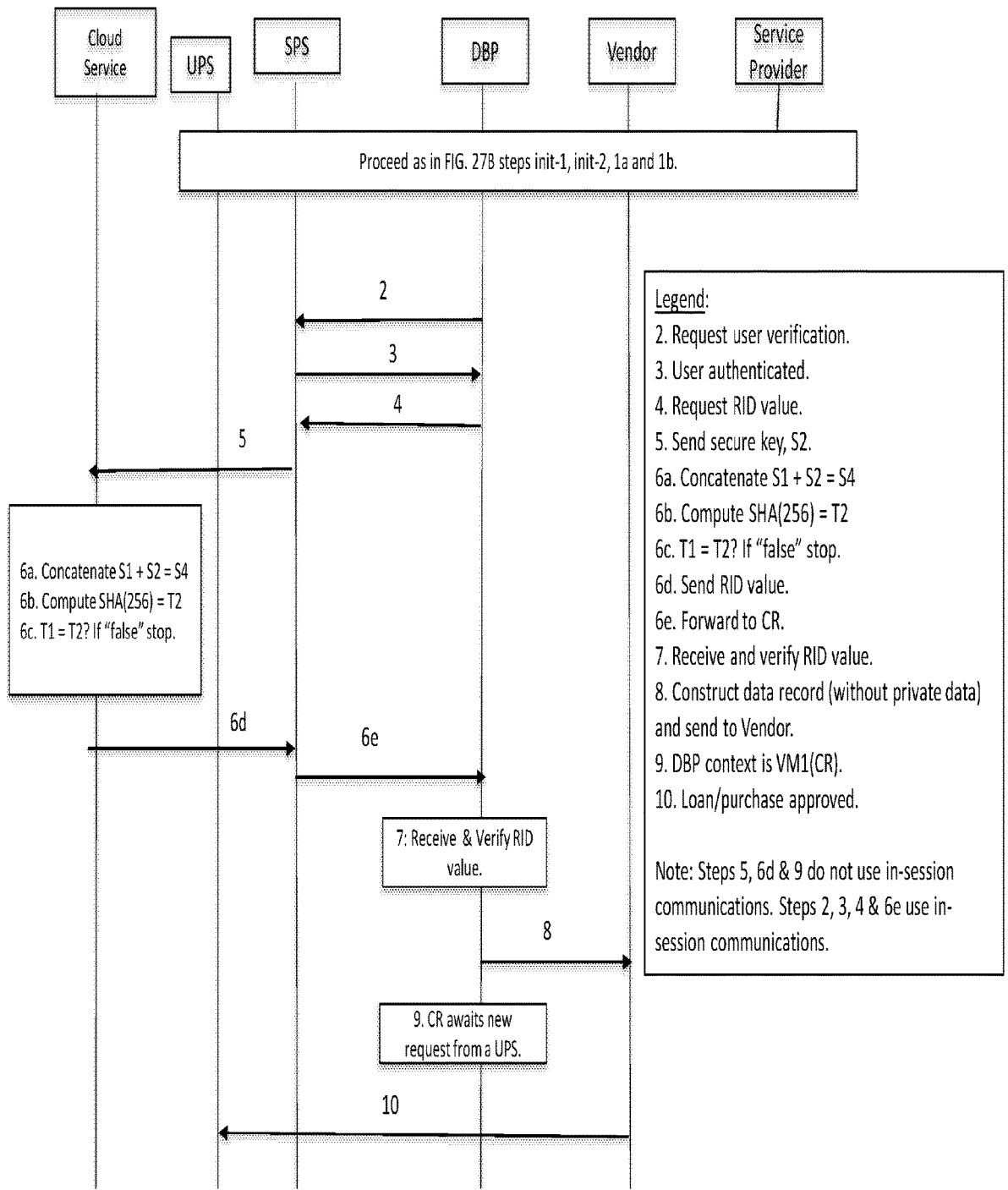
FIG. 41 describes retrieving private data stored only in an external storage system.

FIG. 41 shows the corresponding retrieval method employed by the database. Note that in this embodiment, the user device is not needed for retrieval of the RID value, i.e., SPS uses the previously provided user authentication credential (card) and the secure key S2 to ask the cloud service for the RID value. That is, the secure key S2 acts as an authorization credential for requesting private data from the external storage system.

In another embodiment, the user device may be interrogated by the SPS for a secure key whenever the database needs RID values from the external storage. Upon a successful presentation of the user device's credential and the secure key, the SPS may request the RID value from the cloud service as in the above embodiment (using the secure key).

A malicious entity who wishes to collect a user's private information thus needs to access the tables of the database system and the cloud service provider and then attempt to correlate the data across the two systems, viz., the database with non-personal data tables and the cloud system with personal RID-value data. However, even if the above unlikely attempt at gaining access to two separate and distinct systems is successful, the correlation effort will fail since the latter requires the user's privately known data and biometric data to associate a key value with a non-personal data record in the database tables. Without the user's data and biometric data, the malicious entity may only have access to tables of data with cryptographic objects, e.g., credit reports that do not contain user identifying information. The malicious entity thus has no way to correlate a RID value to the correct RID name without decrypting the RID value. Thus, the burden on the malicious entity is further increased.

Put simply, the malicious entity must gain access to the database tables, the cloud-storage provider and the user's computing device. Furthermore, access to the user's computing device is not sufficient since the malicious user also needs to break the cryptographic objects using the user's biometric data and user's data. Note also, that a user may not store his data on his user communication device; he may wish to store it in some other device, e.g., diary or to simply memorize his data.

As has been described above, query processing using the new database technology needs access to both the stored data and the associated user communication device(s). If a user communication device is turned off, the corresponding data record of its user may not be available for answering queries related to the user's data record. Such examples are referred to as "disconnected operation" and may result from devices being turned off or lost, etc.

In situations of disconnected operations, the database system may delay the execution of a query and send a notification to the user. The pending query may then be resumed when the user responds accordingly.

Illustrative Embodiment (Object Provenance Tracking Database)

Tracking objects using block-chain systems and conventional databases is common. We show tracking of objects using the new database technology as described herein and show various improvements and advantages resulting therefrom.

Consider a watchmaker, WM, that wishes to use a database to track the provenance of its watches, i.e., the names of customers who purchase the watches from WM or from previous owners. WM wishes to keep the names of its customers private in the provenance list, but have the list be verified. That is, WM wishes to prevent data breaches that may reveal customer names. To achieve this aim, WM may use the present invention as follows.

At any given instant, WM wishes to produce an audit trail for a given watch that replaces names of all previous owner by obfuscated identifiers. The audit trail, i.e., provenance, may be verified (by recourse to the user communication devices corresponding to the owners). That is, the obfuscated identifiers may be verified as representing the actual names of owners and the owners themselves since the verification will involve the owner's biometric information and secret.

Advantageously, the new database technology presented herein provides that no malicious person can corrupt the database and cause the audit trail (or the underlying records) to be verified. Furthermore, no personal information, i.e., names of the owners (current or prior) in this example, can be obtained from the database. That is, the database may not suffer a data breach with respect to designated private information, i.e., names of owners.

Figure 28C:
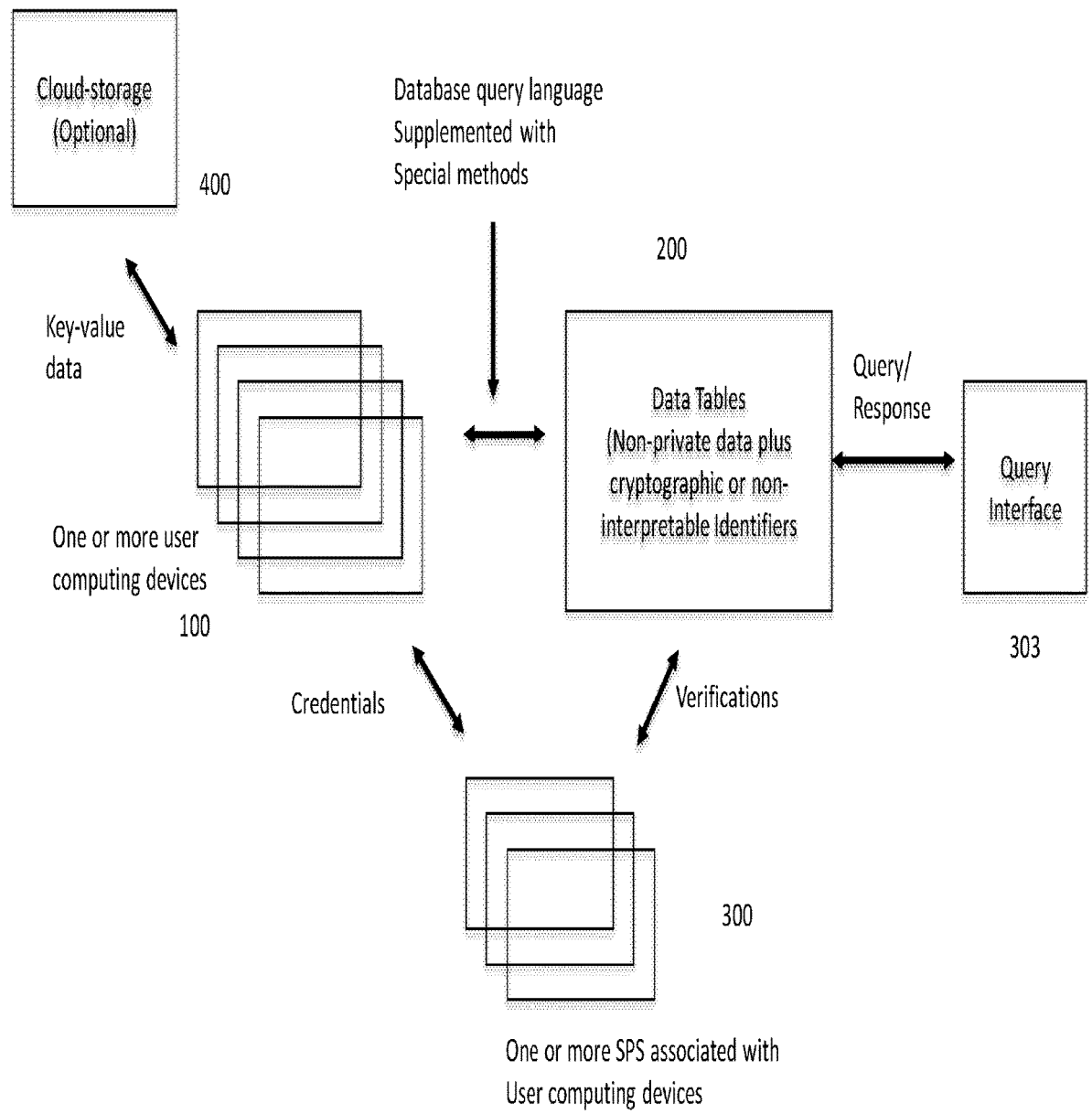
FIG. 28C describes the overall database system architecture of the present invention.

FIG. 28A shows a database administered by WM containing two watches that have been manufactured by WM. Each watch is to have an owner identified by his name. (Note that we have chosen the name of the owner as being the private attribute.) When the watches are first manufactured, they have not yet been sold to an owner. Therefore, we may assume the manufacturer as the owner for all newly manufactured watches. Furthermore, we assume that the manufacturer uses a different name for each newly manufactured watch.

Figure 27C:
FIG. 27C shows an exemplary database for a watch maker.

Thus, the two newly manufactured watches in FIG. 27C are shown with owner names as OWNER-1 and OWNER-2 for watches with serial numbers 12345 and 34567, respectively.

As described above (cf. FIG. 25), we have assumed that the database table of FIG. 27C has a (primary) key attribute "Owner Name" that is also the attribute that is to be kept private.

As described in FIGS. 27A and 27B above, the database provider may now may invite the owner to choose a RID Name for his watches. In table 100 (FIG. 28A), the "Owner RID names" chosen by the owner/manufacturer are shown as @rolex1 and @rolex2. Further, the actual names OWNER-1 and OWNER-2 (FIG. 27C) of the owner/manufacturer, i.e., the corresponding RID values, is stored in the owner's computing device (200, FIG. 28A). Thus, the owner's names have now been treated as private and stored in the owner's computing device.

The database provider calculates the corresponding Owner-1 Encrypted Values for the two watches as shown in column 2 of FIG. 28B. The database provider generates the associated Owner-1 Encrypted RID values that are shown as the hexadecimal strings Hex: [01100A001 . . . ] and Hex: [0A11B00 . . . ], respectively.

A consumer, say "John", purchases watch with serial number 12345 from WM. He thus becomes the second owner of the watch with serial number 12345. As before, the database provider wishes to keep John's name private. The database provider now asks John to choose a RID Name. The consumer chooses a name, shown in FIG. 28B as @john123. Again, as before, the database computes and stores the corresponding Owner-2 Encrypted RID Value, Hex:[00A00011B]. The user's actual name, John, is stored in his user communication device, as described above, along with his credentials and user dataset (secret). As an example, the user dataset may be the serial number of any other identifying attribute of the watch, e.g., a high-resolution image of the watch. Thus, the user may create an association between the credential and the (purchased) item by using one or more features of the item. The methods by which credentials are created and stored in the user communication device have been explained above in detail.

Clearly attributes other than names, e.g., home address, of the owners may be treated as private and handled as above.

A third owner of the same watch may be similarly accommodated. Thus, a provenance list may be maintained indicative of all the past owners of the watch. To verify the provenance list, each owner may be contacted and asked to verify his ownership (past or present) by providing his "private" information (in this example, the value of the attribute "name"), his biometric information and his "secret".

Thus, WM's database can accommodate new owners and maintain a provenance record for the owners. Each owner is recorded in the database using the method "Compute RID/value". Ownership may be verified by using the method "Verify RID/Value".

Those skilled in the art will realize that the extra columns added to the database table to accommodate the new owners (e.g., see the two extra columns added to FIG. 28B compared with FIG. 28A) may be collapsed using data structures such as a Merkle Tree (cf. U.S. Pat. No. 4,309,569).

In summary, the invention described herein allows data in a database to be stored or re-organized to avoid data breaches and also to protect user data, without sacrificing the ability to respond to data requests. Data may also be collected from various sources and organized in a new database as shown above that leads to safeguarding the stored data against data breaches.

Social Networking and Data Portability

Social networking technology has revolutionized society providing a virtual space in which communities of users may engage in social discourse and commercial activities. However, the technology of social networking is not without its own drawbacks. Two such drawbacks may be listed as follows.

First, it has been possible for malicious entities to create user accounts using computer programs, sometimes called bots. By employing hundreds of bots, i.e., a veritable army of bots, a malicious entity may introduce and control discourse in a community. It may thus unduly influence political and social decisions.

Second, users engaging in social discourse using a social networking platform often reveal personal information that may then be used by the platform to derive preferences of the user. The latter may then be used to provide customized and personalized services to the user in return, e.g., content and product recommendations, etc. While customization provides benefits to the user, the disadvantage is that the user's personal information comes into the possession of the social networking platform and, thus, susceptible to data breaches or misuse.

Particularly, conventional social networking platforms request users to provide lists of friends or followers. (In some instances, the lists may be multiply nested, i.e., friends of friends, or partitioned into sub lists.) A user's list or collection of friends is usually referred to as the user's social graph. A user accessing a social networking platform is conventionally provided with a content page organized by content from his social graph. Social networking platforms utilize user's social graphs according to their needs.

Using the database techniques of the present invention, we offer methods for social networking to achieve the following remedial objectives.

1. User accounts may be associated with biometric data of users making it difficult for malicious entities to use computer programs to create accounts, i.e., bots created by fake accounts.
2. Personal data attributes of users may be anonymized and protected. In particular, the social graph of a user may not be stored by the social networking platform. It may be stored in the user's computing device and provided on demand (in a verifiable fashion) to the platform on demand. Thus, the user controls his social graph.
3. A user may terminate his association with a social networking platform and establish an account with another platform. The user may then provide his social graph to the latter platform to receive services from the latter platform.

4. A user of a first social networking platform, say SNP1, may establish a new account with a second platform, say SNP2. He may then provide his social graph to SNP2 to receive services, as in (3) above. He may also request SNP2 to provide his social graph to SNP1 (in effect, SNP2 acts as the user's proxy). SNP2 may then receive content from SNP1 on the user's behalf, integrate it with content (from SNP2) and provide the integrated content to the user. Thus, the user's friends remain unknowledgeable about the user's move from SNP1 to SNP2, i.e., the user has achieved porting his social graph.

We now proceed to elaborate these remedial actions.

A conventional social networking platform may be advantageously viewed as a service provider using database 1 shown in FIG. 29. The customers or users of the platform are identified by customer-ID, e.g., email addresses. Each user is associated with a list of friends, i.e., social graph, and with his one or more content postings.

FIG. 29 shows a second exemplary conventional social networking platform as database 2 in which each user is associated with a list of followers.

The difference between providers 1 and 2 of FIG. 29 is the manner in which the two providers utilize the user's social graph.

A typical user request to database 1 (FIG. 29) may then be viewed to proceed as follows. The platform consults the list of friends of the requesting user, aggregates content from all the friends, and composes a content page therefrom. The requesting user, thus, receives a content page that when rendered on a user communication device displays content from the user's social graph. Similarly, provider 2 may utilize the user's social graph in a different manner when asked to provide content.

Now, if we treat the social graph of users as a private set of attributes, we may then modify databases 1 and 2 of FIG. 29 as shown in FIG. 30. That is, we treat the user's customer-ID, e.g., email address and list of friends of provider 1 (FIG. 29) as private and replace it in table 101 (FIG. 30) with a RID name and Encrypted RID Value, store the user's social graph in the user's computing device and store the computed encrypted RID value in table 101 (FIG. 30). We modify table 200 (FIG. 29) similarly to get table 201 (FIG. 30). Note that the user's friends/contacts list is no longer stored in the database tables of the platform. FIG. 30 shows the corresponding table 301 created in SPS.

FIG. 31 shows the user's social graph stored in the communication devices corresponding to the two users shown in table 100 of FIG. 29. FIG. 31 also shows the stored credentials CC-11, CC-21, CC-12 and CC-22.

Figure 32:
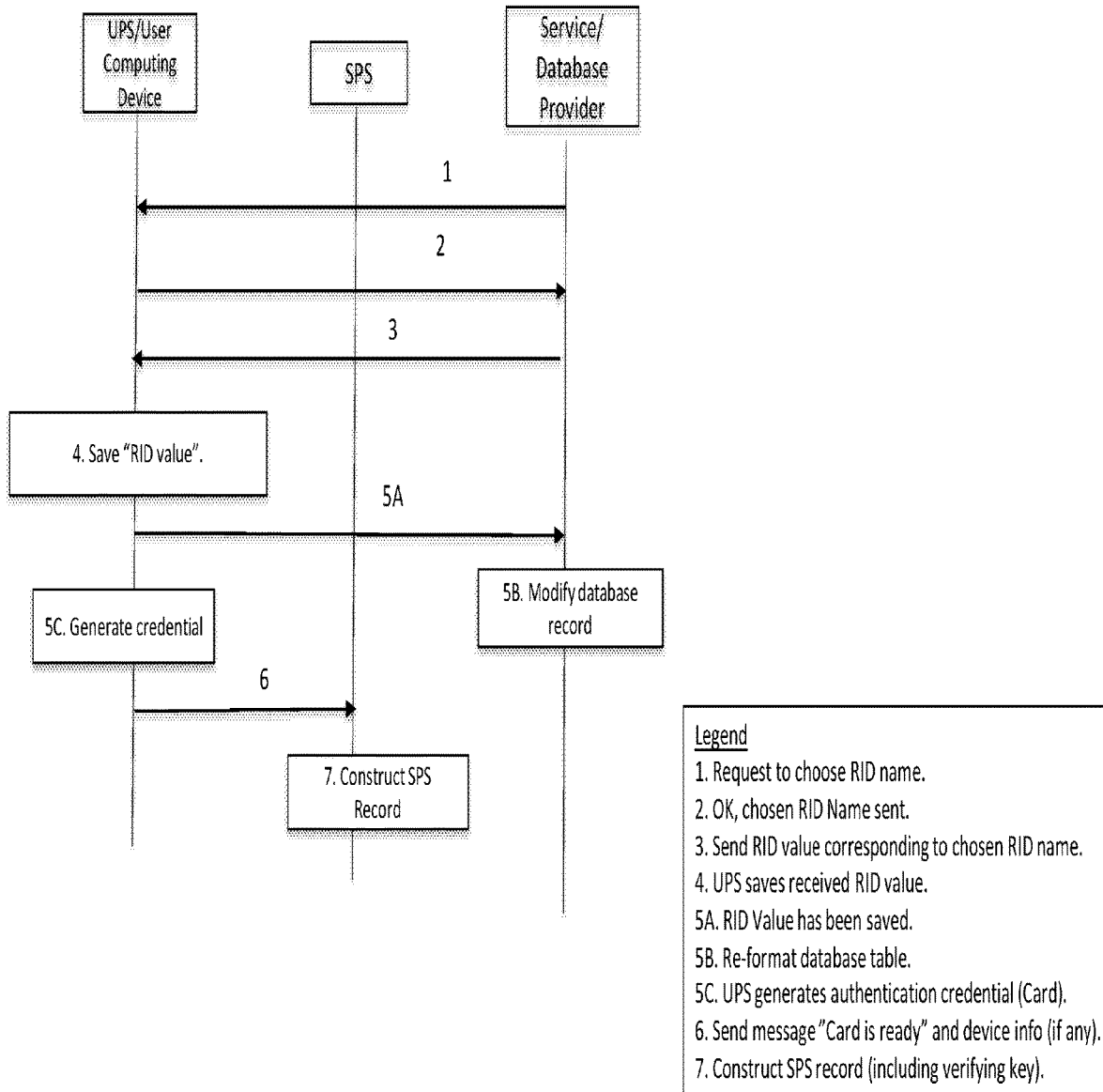
FIG. 32 describes the method by which databases storing data of social networking sites may be modified.

We describe the method by which such a modification may take place in FIG. 32. Note that FIG. 32 is a duplicate of FIG. 27A. The description of FIG. 32 thus is like that of FIG. 27A, except that in FIG. 32, we consider the social graph of users as a part of the personal information that is represented as a RID value and stored in the corresponding user device (steps 3 & 4).

Figure 33:
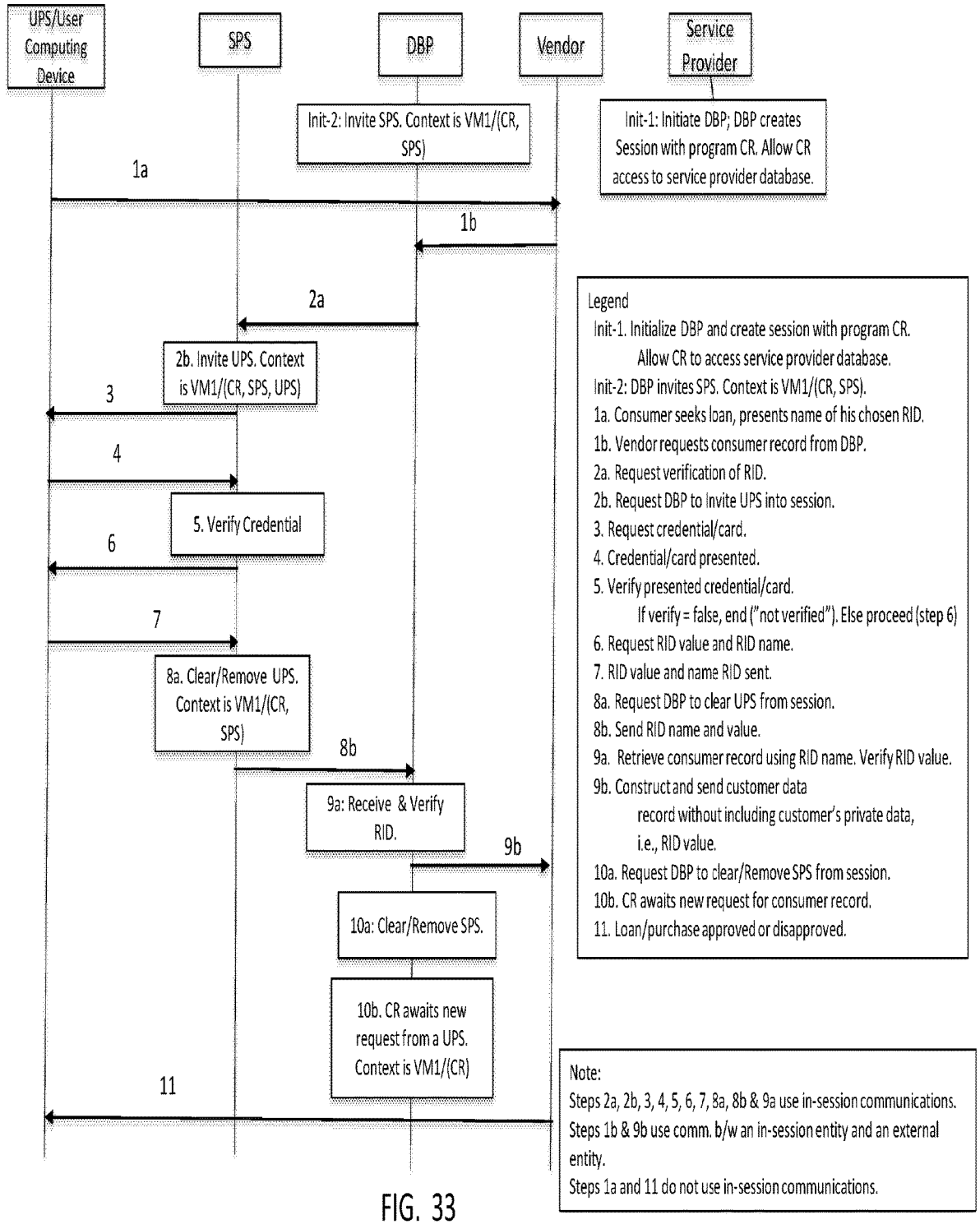
FIG. 33 describes the method by which user queries may be responded to by a social networking site using the methods of the present invention.

FIG. 33 shows the process followed by a service provider upon receiving a request for a content page from a user. FIG. 33 is like FIG. 27B, mutatis mutandis. We skip the detailed description of FIG. 33 for reasons of brevity except to note that, in steps 6 and 7, the user device may provide its social graph to the DBP who may then use the latter to construct a content page accordingly.

By using the methods depicted shown in FIGS. 29-33 and the accompanying descriptions herein, we may protect private attributes of users of social networking platforms. Moreover, the use of credentials to verify the RIDs imply that a user's biometric information is needed, thus, making it difficult for a computer program to create a user account.

As has been shown in embodiments above, private data representing the user's social graph may be stored in external storage systems such as cloud storage systems, but still remain under control of the user communication device.

Finally, a user may terminate his account with a social platform by simply eliminating either the key value from his user communication device or by requesting the SPS to delete the verifying key corresponding to his RID. The user may also simply delete the credentials from his computing device.

To port his social graph to another platform, a user may proceed as follows.

Method: [Port Social Graph]
1. User has a first account with provider SNP1 (with RID Name "RID-1") and wishes to port his account.
2. User establishes a second account with provider SNP2 (with RID Name "RID-2").
3. User requests SNP2 for content page.
4. SNP2 acting as a proxy for the user communication device requests SNP1 for a content page using RID-1. (SNP1 needs credentials from the user's computing device.)
5. SNP2 receives content page from SNP1.
6. SNP2 integrates content received from SNP1 into a content page possibly including content available to SNP2 from its (local) content store using RID-2.
7. SNP2 presents integrated content page (corresponding to RID-1 and RID-2) to the user communication device.
8. User communication device renders the page.

Note that references, e.g., links, URLs, etc., in the content corresponding to RID-1 may refer to addresses/locations in SNP1's domain. De-referencing such links may be achieved either by converting such links to absolute addresses or by using remote procedure calling mechanisms. Such techniques are well-known in prior art.

Conventional social networking platforms support millions of users. Accounts held by deceased users are increasing in number over time. It is disconcerting to receive postings from a deceased friend/follower.

Using the methods described herein, users requesting content need to provide their social graphs that, in turn, requires the user's biometric data input. One way to resolve the issue of deceased user accounts would be to send a periodic request ("ping" request) to user's computing devices that requires the users to acknowledge the request by inputting their credentials. Since the inputting of credentials requires the users to utilize their fingerprint (or other biometric information), deceased users will not be capable of responding to the received "ping" requests.

Akin to the "keep alive" messages often used by computer systems, e.g., to maintain connections/sessions, such "ping" requests may be used to detect users who no longer respond or are incapable to respond. A policy may then be used to delete or archive user accounts that may not have responded to a pre-determined number of ping requests.

Legacy Services

Figure 34:
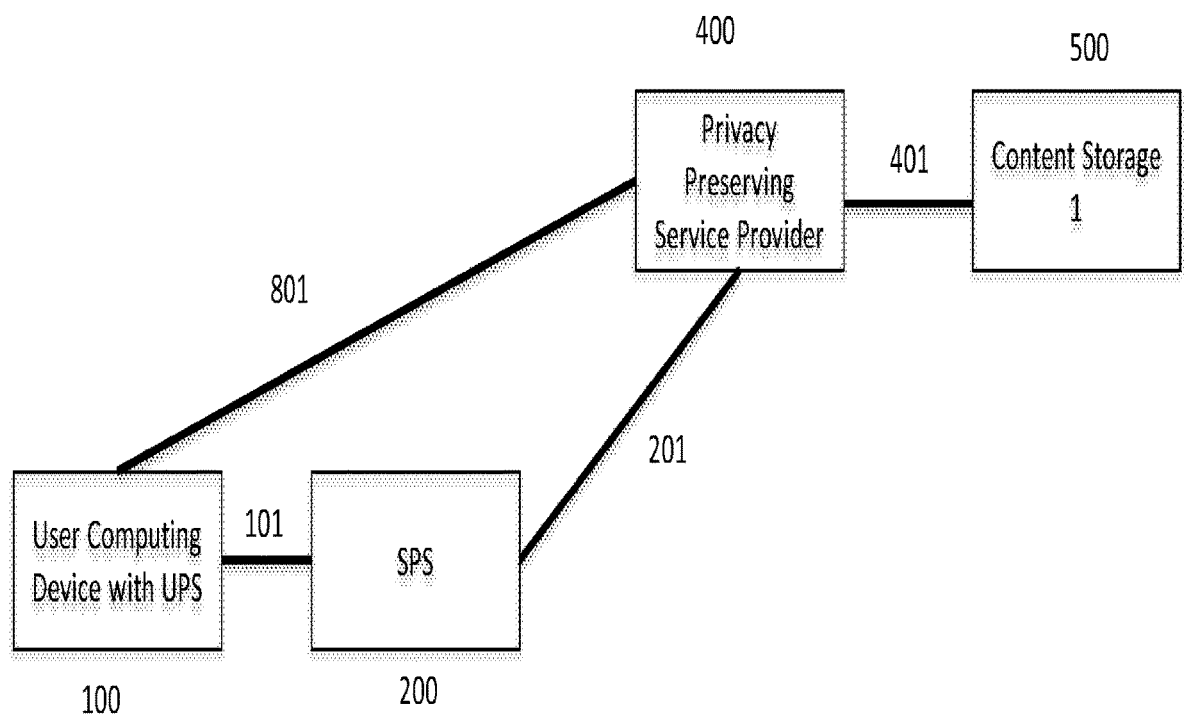
FIG. 34 shows the general architecture of the system for a user communication device with a privacy switch set to "ON".

In the preceding descriptions, we assumed that the privacy switch was set to "ON", i.e., it was enabled, thus allowing the user to receive privacy preserving services from a service provider. The general approach is summarized in FIG. 34 whereby a user communication device 100 with the UPS set to "ON" may connect with a service provider 400 via the SPS 200, or directly via the connection 801. The service provider knows the user by an obfuscated identifier (and/or a credential) and may use historical data to create customized services using an internal content store 500 whose records are indexed according to the user's obfuscated identifier.

Figure 35:
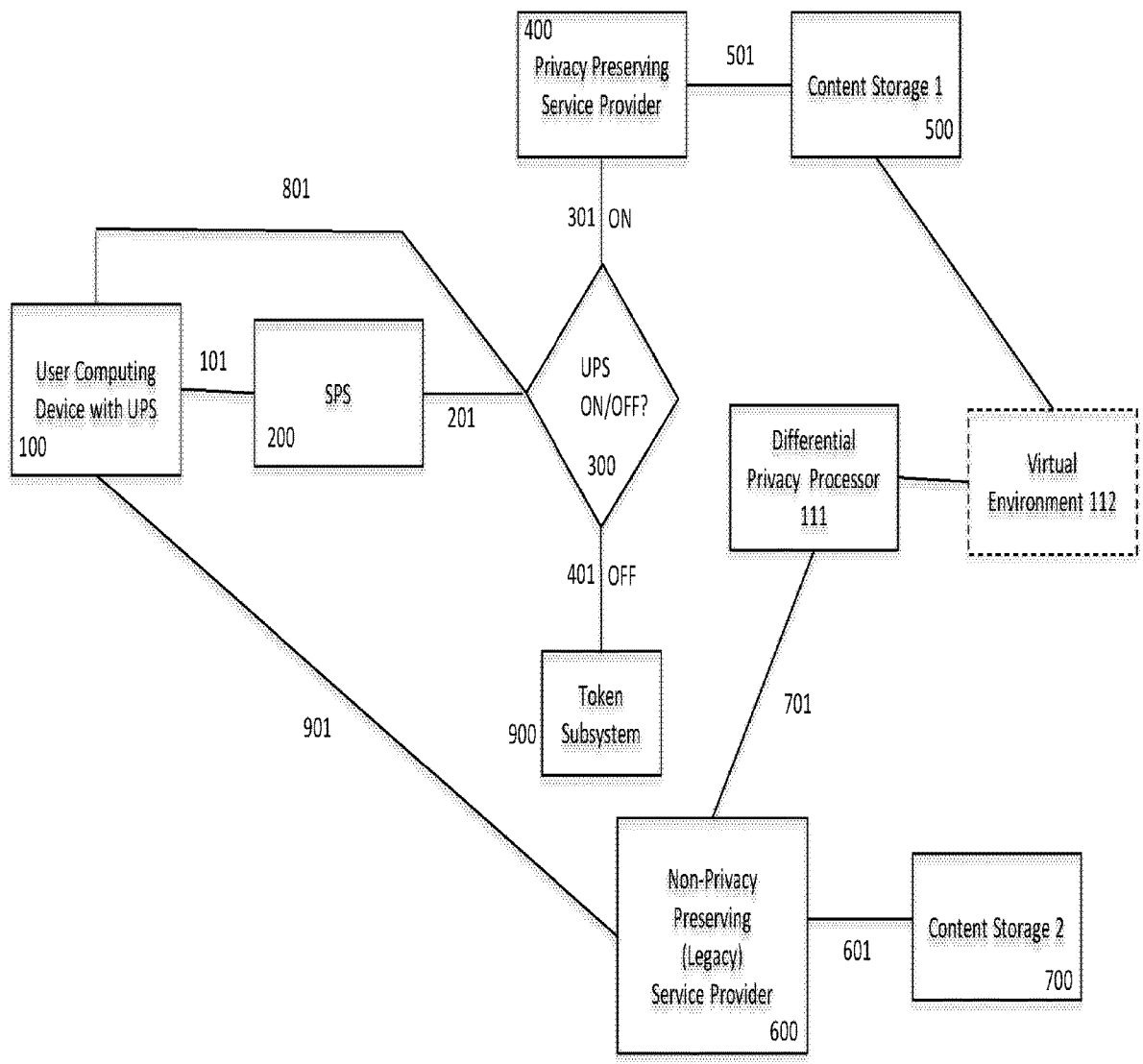
FIG. 35 shows the general architecture of the system for a user communication device with a privacy switch set to "OFF".

In FIG. 35, we consider the case wherein the UPS 100 is set to "OFF", i.e., the UPS is disabled.

Such an eventuality may be engendered by a user who does not wish to use privacy preserving services exclusively, i.e., he may not wish to pay a fee on some occasions if, e.g., the privacy preserving services are tariffed by the service provider. Thus, the user, in effect, may have two sets of historical purchase records with the provider, one record when the user acts in a private manner using an obfuscated account and the second when the user utilizes his non-private, i.e., actual account (name).

Providers often give incentives to users based on their past purchase history. Thus, a situation may arise in which a user wishes to receive the benefits of his private and non-private purchase history, without revealing the connection between the two, viz that both histories belong to the same user.

One method to resolve the conundrum would be to allow the user to create a record of his private history, cache it in a storage area provided by the provider and then access it from the user's non-private account. That is, the cache may be "locked" by a token and the provider may be instructed to provide the contents of the cache to any user who presents the token.

To support such a solution, FIG. 35 proposes the subsystem 300 implemented as a part of a service provider who maintains both a privacy preserving service (PPS) and a non-privacy preserving (legacy) service.

User communication device 100 with UPS set to ON proceeds as described above and accesses PPSP accordingly. That is, the system proceeds in privacy preserving mode.

Assume now that the user sets the UPS to OFF. The UPS requests and receives a token, T, from subsystem 900 via connection 801. System 900 may be implemented by provider PPS. The issuance of the token causes the service provider PPS to create a snapshot of data records, i.e., the "cache" referred to above, that is stored in a memory called shown as virtual environment 112 in FIG. 35. The cache contains the user's past (purchase) history in privacy mode.

Now when the user accesses his account in non-privacy mode (the UPS is set to OFF), his request may be accompanied by the token, T, that signals the provider that the token holder is allowed access to the cache 112. Thus, the provider may now integrate the cache with other (purchase) history of the user and provide recommendations and incentives accordingly.

We observe, however, that the above approach may resulting in the provider gaining private information about the user. It has been shown in prior art that integrating two datasets such as the user's private and non-private history above, may lead to breach of privacy. (See, for instance, A. Narayanan, V. Shmatikov: *Robust De- anonymization of Large Sparse Datasets*, IEEE Symposium on Security and Privacy, pp. 111-125, 2008.)

Thus, we may require that the dataset 112 may not be integrated with content storage 700 (FIG. 35) indiscriminately. One approach would be to keep the two datasets 112 and 700 separate and, further, require that access to 112 be restricted to using techniques of differential privacy protocols as described, e.g., by A. Narayanan, et. al. (see reference cited above).

Illustrative Computing Environment

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Also, it is noted that some embodiments have been described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). However, computer readable storage media do not include transitory forms of storage such as propagating signals, for example. Of course, those skilled in the art will recognize many modifications may be made to this configuration without departing from the scope or spirit of the claimed subject matter.

Moreover, as used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

The invention claimed is:

1. A method for providing user data to a third party while maintaining user privacy, comprising:

establishing a session in a computing environment to execute a first executable computer code in a virtual machine, the first executable computer code being associated with a database provider;

causing a second executable computer code to be inserted into the session, the second executable computer code being associated with a verifying entity;

receiving a request from a third party from outside of the session to obtain user data for a user having a user data record maintained by the database provider, the request identifying the user by a designated identifier stored in the user data record, the designated identifier replacing at least one private attribute of the user data record, the at least one private attribute including one or more key attributes of the user data record, the user data record including an encrypted data object in which said at least one private attribute is encrypted;

responsive to the request, causing a third executable code to be inserted into the session, the third executable code being associated with a user communication device associated with the user;

further responsive to the request, causing the third executable code to send a credential to the second executable code within the session, the credential being associated with said at least one private attribute of the user data record;

upon verification of the credential by the second executable code, receiving in the session, from the third executable code, said at least one private attribute and the designated identifier; and in response to receipt in the session of said at least one private attribute and the designated identifier, accessing the user data record stored in the database and verifying said at least one private attribute using the encrypted data object and, if verified, sending the user data record to the third party outside of the session without including said at least one private attribute.

2. The method of claim 1, wherein the at least one private attribute that is replaced by the designated identifier is stored in the user communication device.

3. The method of claim 2, wherein verification of the credential ensures that said at least one private attribute has not been altered by the user communication device.

4. The method of claim 3, wherein verification of the credential further ensures that the user who stored the at least one private attribute in the user communication device is also the user who created the credential.

5. The method of claim 4, wherein ensuring the user who stored the at least one private attribute in the user communication device is also the user who created the credential is accomplished using biometric data of the user and a user defined dataset.

6. The method of claim 1, wherein the second and third executable computer codes are each executed in a virtual machine.

7. The method of claim 1, wherein the second and third executable computer codes are executed in a common virtual machine.

8. The method of claim 1, wherein the second and third executable computer codes are executed in different virtual machines.

9. The method of claim 1, wherein the at least one private attribute includes a key attribute of the user data record.

10. The method of claim 1, wherein sending the user data record to the third party without including said at least one private attribute includes sending the user data record to the third party of a communications network.

* * * * *